United States Patent
Tsuda et al.

(10) Patent No.: US 6,894,688 B2
(45) Date of Patent: May 17, 2005

(54) PROGRAM, RECORDING MEDIUM, RENDERING METHOD AND RENDERING APPARATUS

(75) Inventors: Jumpei Tsuda, Kawasaki (JP); Satoshi Nakamura, Yokohama (JP); Takao Kato, Yokohama (JP); JaeYoung Kim, Mapo-Gu (KR)

(73) Assignee: Koei Co., Ltd., Yokohama (JP)

( * ) Notice: Subject to any disclaimer, the term of this patent is extended or adjusted under 35 U.S.C. 154(b) by 300 days.

(21) Appl. No.: 10/325,756

(22) Filed: Dec. 19, 2002

(65) Prior Publication Data

US 2004/0021661 A1 Feb. 5, 2004

(30) Foreign Application Priority Data

Jul. 30, 2002 (JP) ........................................ 2002-221064
Jul. 30, 2002 (JP) ........................................ 2002-221161
Jul. 30, 2002 (JP) ........................................ 2002-221463

(51) Int. Cl.[7] ............................................. G06T 15/00
(52) U.S. Cl. ....................................................... 345/419
(58) Field of Search ................................ 345/419, 427, 345/428, 441, 442, 443, 420, 473, 474, 475

(56) References Cited

U.S. PATENT DOCUMENTS 6,580,425 B1 * 6/2003 Zwicker et al. ............. 345/420
6,674,430 B1 * 1/2004 Kaufman et al. ........... 345/419

FOREIGN PATENT DOCUMENTS

JP          5-20406       11/1993
JP          2001-229396   8/2001

OTHER PUBLICATIONS

Wilhelms et al., Anatomically Based Modeling, University Of California, Santa Cruz Research, Jun. 1998, pp. 1–8.*
*Introduction to Implicit Surfaces*, J. Bloomenthal, et. al., ed., Morgan Kaufman Publishers, Inc., San Francisco, California, pp. 26, 20–35 (1997).
*Computer Graphics: Principles and Practice*, J. D. Foley, et al., 2nd ed., Addison–Wesley Publishing Co., Inc., pp. 488–491 (1990).
J. Wilhelms, et al., "Dynamic animation: interaction and control", *The Visual Computer*, 4: 283–295 (Apr. 1988).
*Computer Graphics*, T. Agui & M. Nakajima, Kabushiki Kaisha Shokodo, pp. 115–117 (1992)(with English translation).

* cited by examiner

Primary Examiner—Phu K. Nguyen
(74) Attorney, Agent, or Firm—Wean Khing Wong

(57) ABSTRACT

A program which can render an object dynamically by using metaballs in a three-dimensional imaginary space is provided. All metaballs MB are disposed in an imaginary box IB, $(r/R)^2$ is calculated according to a calculation equation expressing a given solid shape of a metaball MB from a center of the metaball MB towards the minimum direction and the maximum direction of a voxel index of a voxel Vx for each vertex of the voxel Vx. At this time, a second-order divided difference is calculated, based upon the second-order divided difference and a first-order divided difference calculated last time the first-order divided difference is updated, and $(r/R)^2$ is calculated (S618 and S634) Only two times of addition are performed by utilizing information on vertexes of the adjacent voxels Vx calculated last time, thereby a computation time for $(r/R)^2$ can be shortened.

40 Claims, 32 Drawing Sheets

Fig. 27A

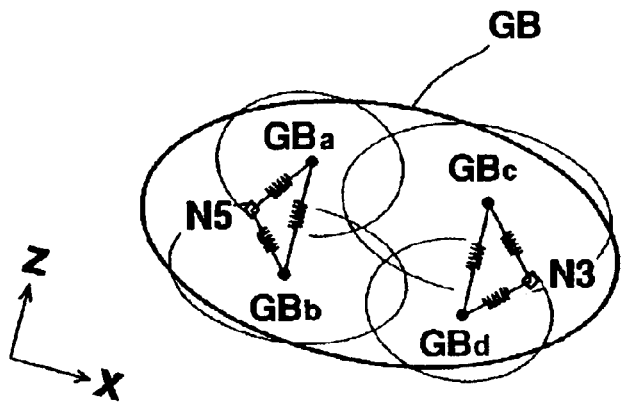

Fig. 27B

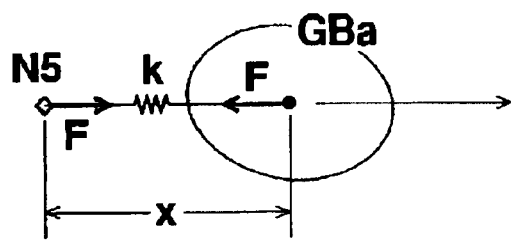

Fig. 28

$$\text{matNB}_E = \text{matN7} \cdot \text{matC}_E$$

$$= \begin{bmatrix} 1 & 0 & 0 & 30 \\ 0 & 1 & 0 & 120 \\ 0 & 0 & 1 & 0 \\ 0 & 0 & 0 & 1 \end{bmatrix} \begin{bmatrix} 20 & 0 & 0 & 0 \\ 0 & 30 & 0 & 10 \\ 0 & 0 & 20 & 10 \\ 0 & 0 & 0 & 1 \end{bmatrix}$$

$$\begin{bmatrix} H_x \\ H_y \\ H_z \\ 1 \end{bmatrix} = \begin{bmatrix} 1 & 0 & 0 & 30 \\ 0 & 1 & 0 & 120 \\ 0 & 0 & 1 & 0 \\ 0 & 0 & 0 & 1 \end{bmatrix} \begin{bmatrix} 20 & 0 & 0 & 0 \\ 0 & 30 & 0 & 10 \\ 0 & 0 & 20 & 10 \\ 0 & 0 & 0 & 1 \end{bmatrix} \begin{bmatrix} 1 \\ 0 \\ 0 \\ 1 \end{bmatrix} = \begin{bmatrix} 50 \\ 10 \\ 130 \\ 1 \end{bmatrix}$$

Fig. 31A      Fig. 31B
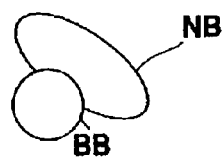
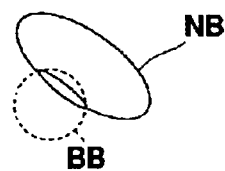
Fig. 32A      Fig. 32B
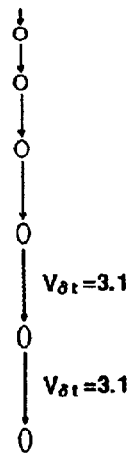
Fig. 33
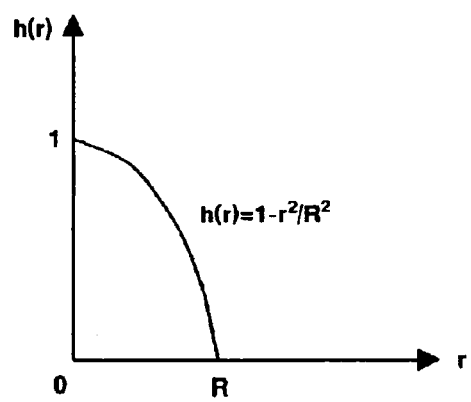

PROGRAM, RECORDING MEDIUM, RENDERING METHOD AND RENDERING APPARATUS

"This application is based upon and claims the priority (under 35 USC §119, under the Paris Convention) of: Japanese patent application number 2002-221064, filed on Jul. 30, 2002; Japanese patent application number 2002-221161, filed on Jul. 30, 2002; and Japanese patent application number 2002-221463, filed on Jul. 30, 2002; the disclosures of which are hereby expressly incorporated by reference in their entirety."

FIELD OF THE INVENTION

The present invention relates to a program, a recording medium, a rendering method and a rendering apparatus, and more particular to a program where metaballs are dynamically rendered as an object in a three-dimensional imaginary space, a computer readable recording medium on which the program is recorded, a metaball rendering method where metaballs are dynamically rendered as an object in a three-dimensional imaginary space, and a rendering apparatus where metaballs are dynamically rendered as an object in a three-dimensional imaginary space.

DESCRIPTION OF THE RELATED ART

A metaball is a solid body formed in a three-dimensional imaginary (virtual) space, and it has a characteristic that, when a plurality of metaballs approach to one another, they are merged while affecting mutually, but when they leave away one another, they are separated from one another. For this reason, a shape having a free curved surface can be rendered by using many metaballs. "Introduction to Implicit Surface", p. 26 (1.4.2 Blends), published by MORGAN KAUFMANN PUBLISHERS, INC. San Francisco, Calif., USA in 1997 discloses, as shown by the following equation (A), a calculation equation for obtaining density of a metaball which was disclosed by Wyvill et al. in 1986. In the equation (A), h(r) represents density inside a metaball, namely, a variable for expressing strength of a metaball, r represents a distance from a center of the metaball to an evaluation point of the density, and R represents a radius of the metaball.

$$h(r)=(r^2/R^2-1)^2(9-4r^2/R^2)/9 \quad (A)$$

where $r^2 \leq R^2$

As shown in FIG. 39, the density h(r) of a metaball according to the equation (A) has a characteristic of a sextic function (sixth order function) regarding the distance r. FIG. 40A shows a density distribution inside metaball spheres according to the equation (A) in case that portions of two metaball spheres having a radius of 1 overlap with each other. Density h(r) in the overlapping portion is a sum of the densities of the two metaball spheres. Incidentally, a shape shown in FIG. 40A is a density distribution but does not represent a shape of the metaballs itself. FIG. 40B shows isodensity curves (lines obtained by connecting isosbestic points) when the density distribution is viewed just downward. An outermost thick line shows an original shape of the metaballs, and thin lines inside the same are isodensity curves when threshold values (which take values in a range of 0 to 1) are increased 0.1 by 0.1. It is understood that, when the value of the threshold is increased, two metaballs are separated from each other, while the two metaballs are merged together (joined) smoothly when the threshold is decreased.

As shown in FIG. 41A, the isodensity curve shown in FIG. 40B is equal to a density distribution of a section taken so as to pass through centers of two metaball spheres. The density value corresponding to a specific isodensity curve becomes the above-described threshold value. The shape of the isodensity curve in the section defined by a specific threshold becomes a shape of two metaball spheres reproduced as they are (since these two metaballs are spheres, they take the same shapes even when they are viewed from any place). Incidentally, FIG. 41B shows a shape obtained when two metaballs to be reproduced is merged together at a threshold value of 0.5 in accordance with the equation (A).

Further, in JP 05-20406A, there has been disclosed about calculation equations for a metaball which are contrived such that an order (degree) of the distance r is reduced to a second order and the characteristic is caused to approximate to the sextic function of the equation (A). In this technique, density inside the metaball is calculated by dividing a range that the distance r can take into three sections and by using calculation equations with different characteristics for respective sections in a switching manner.

Now, in case of an oval sphere which is frequently used as a shape of a metaball, when $P_0(x_0, y_0, z_0)$ is expressed as a center of the oval sphere, P (x, y, z) is expressed as an arbitrary point, and $X \equiv x-x_0$, $Y \equiv y-y_0$, $Z \equiv z-z_0$, the shape of the oval sphere is given by a surface where $(r/R)^2$ according to the following equation (B) becomes a constant. In this case, when X, Y and Z are calculated, arithmetic processing for 12 times of multiplication and 5 times of addition is required.

$$(r/R)^2=aX^2+bY^2+cZ^2+2dXY+2eYZ+2fZX \quad (B)$$

Further, for example, in JP 2001-229396A, there has been disclosed a technique where a shape of a game character is changed by using a morphing technique. In the morphing technique, an expression where the shape is totally varied at once from one object existing in a three-dimensional imaginary space to another object can be rendered or graphically expressed ordinarily. Furthermore, a game has been known that one polygon character is produced by combining object polygons as a plurality of parts thereof.

However, since the above conventional art is used for an expression of curvaceousness in order to express a static solid body with smooth curves in a three-dimensional imaginary space, it is not suitable for its utilization in dynamic rendering for a game or the like. That is, for example, when a character is rendered by a plurality of metaballs, the character has a dynamic motion in a three-dimensional imaginary space, so that dynamic processing for the metaballs is required according to the motion of the character. In the conventional art, however, it was difficult to accommodate dynamic processing and high speed processing for a plurality of metaballs which constitute the character or the like in the three-dimensional imaginary space. In particular, when the internal density of the metaballs is calculated, the number of arithmetic operations of multiplication and/or addition increases at distance calculation processing from centers of the metaballs to evaluation points, which resulted in an obstacle when metaballs are dynamically rendered.

Furthermore, using the sextic function regarding the distance r according to the equation (B) in calculation for the internal density of metaballs causes exceeding of the processing capacity for the current game machine or causes a limitation on the number of metaballs for avoiding such exceeding. Therefore, in many cases, it was difficult to constitute a character that is rendered dynamically by metaballs.

Further, unlike the merging of the metaballs, since the whole objects are not divided into portions in the morphing, it is difficult to express a partial change such as putting emphasis on a change in articulation portions. In addition, in the morphing, it is necessary to prepare in advance shape models which are a start model and a goal (target) model for deformation, and such very strong restrictions are imposed on these two shape models in the process of creation in that (i) both of the shapes are completely the same in the number of constitution polygons and in the number of constitution vertexes, (ii) both of the models are completely the same in the kind (triangle, rectangle) of the constitution polygons and in connection conditions, and so on. That is, the two models are of two completely similar shape models in principle, and they are allowed to differ in only coordinate positions of the vertexes. For the reasons, the deformation expression according to the morphing was an expression technique where a large burden was imposed on a model creator in a game creating/rendering process. In addition, a change only allowed in the morphing is a geometrical change, and it was difficult to express a phases-wise change because there occurs such drawbacks in that, when the number of polygons or the like is increased/decreased at a time of the change, discontinuation occurs at connection portions, so that, for example, polygons are generated at unexpected positions or important polygons disappeared.

Incidentally, as documents relating to the present invention, there are a description regarding a Bezier curve in "Computer Graphics", pp. 488–491 (James D. Joley et al.), published by Addison Wesley Publishing Co., Inc. in 1990 and a description regarding Euler's motion equations in "2.2 Numerical integration methods" (Jane Wilhelms, Matthew Moore, and Robert Skinner), Dynamic animation: interaction and control, The Visual Computer (pp. 283–295) published in April, 1988. There is also a description regarding a marching cube method where a surface having constant density is approximated by polygons from data stored in three-dimensional matrixes in "Computer Graphics", pp. 1150–117 (joint author: Takeshi Agui and Masayuki Nakajima), published by Shokoudou Inc., Japan.

SUMMARY OF THE INVENTION

In view of the above circumstances, a first object of the present invention is to provide a program which can dynamically render an object by using metaballs in a three-dimensional imaginary space, a computer readable recording medium on which the program is recorded, a metaball rendering method thereof, and a rendering apparatus thereof. Further, a second object of the invention is to provide a program which can dynamically render an object by using metaballs in a three-dimensional imaginary space and which can increase/decrease the number of polygons and can calculate polygon facets at a high speed at a time of changing a shape of the object, a computer readable recording medium thereof, a metaball rendering method thereof, and a rendering apparatus thereof. Furthermore, a third object of the invention is to provide a program which can dynamically render a game character by using metaballs in a three-dimensional imaginary space, a computer readable recording medium thereof, a metaball rendering method thereof, and a rendering apparatus thereof.

In order to achieve the above objects, according to a first aspect of the present invention, there is provided a program where metaballs are dynamically rendered as an object in a three-dimensional imaginary space, wherein a computer is caused to function as: a metaball disposer for disposing a plurality of metaballs in the three-dimensional imaginary space according to predetermined motion data; a density calculator for calculating internal density of the metaballs at vertexes of voxels which divide an interior of the three-dimensional imaginary space into a large number of portions; and an object composer for calculating vertex coordinates of polygons based upon the internal density of the metaballs at the vertexes of the voxels and a predetermined threshold to compose the object.

In the first aspect, a plurality of metaballs in the three-dimensional imaginary space are disposed according to predetermined motion data by the metaball disposer, internal density of the metaballs at vertexes of voxels which divide an interior of the three-dimensional imaginary space into a large number of portions is calculated by the density calculator, and vertex coordinates of polygons based upon the internal density of the metaballs at the vertexes of the voxels and a predetermined threshold are calculated to compose the object by the object composer. According to the first aspect, since the metaballs are disposed according to the predetermined motion data by the metaball disposer, the internal density of the metaballs is calculated by the density calculator, and the vertex coordinates of polygons are calculated to compose the object by the object composer, the object can be rendered dynamically by using metaballs in the three dimensional imaginary.

In the first aspect, when the density calculator has a position calculator for calculating a reference position which is a center or a center line of the metaball, and a distance calculator for sequentially calculating distances from the reference position to vertexes of the voxels towards the outside of the metaball in either direction of x, y and z in the three-dimensional imaginary space, since the distance calculator is allowed to calculate the distances from the reference position to the vertexes of the voxels towards the outside of the metaball sequentially in either direction of x, y and z, the number of calculations can be reduced by utilizing information on the vertex coordinates of the adjacent voxel calculated last time, so that a calculation time can be reduced. Accordingly, it becomes possible to render and express the object dynamically by using metaballs in a three-dimensional imaginary space.

At this time, it is preferable that the position calculator calculates the reference position as a coordinate position where density of the metaball becomes 1. Further, it is preferable that, when a radius of the metaball is defined as R and a distance from the reference position of the metaball to an vertex of the voxel as r, the distance calculator calculates a value of $r^2$ or $r^2/R^2$ for each vertex of the voxel from the reference position. For example, the distance calculator may calculate the value of $r^2$ or $r^2/R^2$ by adding a first-order divided difference of a size ($\Delta x$, $\Delta y$ and $\Delta z$) of the voxel in either direction of x, y and z to a value of $r^2$ or $r^2/R^2$ calculated last time. When the distance calculator calculates a second-order divided difference which is a divided difference of the first-order divided difference and then calculates the value of $r^2$ or $r^2/R^2$ at an vertex of the adjacent voxel by addition, time consumptive calculation such as multiplication or division is eliminated and the calculation for $r^2$ or $r^2/R^2$ can be performed at a higher speed. Further, when the distance calculator calculates the second-order divided difference, based upon the calculated second-order divided difference and the calculated first-order divided difference last time at the vertex of the adjacent voxel updates the first-order divided difference, and calculates the value of $r^2/R^2$ by addition, the calculation for $r^2/R^2$ is completed by two times of addition so that it is made possible to perform the calculation from the reference position to the vertex of the voxel at a higher speed. When the distance calculator terminates calculation when the value of $r^2/R^2$ becomes 1 or more, a calculating time for the density outside the metaball ($r^2/R^2 \geq 1$) can be omitted.

Further, when a radius of the metaball is defined as R, a distance from a reference position where density of the metaball is 1 to a density evaluation point as r, and density at the density evaluation point as h(r), the density calculator may calculate the internal density of the metaball according to the following equation (1), or, when the density coefficient of the metaball which 1 or −1 is defined as m_fCharge, the density calculator may calculate the internal density of the metaball according to the following equation (2). The density calculator can calculate the internal density faster than the conventional art since the calculation equations for calculating the density are simplified, and in case that an object is a game character or the like, such a game character may give a proper undulatory impression since the metaballs have concave and convex portions according to the calculation equations. Especially, when the density calculation is performed by using the equation (2), it is possible to express an invisible metaball by setting the density coefficient m_fCharge to −1, and a state where the density of merged portions is lowered so as to form a hole (recess) can be rendered.

$$h(r)=1-r^2/R^2 \qquad (1)$$

$$h(r)=m_{13}f\text{Charge} \cdot (1-r^2/R^2) \qquad (2)$$

Furthermore, when the object composer calculates vertex coordinates of polygons for rendering an isodensity curve of the metaball at a predetermined threshold, since the vertex coordinates of the polygons are calculated based upon the internal density of the metaball at the vertexes of the voxels and the predetermined threshold by the object composer, the vertex coordinates of the polygons can be composed dynamically from 0, so that a phase-wise change of the polygons is allowed, which can not be realized in the morphing technique.

In this case, it is preferable that the object composer specifies a side which composes an vertex of a polygon by comparing the internal density of the metaball at the vertex of the voxel with the threshold, and calculates a coordinate position corresponding to the threshold on the specified side as an vertex coordinate of the polygon. At this time, the object composer may be constituted so as to detect as ON when the internal density of the metaball at the vertex of the voxel is equal to or more than the threshold and as OFF when the internal density is less than the threshold, and may specify the side for composing the polygon according to an index which is a sum of vertex values of the ON when an vertex number for identifying the vertex of the voxel is used as an exponent part of 2. The index may be constituted by 256 sets of isodensity curve data, one set of isodensity curve data including information about sides of the voxel on which vertexes of the polygon are composed and about sides which constitute an isodensity curve of the polygon. Further, the object composer may be constituted so as to calculate, based upon internal densities at the vertexes of the voxel on both ends constituting the specified side and the coordinate positions of the vertexes of the voxel, a position corresponding to an internal density which is equal to the threshold between the vertexes of the voxel as an vertex coordinate of the polygon. Furthermore, it is desirable that the object composer calculates vertex coordinates of the polygons regarding all of the vertexes of the voxels for each vertical blanking cycle.

Further, in the first aspect, the metaball disposer may assign the metaballs to a plurality of nodes whose coordinate positions in the three-dimensional imaginary space are defined by motion data so as to constitute a game character, and the object composer may calculate the vertex coordinates of polygons based upon the internal density of the metaballs at the vertexes of the voxels and the predetermined threshold to compose the object as the game character. At this time, when the nodes are positioned at joint positions of the game character and a distance to a node adjacent thereto is constant, since the nodes correspond to joints of a human being or an animal and portions between the nodes correspond to a skeleton of the human being or the animal, so that the skeleton of the game character can be formed so as to approximate that of the human being or the animal. Further, when the metaball disposer varies sizes of the metaballs which are assigned to the nodes periodically, a state that the game character is breathing can be expressed. Furthermore, in case that such a constitution is employed that, when a predetermined event occurs, the metaball disposer cancels the disposition (assignment) of the metaballs to the nodes and disposes the metaballs to coordinate positions which are determined according to a predetermined calculation equation or table such that the metaballs are scattered, a state that the metaballs are released from the nodes, for example, a state that a portion of a body of the game character is tone off from the skeleton or a state that the game character itself is exploded and the body pieces are scattered, which is difficult to render in the morphing technique, can be expressed, so that it is possible to enhance an expression capability in a game or the like. At this time, when the metaball disposer varies shapes of the metaballs disposed on the coordinate positions which are determined according to the calculation equation or table, for example, an aspect where the game character is constituted by liquid material or the like can be expressed.

When the computer is further caused to function as a ground ball composer for composing, by a metaball, a ground ball which is disposed just below the game character and crawls on the ground according to movement of the character, an aspect that the game character is constituted with liquid material or the like and the liquid material or the like is pooled can be expressed. The ground ball composer may calculate the coordinate position of the metaball which constitutes the ground ball such that the metaball is connected to a node at a foot portion of the game character or a metaball assigned to the node at the foot portion by an imaginary spring. The ground ball may be constituted by a plurality of metaballs. The ground ball composer may change shapes of the plurality of metaballs such that the metaballs constituting the ground ball are unified.

When the computer is further caused to function as a droplet ball composer for composing, by a metaball, a droplet ball which falls from a metaball assigned to a specific node, an aspect that the game character is constituted by liquid material or the like can be emphasized. At this time, when the droplet ball composer restricts a fall velocity of the droplet ball to a constant value or less, an aspect that the droplet ball is subjected to air friction in the natural world can be expressed. Further, the droplet ball composer may change a shape of the droplet ball such that the droplet ball drops naturally.

Furthermore, the computer may be further caused to function as a tentacle ball composer for composing, by a metaball, a tentacle ball which is tentacle-shaped and which projects from a metaball assigned to a specific node. When the tentacle ball composer disposes the tentacle ball on a Bezier curve, the tentacle ball can be expressed with a smooth curve. At this time, the tentacle ball composer may calculate coordinate positions of points for specifying the Bezier curve such that the points defining the Bezier curve are connect by imaginary springs.

Further, in order to achieve the above objects, a second aspect of the invention is a computer readable recording medium on which a program according to the first aspect is recorded.

Furthermore, according to a third aspect of the invention, there is provided a metaball rendering method where metaballs are dynamically rendered as an object in a three-dimensional imaginary space, comprising the steps of: within a predetermined time, disposing a plurality of metaballs in the three-dimensional imaginary space according to predetermined motion data; calculating internal density of the metaballs at vertexes of voxels which divide an interior of the three-dimensional imaginary space into a large number of portions; and calculating vertex coordinates of polygons based upon the internal density of the metaballs at the vertexes of the voxels and a predetermined threshold to compose the object.

And, according to a fourth aspect of the invention, there is provided a rendering apparatus where metaballs are dynamically rendered as an object in a three-dimensional imaginary space, comprising: a metaball disposer for disposing a plurality of metaballs in the three-dimensional imaginary space according to predetermined motion data; a density calculator for calculating internal density of the metaballs at vertexes of voxels which divide an interior of the three-dimensional imaginary space into a large number of portions; and an object composer for calculating vertex coordinates of polygons based upon the internal density of the metaballs at the vertexes of the voxels and a predetermined threshold to compose the object.

BRIEF DESCRIPTION OF THE DRAWINGS

FIGS. 27A and 27B are explanatory diagrams showing a ground ball, FIG. 27A showing a relationship between small ground balls and virtual springs and FIG. 27B showing a force acting on the small ground ball;

FIG. 28 is an explanatory diagram showing a hit point of a bullet ball in global coordinates;

FIGS. 31A and 31B are illustrative diagrams showing a relationship between a bullet ball and a node assigned ball, FIG. 31A showing a state obtained when a density coefficient of the bullet ball is 1 and FIG. 31B showing a state obtained when a density coefficient of the bullet ball is –1;

FIGS. 32A and 32B are diagrams illustratively showing a speed change and a shape change due to a natural drop of a droplet ball, FIG. 32A showing a case that the droplet is not subjected to frictional resistance due to air and FIG. 32B showing a case that the droplet is subjected to frictional resistance due to air;

FIG. 33 is a graph showing a relationship between a density and a distance when a density coefficient is set to 1 in a density evaluation equation used in an embodiment;

DETAILED DESCRIPTION OF THE PREFERRED EMBODIMENTS

An embodiment where the present invention is applied to a video game will be explained with reference to the drawings.
(Structure)

Figure 1:
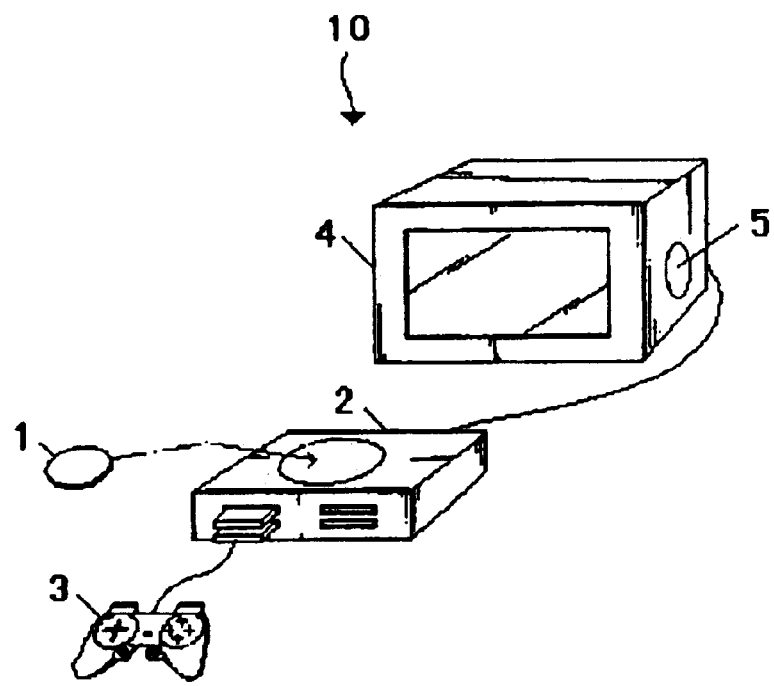
FIG. 1 is a schematic perspective view showing a connection aspect of a game apparatus for home use.

As shown in FIG. 1, in a video game apparatus for home use 10 where a video game according to this embodiment is performed, a game apparatus main body 2 is connected with a display such as a television monitor 4 housing a speaker 5 therein and with an input apparatus 3. The game apparatus main body 2 has a medium reading section (refer to FIG. 3) to which a recording medium 1 such as a CD-ROM or the like can be installed. A game program and game data recorded on the recording medium 1 is automatically loaded to a storing memory inside the game apparatus main body 2 by installing the recording medium to the medium reading section.

Figure 2:
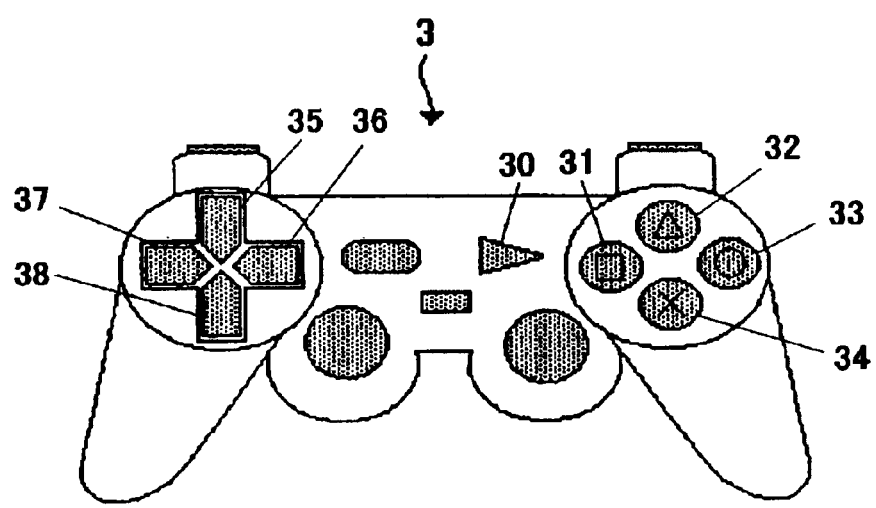
FIG. 2 is a plan view of an input appartus used in the game device for home use.

As shown in FIG. 2, various buttons such as a start button 30 for starting a game, a square button 31, a triangular button 32, a circular button 33, and an x shaped button 34 for operating a game character or for responding to a selection inquiry from the game apparatus main body 2, and a + shaped direction button set comprising a up (↑) button 35, a right (→) button 36, a left (←) button 37 and a down (↓) button 38, and the like are disposed at the input apparatus 3.

Figure 3:
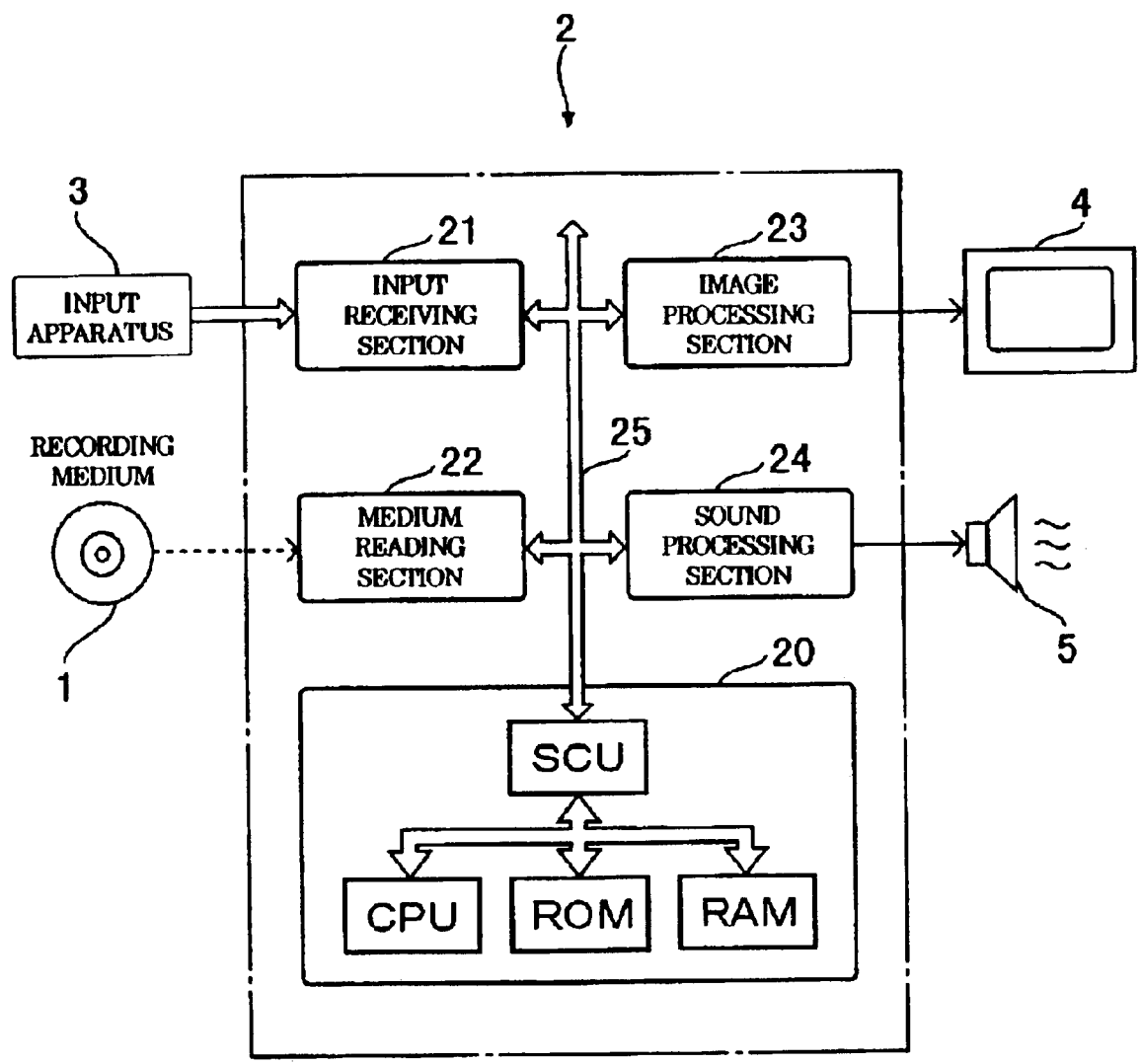
FIG. 3 is a block diagram showing a schematic configuration of the game apparatus.

As shown in FIG. 3, the game apparatus main body 2 is provided with a CPU block 20 serving as a computer for implementing control on the entire apparatus. The CPU block 20 is configured with a SCU (System Control Unit) for controlling data transmission among respective sections in the game apparatus main body 2, a CPU operating as a central processing unit at a high clock speed and serving as respective elements in claims described later, a ROM in which a basic control operation of the game apparatus main body 2 is stored, a RAM serving as a work area for the CPU and temporarily storing game programs and various data recorded on the recording medium 1, and an internal bus for connecting these configurations.

An external bus 25 is connected to the SCU. The external bus 25 is connected to an input receiving section 21 which receives an input from the input apparatus 3 such as a controller pad or the like to transmit input information to the CPU block 20, a medium reading section 22, such as a CD-ROM drive or the like, which is provided with a unillustrated sub-CPU and reads a game program including game data recorded on the recording medium 1 to transfer the read game program to the CPU block 20, an image processing section 23 which is provided with a CPU and a VRAM for performing graphic processing and performs texture processing, light source processing and the like to an object according to information fed from the CPU block 20 in order to implement rendering (graphically expressing) processing in a three-dimensional field, and a sound processing section 24 which is provided with a unillustrated sub-CPU and which processes sounds such as, for example, back music, fighting sounds and the like. Also, the input receiving section 21 is connected to the input apparatus 3, the image processing section 23 to the television monitor 4, and the sound processing section 24 to the speaker 5 housed in the television monitor 4.
(Operation)

Next, an operation of the video game apparatus for home use 10 will be explained mainly on the basis of the CPU of the CPU block 20 with reference to flowcharts. Incidentally, when the game apparatus main body 2 is supplied with a power source and the recording medium 1 is inserted therein, a metaball rendering routine for dynamically rendering an object constituted with metaballs in a three-dimensional imaginary space is executed.

Figure 4:
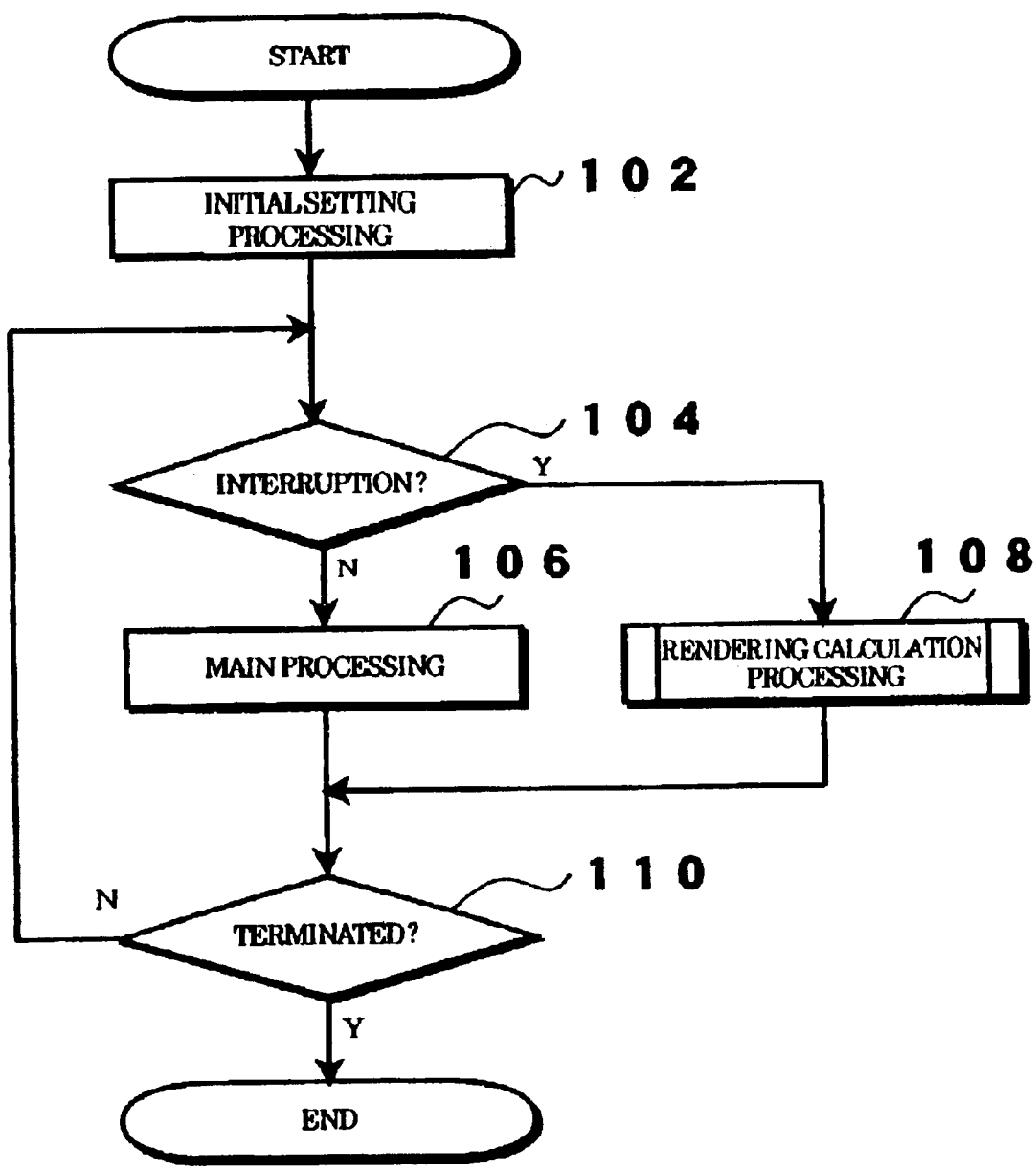
FIG. 4 is a flowchart of a metaball rendering routine that a CPU of a game apparatus main body of an embodiment executes.

As shown in FIG. 4, in the metaball rendering routine, firstly, an initial setting processing is performed in step 102. In this initial setting processing, game data including object information such as motion data of nodes (joints) for each frame of a character, hierarchy data of nodes, shapes, sizes and the like of metaballs constituting a character, and a game program are loaded to the RAM, and initial values of time t and motion cursor (frame counter) mc are respectively set to 0.

Next, in step 104, determination is made about whether or not a vertical retrace line interruption (Vsync) synchronizing with a vertical blanking cycle of the television monitor 4, which is performed at a cycle of once per 1/60 sec. (16.6 milliseconds), is carried out. When the determination is negative, in the next step 106, main processing such as input processing for processing input information transferred from the input receiving section 21, sound processing for causing the sound processing section 24 to compose game effect sound, or the like is performed, and the routine proceeds to step 110.

On the other hand, when the determination in step 104 is affirmative, a rendering calculation processing subroutine for disposing/rendering an object constituted with metaballs in a three-dimensional imaginary space (imaginary frame described later) is performed in step 108.

Figure 20A:
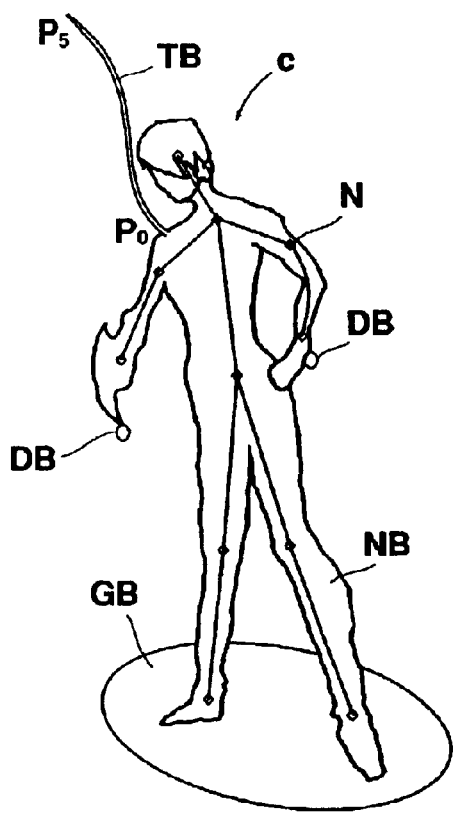
FIGS. 20A and 20B are explanatory diagrams showing nodes of a character rendered by metaballs, FIG. 20A showing node positions of the character displayed on a TV monitor and FIG. 20B showing node numbers.
Figure 20B:
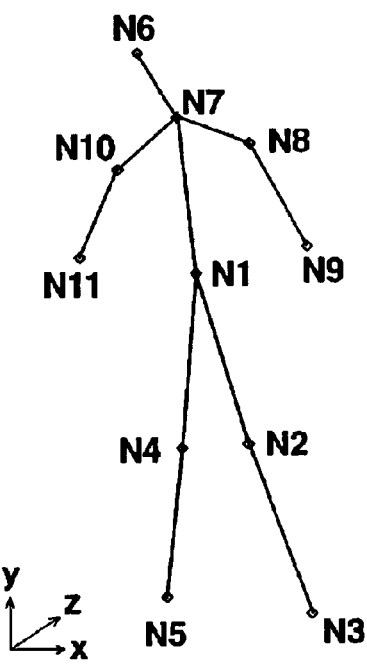
Figure 21:
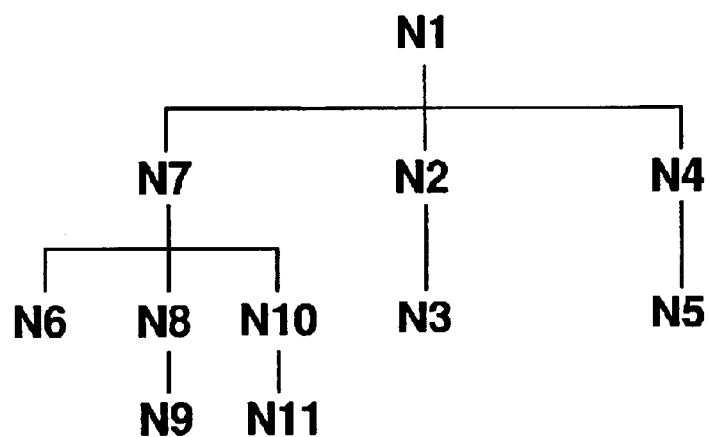
FIG. 21 is an explanatory diagram illustratively showing hierarchy information of nodes of the character.
Figure 22:
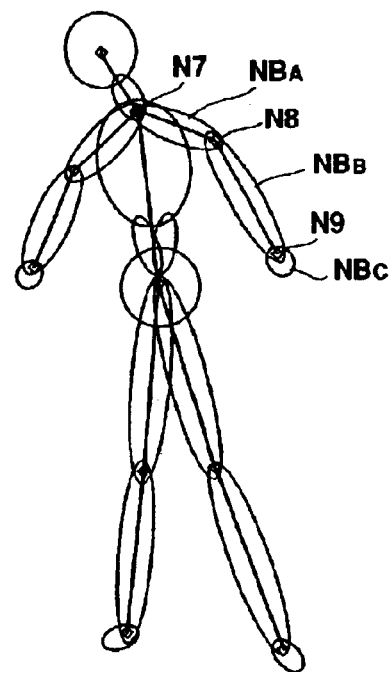
FIG. 22 is an explanatory diagram illustratively showing node assigned balls which are assigned to nodes of a character.

Here, an outline of the object including a character which is rendered in this embodiment will be explained. As shown in FIGS. 20A and 20B, a character c has a plurality of nodes N1 to N11 corresponding to human joints. As shown in FIG. 21, the nodes N1 to N11 constitute hierarchy (parentage), and distances between the respective notes N are constant. These nodes N are not displayed on the television monitor 4. As shown in FIG. 22, the nodes N are assigned (disposed) with a plurality of metaballs (hereinafter, refer to as "node assigned balls") NB, and the character c such as shown in FIG. 21A is displayed on the television monitor 4 via density distribution processing and marching cube processing described later for respective of the node assigned balls NB. Incidentally, when the term "an object" is used in this embodiment, the term includes subjects other than the character c rendered in the three-dimensional imaginary space. That is, as shown in the following Table 1, there are a plurality of kinds of metaballs and details thereof will be described later.

TABLE 1

| KIND OF METABALL | OUTLINE |
| --- | --- |
| Node assigned Ball (NB) | a ball assigned to a node and constitutes a body of a character |
| Ground Ball (GB) | a ball crawling on the ground (constituted by plural balls) |
| Droplet Ball (DB) | a ball dropping from a specific node assigned ball |
| Tentacle Ball (TB) | a ball constituting a slender tentacle projecting from a specific node assigned ball |
| Bullet Ball (BB) | a ball constituting a bullet which is shot when a player attacks a character |
| Fragment Ball (FB) | a ball scatted when a bullet ball hits a node assigned ball |

Figure 5:
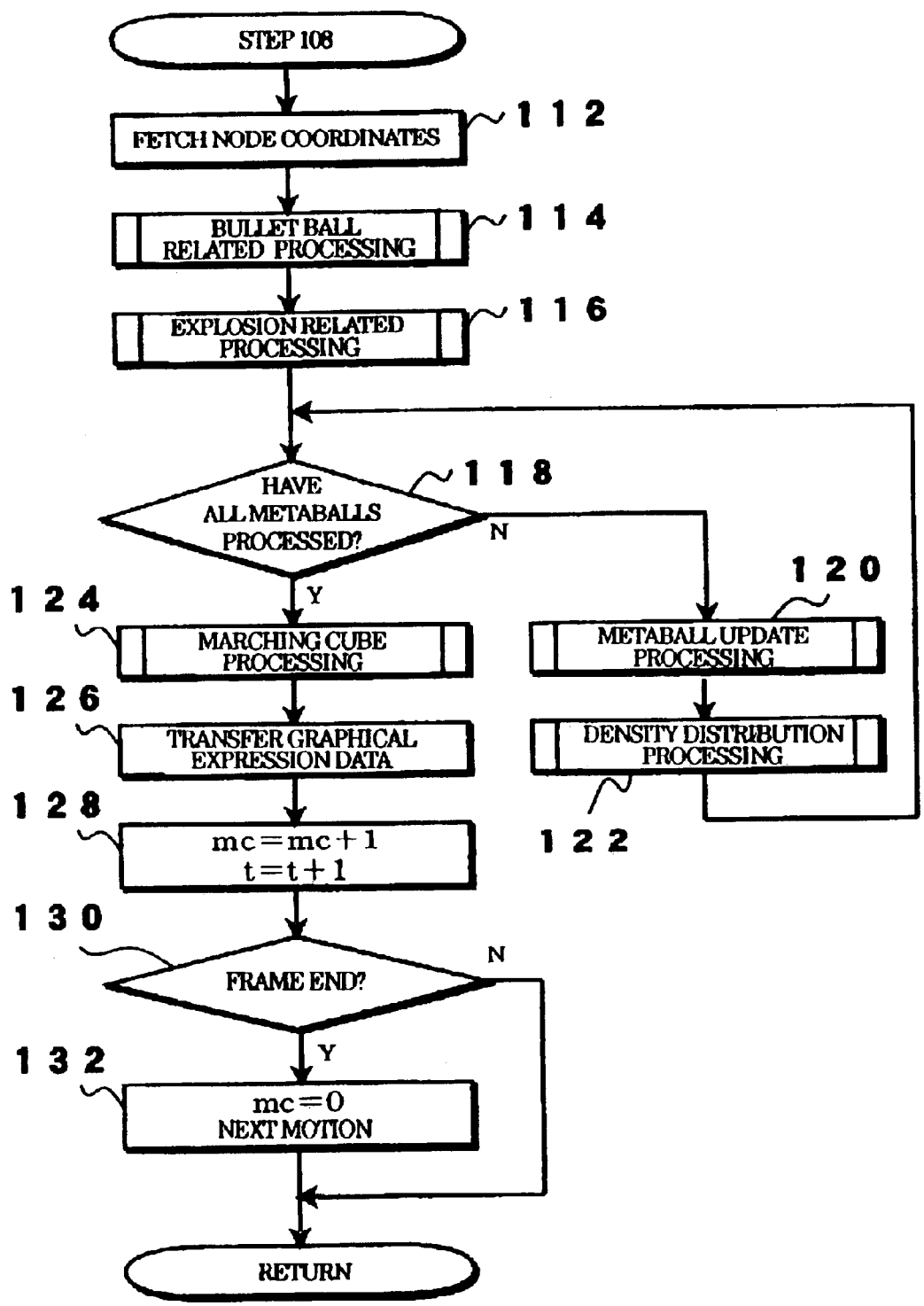
FIG. 5 is a flowchart of a rendering calculation-processing subroutine showing details of step 108 in the metaball rendering routine.

As shown in FIG. 5, in the rendering calculation processing subroutine, motion data for the nodes N1 to N11 of the character c in the current frame are obtained corresponding to the motion cursor mc in step 112. Such motion data are formed with scale information, rotation information and translation information, and a motion can be expressed by calculating matrixes having 4 rows×4 columns for each frame as disclosed, for example, in "3-DIMENSIONAL COMPUTER GRAPHICS" co-authored by Eihachiro Nakamae and Tomonori Nishida and published by Shokoudou Inc.

Figure 23:
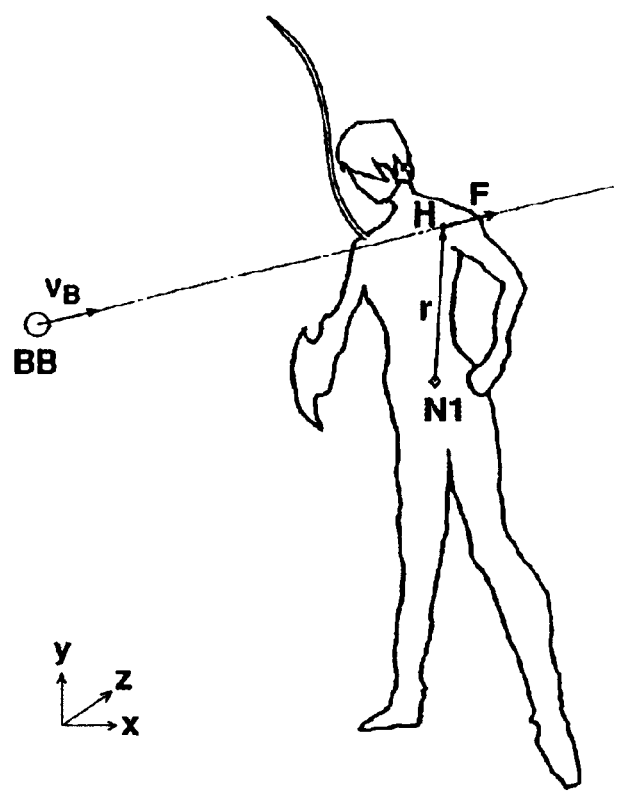
FIG. 23 is an explanatory diagram illustratively showing a force and a radius regarding a torque generated when a bullet ball hits a node assigned ball.

In the next step 114, a bullet ball-related processing subroutine for processing a bullet ball BB shot when a player attacks the character c is carried out. As shown in FIG. 23, a player can attack the character c by operating the input apparatus 3 to shoot a bullet ball BB. Namely, as shown in FIG. 2, a player can shoot a bullet ball BB by operating the + shaped direction button set of the input apparatus 3 to locate a cursor on the character c and push the circular button 33. In the main processing in step 106 described above, the position of the cursor (hitting target coordinates of the bullet ball BB) is fetched when the circular button 33 is pushed, and (a status value of) a bullet ball status flag bbfl expressing a status that a bullet ball BB is shot is changed from 0 to 1. Incidentally, in this embodiment, a case that one bullet ball BB is shot will be explained for simplifying an explanation, but it is possible to shoot a plurality of bullet balls BB.

Figure 6:
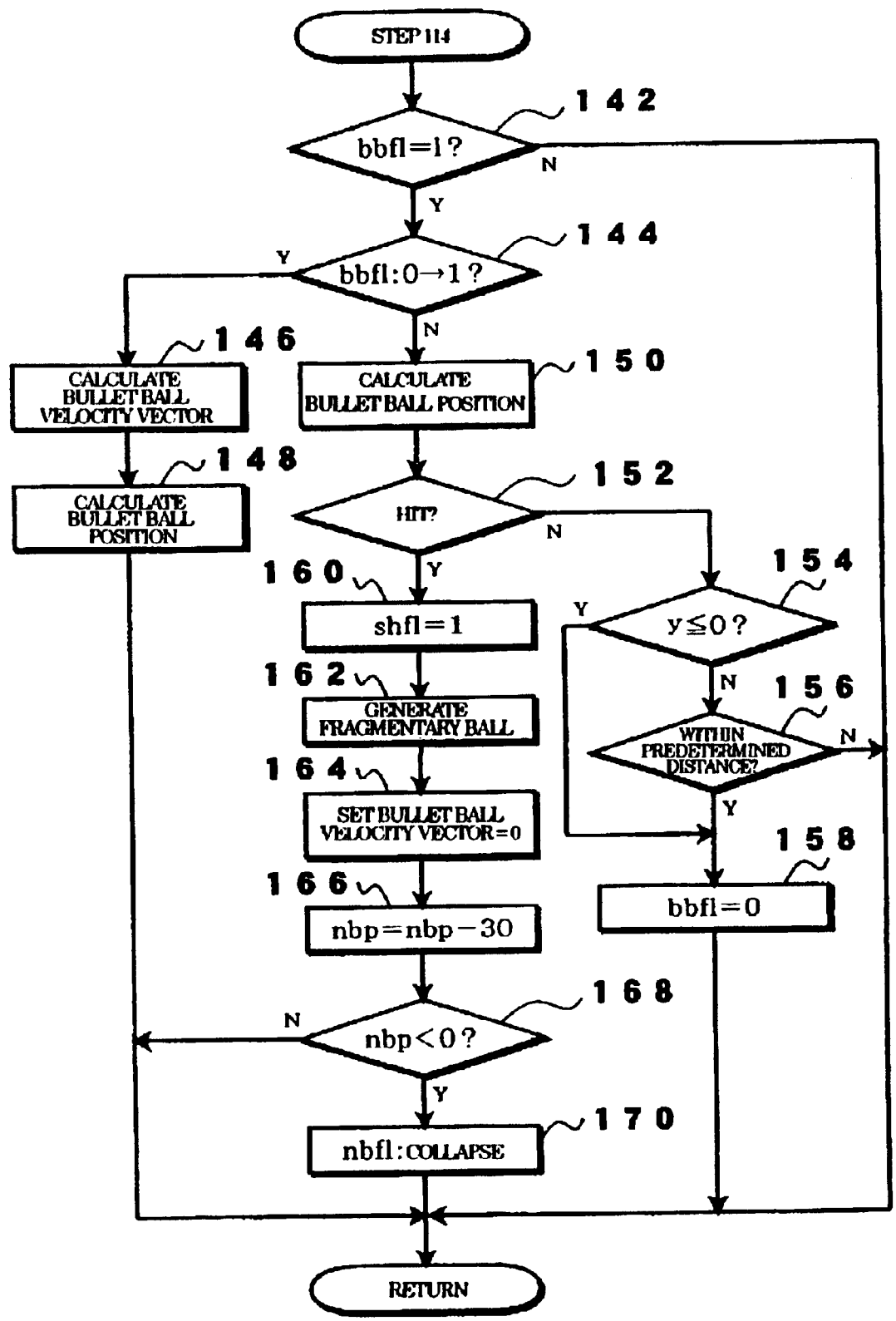
FIG. 6 is a flowchart of a bullet ball-related processing subroutine showing details of step 114 in the rendering calculation processing subroutine.

As shown in FIG. 6, in the bullet ball-related processing subroutine, determination is made in step 142 about whether or not the bullet ball status flag bbfl is 1. When the determination is negative, the bullet ball-related processing subroutine is terminated because a bullet ball BB has not been shot yet, and the routine proceeds to step 116 in FIG. 5. When the determination is affirmative, determination is made in the next step 144 about whether or not the bullet ball status flag bbfl is changed from 0 to 1 by comparing the bullet ball status flag bbfl of the previous vertical blanking interruption time (before 1/60 seconds) with the current bullet ball status flag bbfl in order to judge as to whether or not a bullet ball BB has just been shot by a player.

When the determination is affirmative in step 144, a velocity vector $V_B$ of the bullet ball BB is calculated and memorized in the RAM in the next step 146. A shooting position coordinate of the bullet ball BB is predetermined, and a magnitude (a scalar value) of a velocity (initial velocity) of the bullet ball BB is provided in advance. Accordingly, a directional vector directing from the shooting position coordinate to the hitting target coordinates of the bullet ball BB is calculated, and then the velocity vector $V_B$ can be obtained by multiplying the directional vector and the scalar value of the velocity of the bullet ball BB together (refer to FIG. 23). Here, a directional vector is defined as a unit vector (x, y, z) which has no meaning about its magnitude but has a meaning about its direction only. The directional vector (x, y, z) in this case can be obtained by calculating a difference from the hitting target coordinate (x, y, z) to the shooting position coordinate (x, y, z) to produce the unit vector. Also, in step 146, a distance between the hitting target coordinate and the shooting position coordinate is calculated and memorized in the RAM. Incidentally, a velocity of a bullet ball BB is handled as a fixed value, and a speed damping due to air frictional resistance is not considered.

In the next step 148, the position of the bullet ball BB is calculated and memorized in the RAM, and the bullet ball-related processing subroutine is terminated and the routine proceeds to step 116 in FIG. 5. Assuming that $P_0$ is a shooting position coordinate P(x, y, z) of the bullet ball BB, a position P of the bullet ball BB can be obtained according to an equation of $P = P_0 + V_B \cdot (1/60)$ for each component of the three-dimensional coordinate axes x, y and z.

On the other hand, when the negative determination is made in step 144, the current position P of the bullet ball BB is calculated and memorized in the RAM in step 150. Assuming that $P_{t-1}$ is a position at the previous vertical blanking interruption time and δt is a time of the vertical blanking interruption (1/60 seconds), the current position P of the bullet ball BB can be obtained for each component of the three-dimensional coordinate axes x, y and z by using an equation of $P=P_{t-1}+V_B \cdot \delta t$. Accordingly, in step 150, the latest position (x, y, z) of the bullet ball BB is calculated on the basis of the position last time for each vertical blanking interruption time and is memorized in the RAM. Incidentally, the equations for calculating the position P of the bullet ball BB used in step 148 and step 150 are expressed in a state that the third term of the Euler's motion equations is deleted because the velocity vector $V_B$ of the bullet ball BB is constant (acceleration=0).

Figure 24A:
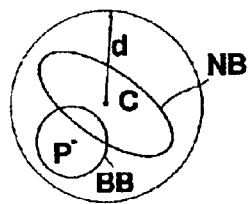
FIGS. 24A and 24B are explanatory diagrams illustratively showing a state where a bullet ball hits a node assigned ball, FIG. 24A showing a hit range and FIG. 24B showing generation of fragmentary balls.

Next, in step 152, determination is made about whether or not the bullet ball BB hits any one of the node assigned balls NB. That is, center coordinates C for all node assigned balls NB assigned to node N in the current frame are calculated (described in detail later), and determination is made about whether or not a (center) position P of the bullet ball BB is in a predetermined radius d of respective of the center coordinates C for the node assigned balls NB, as shown in FIG. 24A. When the bullet ball BB is positioned in the predetermined radius d of a plurality of node assigned balls, it is considered that the bullet ball BB hits a node assigned ball NB which has the nearest distance to the bullet ball BB. Incidentally, in this embodiment, when a radius of the node assigned ball NB constituting a head of the character c is set to 30 to 40, a radius of the bullet ball BB is set to 20 to 30 (when these are actually displayed on the television monitor 4, these sizes become smaller, as described later).

When the negative determination is made in step 152, determination is made in the next step 154 about whether or not a y component (vertical direction coordinate component) of the position P of the bullet ball BB has reached the ground or positioned below it ($y \leq 0$). When the determination is affirmative, the subroutine proceeds to step 158. On the other hand, when the determination is negative, determination is made in step 156 about whether or not the position P of the current bullet ball BB reached a 1.5 times distance (a predetermined distance) as long as a distance between the hitting target coordinate calculated in advance in step 146 and the shooting position coordinate. When the determination is negative, the bullet ball-related processing subroutine is terminated and the routine proceeds to step 116 in FIG. 5. When the determination is affirmative, the bullet ball status flag bbfl is reset from 1 to 0 in the next step 155, and the bullet ball-related processing subroutine is terminated and the routine proceeds to step 116 in FIG. 5. Accordingly, in case that the bullet ball BB does not hit the node assigned ball NB of the character c, when the position P becomes below the ground (y<0) or when the bullet ball BB reaches the predetermined distance, the bullet ball status flag bbfl is set to 0. Incidentally, when the bullet ball status flag bbfl becomes 0, the bullet ball BB is extinguished.

On the other hand, when the determination is affirmative in step 152, hit flags shfl of a specific node assigned ball NB which the bullet ball BB hit and of lower node assigned balls NB therefrom are changed from 0 to 1 in step 160. That is, all the node assigned balls NB have their hit flags shfl, and the hit flags are usually set to 0. As shown in FIG. 22 and FIG. 23, for example, when the bullet ball BB hit a node assigned ball $NB_A$ assigned to a node N7, hit flags shfl of node assigned balls $NB_B$ and $NB_C$ assigned to nodes N8 and N9 which are hierarchically lower than the node N7 are also changed from 0 to 1 according to hierarchy information shown in FIG. 21. Actually, the node assigned balls $NB_A$, $NB_B$ and the like shown in FIG. 23 are respectively divided into about three node assigned balls, which are assigned to the nodes N7, N8, N9 or portions between these nodes, and actual hierarchy is more complicated than the hierarchy shown in FIG. 21. In this embodiment, however, such a constitution is employed that respective of the node assigned balls $NB_A$, $NB_B$ and the like are assigned to respective of the node assigned balls, for simplicity of an explanation.

Figure 24B:
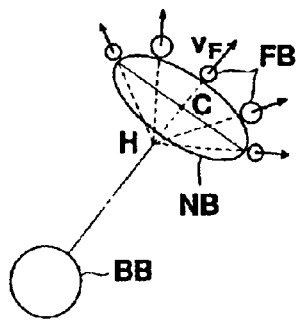

Next, in step 162, as shown in FIG. 24B, a plurality of fragmentary balls FB are generated. Here, the fragmentary balls FB are defined as balls scattered when the bullet ball BB hit a node assigned ball NB (refer to TABLE 1), and they are generated at positions which are angled at 0°, ±30° and ±60° to the direction of the velocity vector $V_B$ of the bullet ball BB from a hit point H (a center point of the bullet ball BB) at a side opposed to the side of the hit point H of the node assigned ball NB which was hit by the bullet ball BB. The respective fragmentary balls FB have different sizes for expressing dispersion and, for example, assuming that an average radius thereof is 5, their radii are randomly set to 4 or 6 such that they have radii of about ±1 on the average radius. Also, in step 162, velocity vectors of the respective fragmentary balls FB are calculated and memorized in the RAM. In order to express dispersion of the respective fragmentary balls FB in velocity, a dispersion coefficient "a" ($0.5 \leq a \leq 1$) is introduced. For example, a velocity of the fragmentary ball FB generated at an angle of 0° from the hit point H can be obtained by multiplying the same directional vector as the directional vector of the bullet ball BB before it is hit by both a scalar value of the velocity vector of the bullet ball BB before it is hit and a dispersion coefficient "a" randomly obtained within a range of $0.5 \leq a \leq 1$. Velocity vectors of the generated fragmentary balls at angles of ±30° and ±60° can be obtained by calculating directional vectors at angles of ±30° and ±60° first, and multiplying respective of these directional vectors by both the scalar value of the velocity vector of the bullet ball BB before hitting and a dispersion coefficient "a" randomly obtained within the range of $0.5 \leq a \leq 1$.

Next, in order to express a state that the bullet ball BB hit a node assigned ball NB constituting the character c and stopped therein (refer to FIG. 31A), a velocity vector of the bullet ball BB is set to (0, 0, 0) in step 164, 30 is subtracted from a power nbp of the hit node assigned ball NB in step 166, and determination is made in step 168 about whether or not the power nbp of the hit node assigned ball NB becomes less than 0. That is, 100 is given to each node assigned ball NB as the power nbp in the initial setting processing in step 102, and when four bullet balls BB hit the same node assigned ball NB, the power nbp of the node assigned ball NB becomes less than 0.

When the determination is negative in step 168, the bullet ball-related processing subroutine is terminated and the routine proceeds to step 116 in FIG. 5. When the determination is affirmative, after status flags nbfl of the node assigned ball NB and node assigned balls NB hierarchically lower than the node assigned ball are set to "Collapse" and memorized in the RAM in the next step 170, the bullet ball-related processing subroutine is terminated and the routine proceeds to step 116 in FIG. 5. Explanation will be further made along the above-described example. As shown in FIG. 22, when a bullet ball BB hit the node assigned ball $NB_A$ assigned to the node N7, status flags nbfl of the node assigned balls $NB_B$ and $NB_C$ assigned to the nodes N8 and N9 lower than the node N7 are also changed from "Normal" to "Collapse". Here, the term "Normal" means a state that a node assigned ball NB is at a position assigned to the node N to which it is to be assigned (refer to FIG. 22), and the term "Collapse" means a state that the node assigned ball NB (for example, $NB_A$, $NB_B$, $NB_C$) separates from (is torn off) the position assigned to the node N (for example, N7) to which it is to be assigned to drop naturally.

Figure 7:
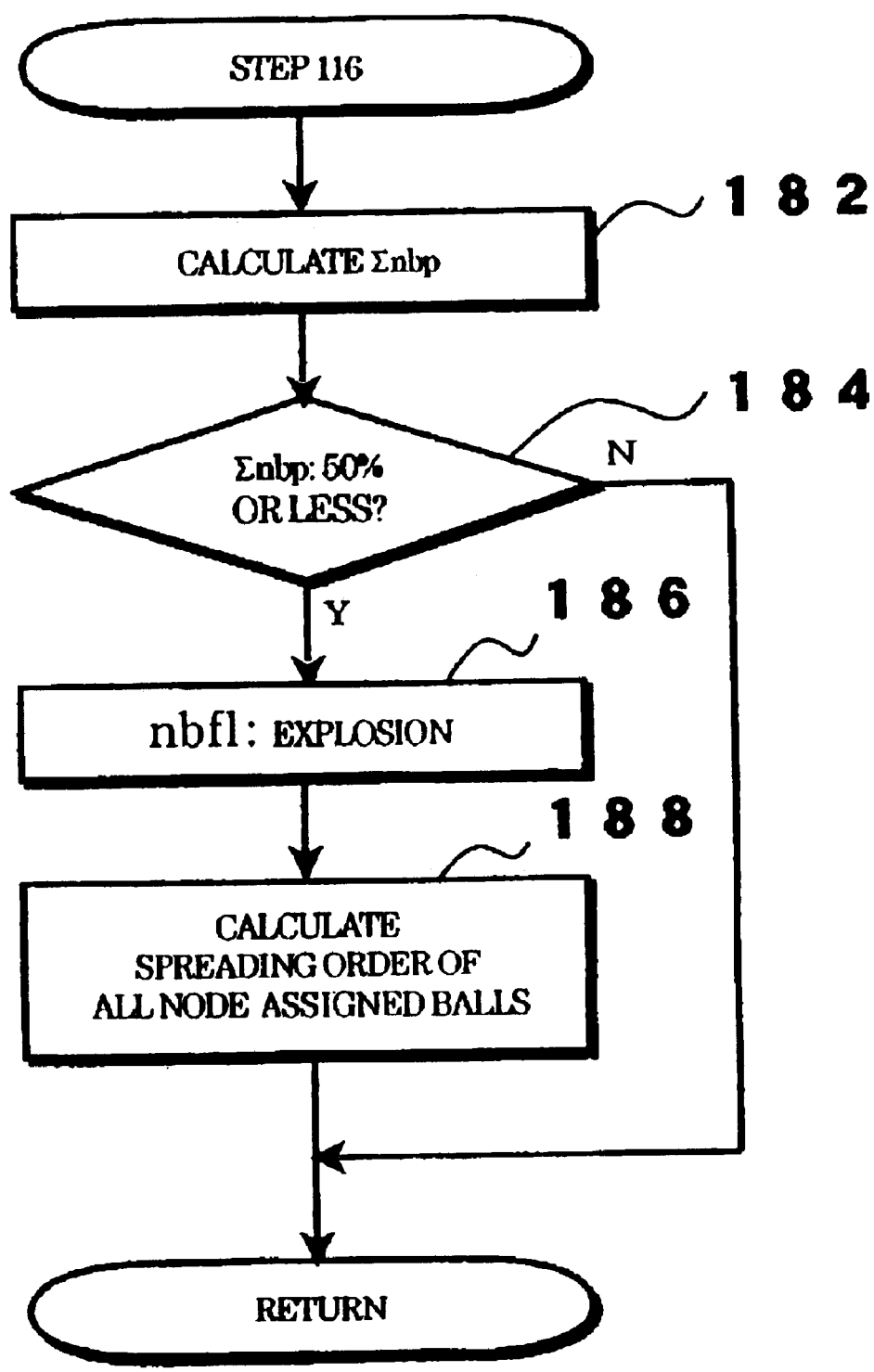
FIG. 7 is a flowchart of an explosion-related processing subroutine showing details of step 116 in the rendering calculation processing subroutine.

In step 116 in FIG. 5, an explosion-related processing subroutine for performing processing relating to explosion of all the node assigned balls NB constituting the character c is carried out. As shown in FIG. 7, in the explosion-related processing subroutine, a sum total (Σnbp) of the powers nbp of all the node assigned balls NB is calculated in step 182, and it is determined in the next step 184 about whether or not the sum total of the powers nbp of all the node assigned balls NB is 50% or less of the sum total of the powers in the initial setting processing. As described above, the power nbp of each node assigned ball NB in the initial setting processing is 100, and when the number of the node assigned balls NB is 18 as shown in FIG. 22, it is determined that Σnbp is 900 or less.

When the determination is negative, it is determined that the character c is not exploded and the explosion-related processing subroutine is terminated and the routine proceeds to step 118 in FIG. 5. On the other hand, when the determination is affirmative, the status flags nbfl of all the node assigned balls NB are set to "Explosion" in step 186, and after spreading order (spreading start time) for all the node assigned balls NB is calculated and memorized in the RAM in the next step 188, the explosion-related processing subroutine is terminated and the routine proceeds to step 118 in FIG. 5.

When the status flag nbfl of the node assigned ball NB becomes "Explosion", the node assigned balls NB constituting the character c are scattered (spread) as oval spherical fragments. Such processing can be employed that all the node assigned balls NB are simultaneously or randomly scattered, however, they are scattered in a time-wise random manner in this embodiment. The center of the explosion becomes a node assigned ball NB which the bullet ball BB hit in step 152 in FIG. 6. When the node assigned ball $NB_A$ shown in FIG. 22 is the center of explosion, the spreading order is set such that time differences occur among respective spreading start times ts, such as, for example, a spreading start time ts of the node assigned balls $NB_A$, $NB_B$, $NB_C$ assigned to the nodes N7, N8, N9=0 (the present time), a spreading start time ts of the node assigned balls NB assigned to the nodes N7, N10, N11=20 (after 20/60 seconds from the present time), a spreading start time ts of the node assigned balls NB assigned to the nodes N7, N6=40, a spreading start time ts of the node assigned balls NB assigned to the nodes N7, N1=60, a spreading start time ts of the node assigned balls NB assigned to the nodes N1, N2, N3=80, and a spreading start time ts of the node assigned balls NB assigned to the nodes N1, N4, N5=100. Also, regarding a direction and an initial velocity of each node assigned ball NB at a time of starting spreading, each initial spreading velocity vector $V_0$ is predetermined such that all the node assigned balls NB are scattered in almost all directions according to explosion.

In step 118 in FIG. 5, determination is made about whether or not metaball update processing and density distribution processing described later are completed regarding all the metaballs. When the determination is negative, a metaball update processing subroutine for updating (producing) object information on the metaballs is performed in step 120.

Figure 8:
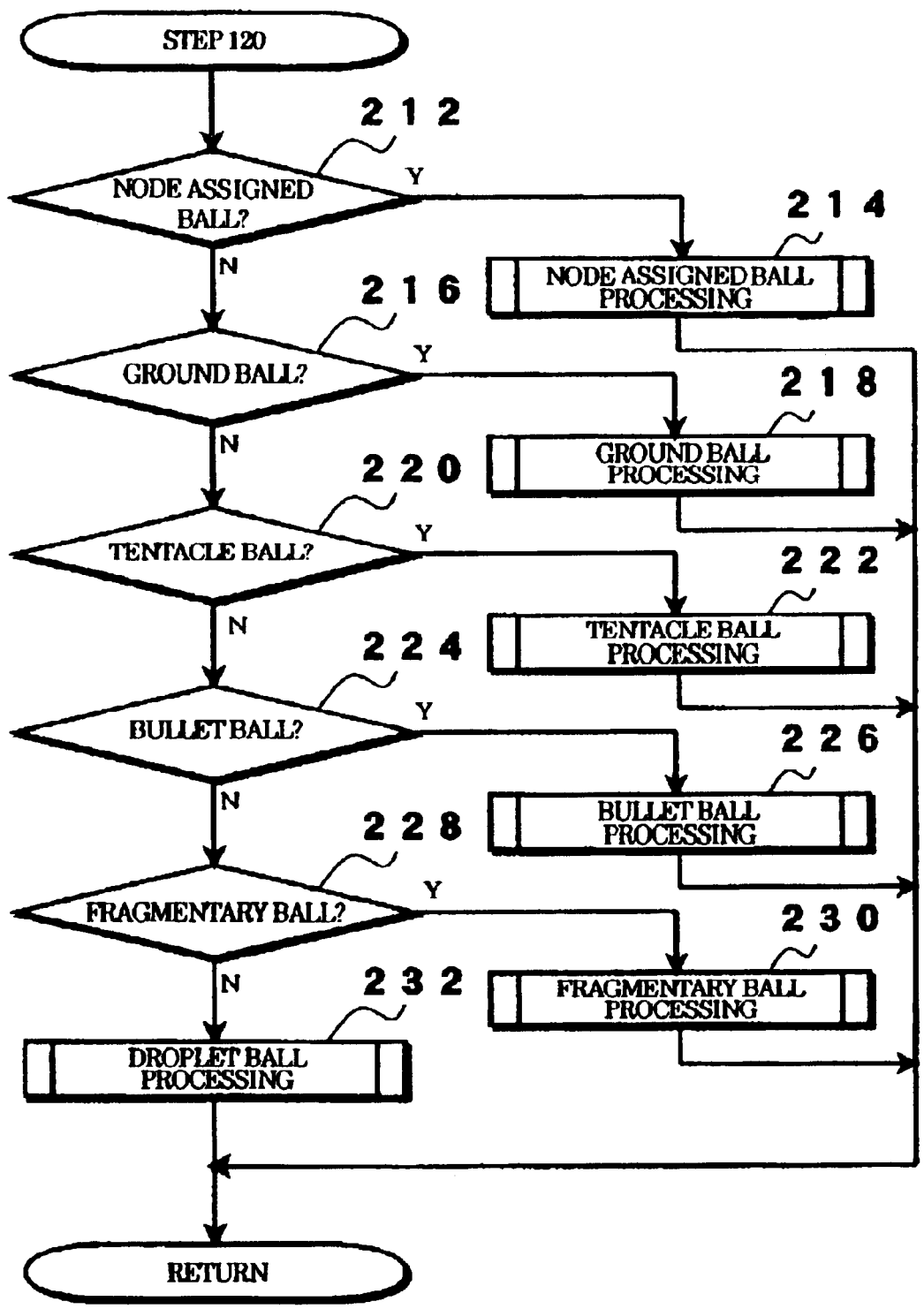
FIG. 8 is a flowchart of a metaball update processing subroutine showing details of step 120 in the rendering calculation processing subroutine.

As shown in FIG. 8, in the metaball update processing subroutine, determination is made in step 212 about whether or not a subject to be processed is a node assigned ball NB. When the determination is affirmative, a node assigned ball processing subroutine describe later is performed in step 214, and when the determination is negative, determination is made in step 216 about whether or not the subject to be processed is a ground ball GB. The term "ground ball GB" is defined as a ball which crawls on the ground according to movement of the character c and is disposed just below the character c (refer to TABLE 1, FIG. 20A), and it is displayed on the television monitor 4 as it is a puddle or a pool disposed just below the character c. When the determination is affirmative, a ground ball processing subroutine described later is performed in step 218. When the determination is negative, determination is made in step 220 about whether the subject to be processed is a tentacle ball TB. The term "tentacle ball TB" means a ball which constitutes a slender tentacle projecting (protruding) from a specific node assigned ball (refer to TABLE 1, FIG. 20A). When the determination is affirmative, a tentacle ball processing subroutine described later is performed in step 222. When the determination is negative, determination is made in step 224 about whether or note the subject to be processed is a bullet ball BB. When the determination is affirmative, a bullet ball processing subroutine described later is performed in step 226. When the determination is negative, determination is made in step 228 about whether or not the subject to be processed is a fragmentary ball FB. When the determination is affirmative, a fragmentary ball processing subroutine described later is performed in step 230. When the determination is negative, a droplet ball processing subroutine is performed in step 232. Incidentally, the term "droplet ball DB" means a ball which drops from a specific node assigned ball NB (refer to TABLE 1, FIG. 20A).

Figure 9:
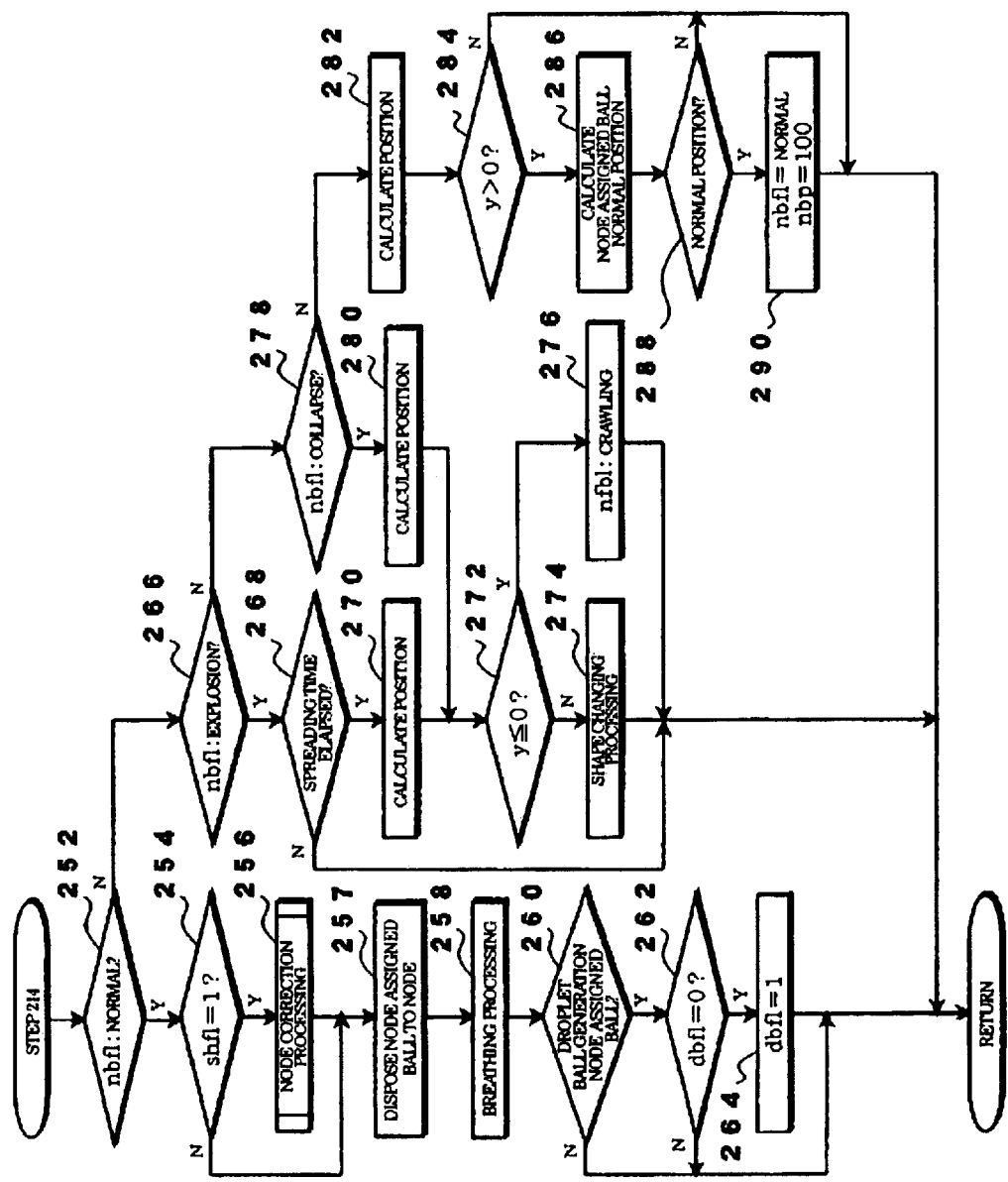
FIG. 9 is a flowchart of a ball-assigned-to-node processing subroutine (hereinafter, referred to as "a node assigned ball processing subroutine") showing details of step 214 in the metaball update processing subroutine.

As shown in FIG. 9, in the node assigned ball subroutine, determination is made in step 252 about whether or not the status flag nbfl of the node assigned ball NB to be processed is "Normal". When the determination in step 252 is affirmative, determination is made in the next step 254 about whether or not the hit flag shfl of the node assigned ball NB to be processed is 1. When the determination is negative, the subroutine proceeds to step 257. When the determination is affirmative, a node coordinate correction processing subroutine for correcting motion data, which are obtained in step 112, of a node N to which the node assigned ball NB to be processed belongs (which is assigned with the node assigned ball NB) in accordance with an impact of the bullet ball BB is performed in step 256.

Figure 10:
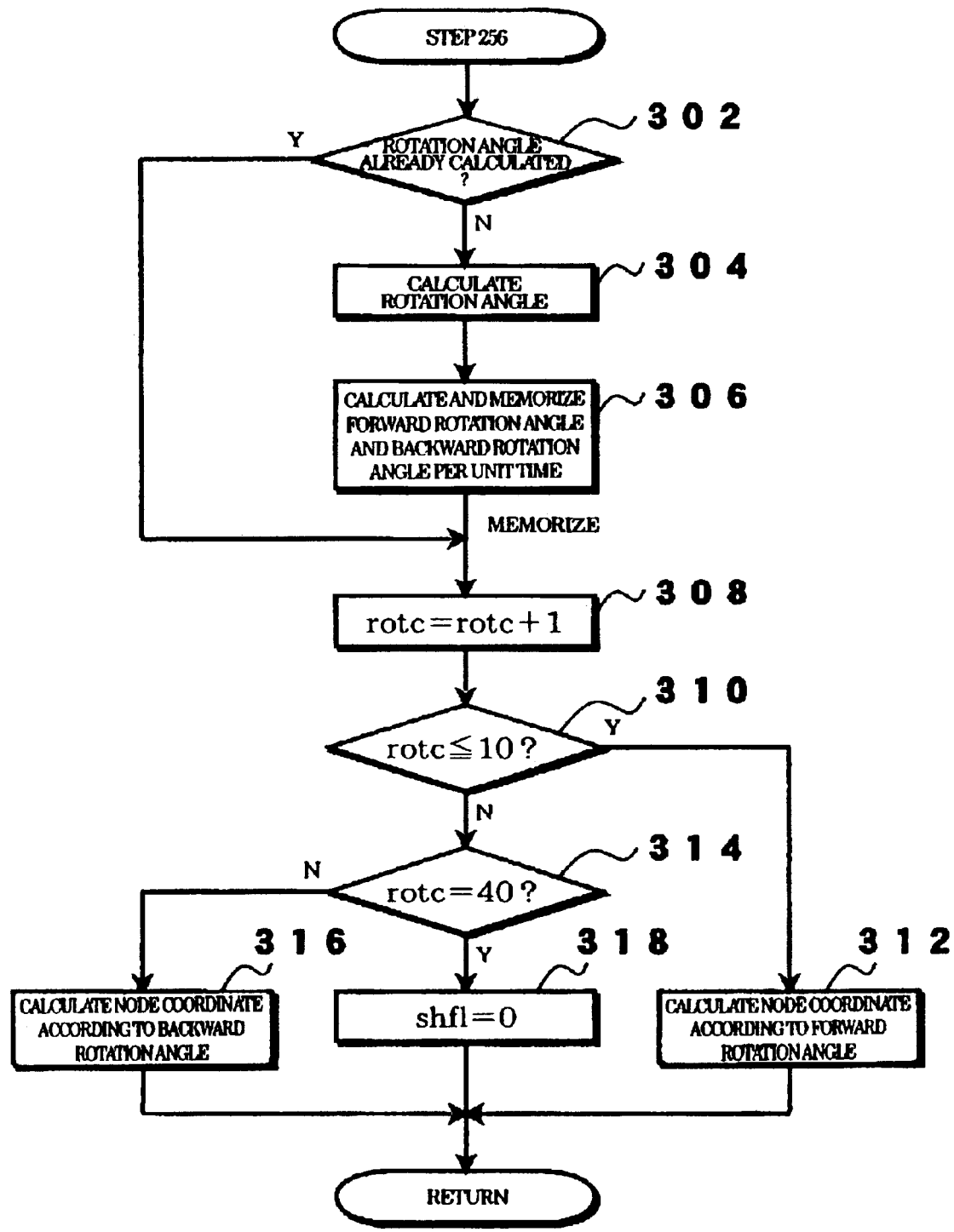
FIG. 10 is a flowchart of a node coordinate correction processing subroutine showing details of step 256 in the node assigned ball processing subroutine.

As shown in FIG. 10, in the node coordinate correction processing subroutine, determination is made in step 302 about whether or not a rotation angle of the node assigned ball NB to be processed has already been calculated. When the determination is affirmative, the subroutine proceeds to step 308, and when the determination is negative, a rotation angle for expressing a bending-back state of the character c due to an impact of the hit bullet ball BB is calculated in the next step 304.

As shown in FIG. 23, when the bullet ball BB hits the hit point H, a torque (impact magnitude) T which is a vector product of a vector r which is directed from the node N1 towards the hit point H and a vector F expressing a force is produced at the hit point H. At this time, in order to express the bending-back of the character c, it is deemed that rotation is made about the node N1 which is a center node of the character c. Incidentally, respective components of the velocity vector $V_B$ (x, y, z) of the bullet ball BB calculated in step 146 may be used for the vector F as they are, or it may be calculated by multiplying the directional vector of the bullet ball BB calculated in step 146 and a predetermined scalar value together.

For example, assuming that the (x, y, z) components of the vector r and the vector F are respectively (0, 10, −2) and (9, 2, −4), the torque T acting on the node N1 is calculated as T=(0, 10, −2)×(9, 2, −4)=(−36, −18, −90), and a rotation amount $A_R$ about the node N1 can be obtained as $\{(-36)^2+(-18)^2+(-90)^2\}^{1/2}$=98.6. Because the rotation amount $A_R$=98.6 is too large for utilizing as it is, the rotation amount is calculated as 1/10 thereof. In order to properly express the bending-back of the character c due to the impact of the hit bullet ball BB in the game, it is preferable that a bending-back angle of the character c is 30° or more, so that calculation is made for the rotation angle A=30+9.86=39.86 (degrees). Incidentally, when the rotation angle A exceeds 60°, the rotation angle A is set to 60° which is a maximum value in order to achieve a proper expression in the game.

Next, in step 306, a forward rotation angle and a backward rotation angle per unit time (1/60 seconds) are calculated and memorized in the RAM. That is, when an explanation is made according to the above example, because a player has a sense of incongruity if the bending-back of the character c when the bullet ball BB hits the character c is rendered by one frame, a rotation of the rotation amount A=39.86/10 (degrees) is rendered by 10 frames (forward rotation angle per unit time Aa=39.86/10=3.986 (degrees)) and the coordinate position is recovered (returned) to the original coordinates position (obtained in step 112) for the node N by 30 frames (backward rotation angle per unit time Ar=39.86/30=1.32 (degrees)). Also, the nodes N8, N9 lower than the node N7 are rotated like the node N7 according to the hierarchy information shown in FIG. 21. Accordingly, in step 306, only the forward rotation angle Aa and the backward rotation angle Ar for the node N to be firstly processed among these nodes are calculated and memorized in the RAM. Incidentally, in order to determine whether or not the rotation angles have already been calculated in step 302, at the time of the hit flag shfl of the node assigned ball NB to be processed being 1, a predetermined area of the RAM which is used for storage (has memorized the rotation angles) in step 306 may be watched.

In step 308, a rotation angle counter rotc is incremented by 1 in order to grasp a rotation state of the current frame, and determination is made in the next step 310 about whether or not the rotation angle counter rotc is 10 or less. When the determination is affirmative, rotation is made in step 312 by the forward rotation angle Aa memorized in the RAM in step 306 regarding the motion data, which are obtained in step 112, of the node N to be processed, and the node coordinate correction processing subroutine is terminated and the routine proceeds to step 257 in FIG. 9. The correction (node correction) of such motion data can be calculated by multiplying a matrix including the motion data and a matrix including the rotation angle as is known in the above-described "3-DIMENSIONAL COMPUTER GRAPHICS" and the like. On the other hand, when the determination is negative, determination is made in the next step 314 about whether or not the rotation angle counter rotc is 40. When the determination is negative, rotation is made in step 316 by the backward rotation angle Ar memorized in the RAM in step 306 regarding the motion data, which are obtained in step 112, of the node N to be processed, and the node coordinate correction processing subroutine is terminated and the routine proceeds to step 257 in FIG. 9. When the determination is affirmative, the hit flag shfl is changed from 1 to 0 in step 318 assuming that the impact of the bullet ball BB has been extinguished, and the node coordinate correction processing subroutine is terminated and the routine proceeds to step 257 in FIG. 9.

Figure 25:
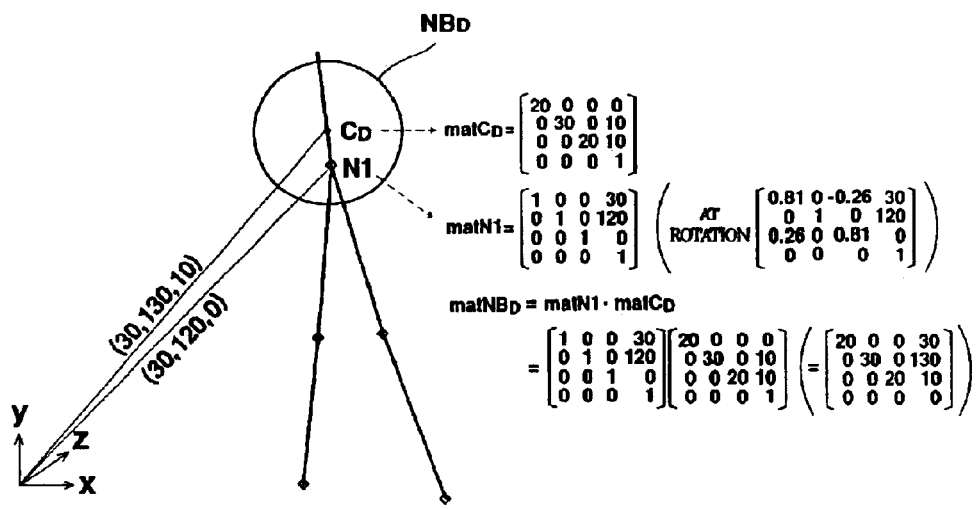
FIG. 25 is an explanatory diagram showing a position of a node and a position of a node assigned ball in global coordinates.

In step 257, the node assigned ball NB to be processed is disposed (assigned) to a corresponding node. As shown in FIG. 25, for example, a node assigned ball $NB_D$ disposed to a node N1 will be explained as an example. Motion data matN1 of the node N1 includes scale information (x, y, z)=(1, 1, 1), (global) translation information (x, y, z)=(30, 120, 0), and rotation information (x, y, z)=(0, 0, 0), and it has been acquired as motion data in the current frame in step 112 (or it is corrected in step 306). The scale information of the node assigned ball $NB_D$ assigned to the node N1 (x, y, z)=(20, 30, 20) and the translation information (x, y, z)=(0, 10, 10) to the node N1 are fixed values which have been determined preliminarily and they can be expressed with a matrix $matC_D$. Since the matrix $matC_D$ is fixed, for example, it can be obtained by creating static model data before preparing the game data. The node assigned ball $NB_D$ is assigned to the node N1 with the matrix $matC_D$. The object information at a global basis (coordinate) for the node assigned ball $NB_D$ can be calculated according to $matNB_D$=matN1·$matC_D$. That is, a center position $C_D$ in the global basis for the node assigned ball $NB_D$ is represented with (30, 130, 10), and the scale (size) is represented with (20, 30, 20). Incidentally, FIG. 25 shows one example of matN1 obtained when rotation is made about y axis relating to the above-described steps 312 and 316, where the scale information takes other than (1, 1, 1). Further, the center coordinates C of all the node assigned balls NB in step 152 whose details have not been explained can be calculated by multiplying matrixes having 4 rows×4 columns together like this step or by adding translation information items of both the matrixes in order to reduce a computation burden.

In the next step 258, a breathing processing for changing the size of the node assigned ball NB to be processed is performed. For example, in case that the size of the node assigned ball $NB_D$ is (20, 30, 20), the node assigned ball NB is changed to the size up to 1.5 times (30, 45, 30) cyclically every once in a vertical blanking period. That is, such a cycle is repeated that the scale information is changed to 1.1 times, 1.2 times, . . . , 1.5 times for respective vertical blanking periods, then it is changed to 1.4 times, 1.3 times, . . . , 1.0 time. The change data of the current scale information can be obtained by memorizing the data of the vertical blanking period last time in the RAM. According to such a processing, the size of each node assigned ball NB is changed so that an appearance where the character c is breathing can be graphically expressed.

In the next step 260, determination is made about whether or not the node assigned ball NB to be processed is a node assigned ball which creates (generates) a droplet ball DB. As shown in FIGS. 20A and 20B, in this example, the node assigned balls NB assigned to the nodes N9, N11 are node assigned balls for creating droplet balls DB. When the determination is negative, the node assigned ball processing subroutine is terminated and the routine proceeds to step 122 in FIG. 5. When the determination is affirmative, determination is made in the next step 262 about whether or not a droplet ball flag dbfl is 0. When the determination is negative in step 262, the node assigned ball processing subroutine is terminated and the routine proceeds to step 122 in FIG. 5. On the other hand, when the determination is affirmative in step 262, the droplet ball flag dbfl is changed from 0 to 1 in the next step 264, and the node assigned ball processing subroutine is terminated and the routine proceeds to step 122 in FIG. 5. Thereby, a droplet ball DB is created.

When the determination in step 252 is negative, determination is made in step 266 about whether or not the status flag nbfl of the node assigned ball NB to be processed is "Explosion". When the determination in step 266 is affirmative, determination is made in the next step 268 about whether or not the spreading start time of the node assigned ball NB to be processed which is calculated in step 188 has elapsed. When the determination is negative, the node assigned ball processing subroutine is terminated because the time has not reached the spreading start time, and the routine proceeds to step 122 in FIG. 5. When the determination is affirmative, a position of the node assigned ball NB is calculated in step 270. As described above, when the node assigned ball NB is positioned above the ground, a spreading velocity $V_S$ thereof is calculated according to $V_S = V_{S-1} - g \cdot \delta t$, but the ball stops when it reaches the ground. A position of the node assigned ball NB is obtained according to the Euler's motion equations for its spreading velocity vector $V_S$ ($P_t = P_{t-1} + V_{S-1} \cdot \delta t$). Incidentally, $V_{S-1}$ represents a spreading velocity of the previous vertical blanking interruption time, g is the gravity acceleration, $\delta t$ represents a vertical blanking interruption time (1/60 seconds), $P_t$ represents a current position, and $P_{t-1}$ represents a position of the previous vertical blanking interruption time, respectively.

In the next step 272, determination is made about whether or not a y-component of the position $P_N$ of the node assigned ball NB to be processed which is calculated in step 270 is 0 or less. When the determination is negative, a shape deformation processing for deforming the node assigned ball NB to be processed to an oval spherical shape in step 274. For example, assuming that scale information before starting spreading of the node assigned ball NB to be processed is (20, 30, 20) and x, y and z components of the current spreading velocity $V_S$ are (3, 4, 5), "a" meeting 20×30×20= (20+a)×(30+a)×(20+5) is calculated by utilizing a numerical value of the z component whose absolute value is the largest among the x, y and z components of the spreading velocity $V_S$ (a=−2.5), the scale information of the node assigned ball NB to be processed is calculated as (20−2.5, 30−2.5, 20+5)= (18.5, 27.5, 25) such that a volume of the node assigned ball NB before spreading and a volume during spreading become approximately equal to each other, and the node assigned ball processing subroutine is terminated and the routine proceeds to step 122 in FIG. 5. Incidentally, just when the spreading velocity $V_S$ is damped to 0, the node assigned ball NB to be processed becomes (20, 30, 20) which is equal to the scale information before starting the spreading.

On the other hand, when the node assigned ball NB drops naturally, assuming that a velocity of the y-component of the node assigned ball NB calculated in step 270 (or step 280 described later) is 3 (m/s), "a" meeting 20×30×20=(20+a)× (30+3)×(20+a) is calculated (a=−1) by perceiving the absolute value of the velocity of the y-component, scale information of the node assigned ball NB to be processed is calculated as (20−1, 30+3, 20−1)=(19, 33, 19) such that a volume of the node assigned ball NB before spreading and a volume thereof during natural dropping become approximately equal to each other (refer to FIG. 32B), and the node assigned ball processing subroutine is terminated and the routine proceeds to step 122 in FIG. 5. Incidentally, in this case, calculation of "a" may be made by using 20×30×20= (20×a)×(30×1.1)×(20×"a"). At this time, (30×1.1) means (30+3).

Thus, the scale information of the node assigned ball NB to be processed is decided depending on the spreading velocity $V_S$, and the matrix matNB constituting the object information of the node assigned ball NB of the "Explosion" status together with the translation information can be calculated in step 270 (or step 280 described later).

Figure 26:
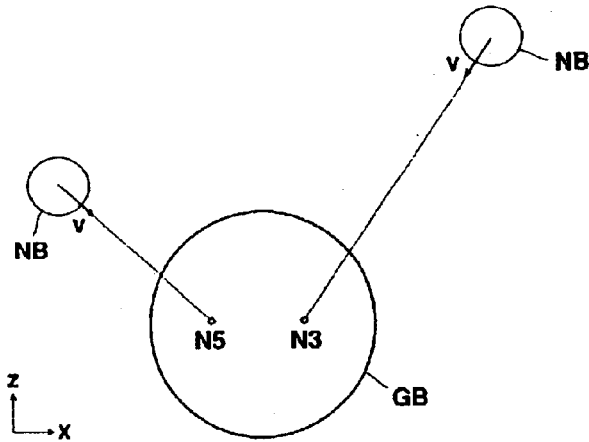
FIG. 26 is an explanatory diagram illustratively showing a state where a node assigned ball crawls on the ground.

On the other hand, when the determination in step 272 is negative, after the status flag nbfl of the node assigned ball NB is set to "Crawl" and memorized in the RAM in step 276, the node assigned ball processing subroutine is terminated and the routine proceeds to step 122 in FIG. 5. Here, the term "Crawl" means that, after the node assigned ball NB reaches the ground, as shown in FIG. 26, it crawls towards the node N3 or the node N5 disposed at a foot portion of the character c with a predetermined constant velocity V (scalar value), and after arriving at the node N3 or the node N5 the node assigned ball NB moves towards the position of the node N to which it is assigned originally via the nodes N constituting hierarchy, as shown in FIG. 20B. For example, when the status flag nbfl of the node assigned ball $NB_A$ shown in FIG. 22 is set to "Crawl", after the node assigned ball $NB_A$ crawls on the ground towards the node N3 with retaining its shape as is when the ball has reached the ground and it reaches the node N3, then it moves up to the position of the node N7 to which it is assigned originally via the nodes N2 and N1. Also, in case of the node assigned ball NB which is assigned to the node 10 and which is disposed at an opposed side to the node N7, after the ball NB crawls on the ground towards the node N5 with retaining its shape as is when the ball has reached the ground and it reaches the node N5, then it moves up to the position of the node N10 to which it is assigned via the nodes N4, N1 and N7. Therefore, depending on a left or right node with which the node assigned ball is assigned in accordance with the hierarchy information shown in FIG. 21, a node which is a reaching target when the node assigned ball NB crawls on the ground and nodes through which the ball passes are different.

When the determination in step 266 is negative, determination is made in step 278 about whether or not the status flag nbfl of the node assigned ball NB to be processed is "Collapse". When the determination is affirmative, a position of the node assigned ball NB to be processed is calculated in step 280. In "Collapse", a state where the node assigned ball NB to be processed is torn off from the character c to fall naturally is rendered. For this reason, the x-component, the y-component and the z-component just before the status flag nbfl of the node assigned ball NB to be processed becomes "Collapse" are maintained as they are (in a "Normal" status) like the calculation performed when the ball is positioned above the ground instep 270. Incidentally, the velocity of the current y-component used as $V_{t-1}$ in the next vertical blanking interruption time (1/60 seconds), $V_t = -g \cdot \delta t + V_{t-1}$, is also calculated and memorized in the RAM, and the subroutine proceeds to step 272.

On the other hand, when the determination in step 278 is negative, namely, when a status flag nbfl of the node assigned ball NB to be processed is "Crawl", a position of the node assigned ball NB to be processed is calculated in step 282. Since motion data about the positions of the nodes N3 and N5 are changed for each frame, a direction in which the node assigned ball NB crawls on the ground varies for each vertical blanking interruption time. For this reason, a velocity vector $V_{cr}$ ($V_{cr} = V \cdot V_U$) is obtained by calculating a directional vector $V_U$ from the current position (reaching target) of the node N3 (or the node N5) and from the position of the node assigned ball NB to be processed at the previous vertical blanking interruption time according to the matrix matN3 (or the matN5), and then by multiplying the same by a velocity V which is expressed by a scalar value, and it is memorized in the RAM. A (center) position $P_{cr}$ of the node assigned ball NB to be processed can be calculated according to $P_{cr} = P_{t-1} + V_{cr} \cdot \delta t$. Incidentally, when the node assigned ball NB to be processed is crawling on the ground, only an upper half sphere of the oval spherical node assigned ball NB to be processed is displayed on the television monitor 4.

Also, after the node assigned ball has reached the node N3 (or the node N5), the reaching target is sequentially altered to the node N2 (or the node N4), N1, and the position is calculated until the position of the node assigned ball NB to be processed reaches the position of the status flag nbfl "Normal". Thereby, the matrix matNB which becomes the object information of the node assigned ball NB of the "Crawl" state can be obtained.

As described above, after the node assigned ball NB reaches the node N3 (or the node N5), it moves towards the node N2 (or the node N5). In other words, the y-component of the node assigned ball NB becomes more than 0. Accordingly, determination is made in step 284 about whether or not the y-component of the translation information of the node assigned ball NB is larger than 0. When the determination is negative, the node assigned ball processing subroutine is terminated in order to continue the state where the ball is crawling on the ground and the routine proceeds to step 122 in FIG. 5. When the determination is affirmative, a position of the node assigned ball NB to be processed at "Normal" is calculated in the next step 286 (refer to FIGS. 22 and 25) Determination is made in step 288 about whether or not the node assigned ball NB to be processed is returned to the normal position by judging whether or not the current position of the node assigned ball NB to be processed is within a predetermined radius of the position at "Normal" which is calculated in step 286. When the determination is negative, in order to continue a state where the ball is crawling between the nodes, the node assigned ball processing subroutine is terminated and the routine proceeds to step 122 in FIG. 5. On the other hand, when the determination is affirmative, the status flag nbfl of the node assigned ball NB to be processed is set to "Normal" and the power nbp of the node assigned ball to be processed is set to 100 in the step 290, and the node assigned ball processing subroutine is terminated and the routine proceeds to step 122 in FIG. 5.

Next, the ground ball GB will be explained with reference to FIG. 27A. The ground ball GB is constituted with four small ground balls GBa, GBb, GBc and GBd (y-components of the translation information are 0) disposed on the ground. When the respective of small ground balls GBa to GBd separate from one another, it appears that the ground ball GB is divided to plural pieces, and a player feels it strange. Therefore, the scale information and the translation information of the respective small ground balls are adjusted every frame, so that one ground ball GB is formed. For this reason, the small ground balls GBa to GBd are associated to the nodes N3 or the node N5, and a concept of an imaginary or virtual spring is introduced. That is, the centers of the small ground balls Gba, GBb and the node N5, the centers of the small balls GBc, GBd and the node N3 are respectively connected to each other via imaginary springs. Also, the centers of the small ground balls Gba, GBb, and the centers of the small ground balls GBc and GBd are respectively connected to each other via other imaginary springs.

Figure 11:
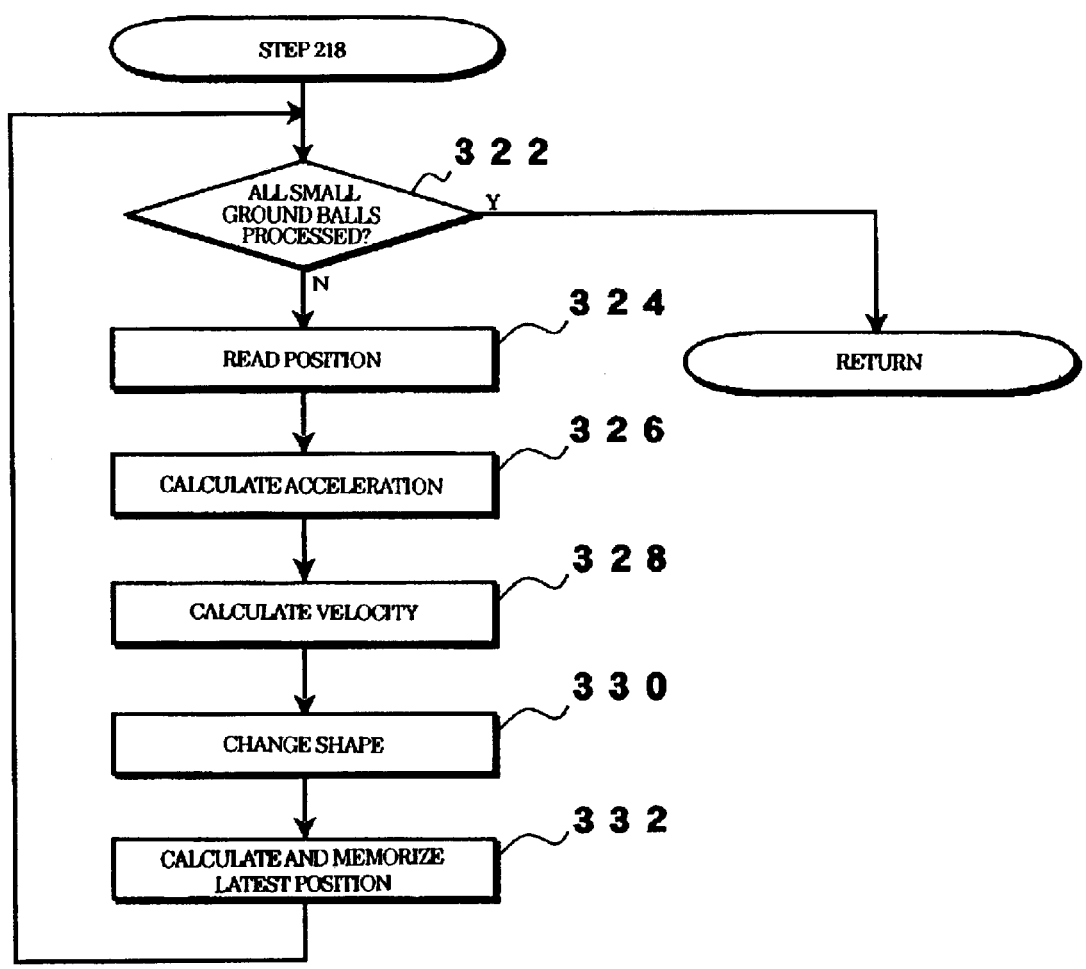
FIG. 11 is a flowchart of a ground ball processing subroutine showing details of step 218 in the metaball update processing subroutine.

As shown in FIG. 11, in the ground ball processing subroutine, determination is made in step 322 about whether or not all the small ground balls have been processed, and when the determination is negative, the position of a subject small ground ball at the previous vertical blanking interruption time and the current position of the node N associated with the subject small ground ball are read out in the next step 324 and an acceleration α acting on the subject small ground ball is calculated in step 326.

As shown in FIG. 27B, the small ground ball GBa will be explained as an example. A distance x between the centers of the node N5 and the small ground ball GBa can be obtained from the position read out in step 324. Assuming that k is a predetermined spring constant and α1 is an acceleration received from the node N1, a force F of F=−kx=mα$_1$ acts on the imaginary spring. Now, assuming that a mass m of the small ground ball GBa is 1, the acceleration α$_1$ can be obtained as α$_1$=−kx. As described above, another imaginary spring exists between the small ground balls GBa and GBb. In order to calculate an acceleration α2 according to this imaginary spring, the positions of the subject small ground ball GBa and the small ground ball GBb at the previous vertical blanking interruption time are read out to obtain the distance x between the both. The acceleration α$_2$ is calculated according to F=−kx=α$_2$ (m=1). The acceleration α can be obtained by adding the acceleration α$_1$ and the acceleration α$_2$ for each of (x, y, z) components.

In the next step 328, the x-component and the z-component of the velocity V$_t$ of the subject small ground ball are calculated according to V$_t$=V$_{t-1}$+α·δt and memorized in the RAM. In this calculation equation, V$_{t-1}$ represents a velocity of the small ground ball at the previous vertical blanking interruption time. Incidentally, since the y-component of the translation information of the ground ball GB is constantly 0, it is unnecessary to calculate the component (V$_t$=(x, 0, z)).

In the next step 330, the scale and the velocity V$_{t-1}$ of the subject small ground ball at the previous vertical blanking interruption time are read out, and the size of the subject small ground ball is calculated from the velocity V$_t$ calculated in step 328 and memorized in the RAM as a current scale. For example, when a scale of the small ground ball GBa at the previous vertical blanking interruption time is (20, 0, 30) and a velocity V$_{t-1}$ is (10, 0, 5), the current scale of the z-component of the small ground ball GBa is calculated (a=10) from 20×30=(20+10)×(30−a) in order to keep the size (area) of the small ground ball GBa constant in view of the x-component (10) whose absolute value is the largest among the x- and z-components of the velocity V$_{t-1}$. The scale of the current small ground ball GBa becomes (30, 0, 20) by this calculation. Incidentally, the position at the previous vertical blanking interruption time is used for the current position of the small ground ball GBa (refer to step 332 described later).

Therefore, in steps 324 to 330, when the distance between the small ground balls is increased according to movement of the node N3 (or the node N5), the force F according to the imaginary spring is increased are increased (the acceleration α of the small ground ball GBa and the velocity V$_t$ so as the small ground ball GBa to follow the node N3 (or the node N5) As a result, since the scale of the small ground ball is altered to be larger in a direction on which the acceleration α acts, a tendency where the small ground balls do not separate with each other can be maintained and the ground ball GB can be rendered as one piece.

Next, in step 332, the latest position P$_t$ of the subject small ground ball is calculated and memorized in the RAM, and the subroutine returns to step 322. The latest position P$_t$ can be calculated according to P$_t$=P$_{t-1}$+V$_t$·δt. Incidentally, P$_{t-1}$ represents a position of the subject small ground ball at the pervious vertical blanking interruption time. When the determination in step 322 is affirmative, the node assigned ball processing subroutine is terminated and the routine proceeds to step 122 in FIG. 5.

Figure 12:
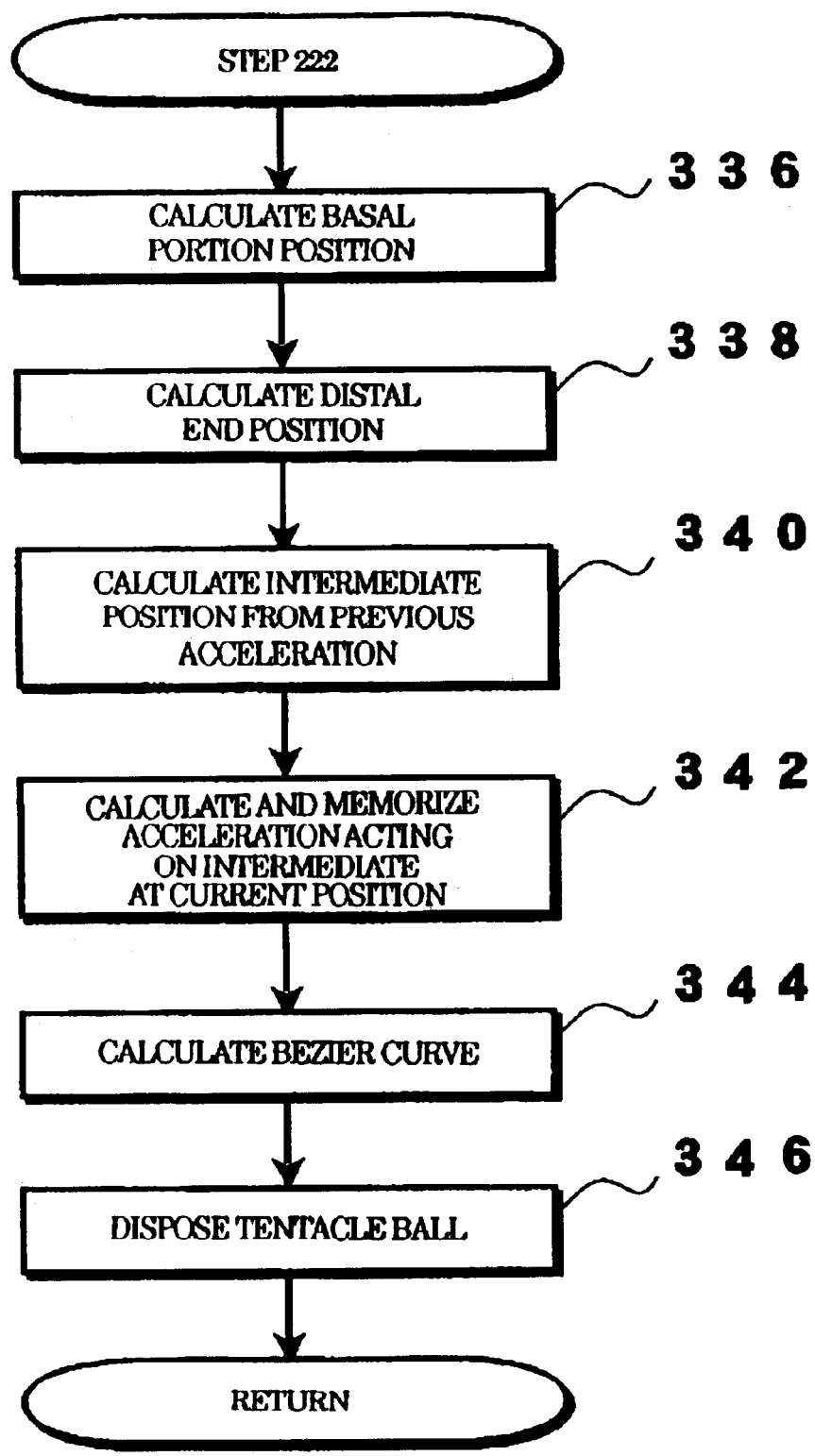
FIG. 12 is a flowchart of a tentacle ball processing subroutine showing details of step 222 in the metaball update processing subroutine.

As shown in FIG. 12, in the tentacle ball processing subroutine, a proximal portion position P$_0$ of the tentacle ball TB is calculated in step 336 (refer to FIG. 20A). The proximal portion position P$_0$ of the tentacle ball TB is positioned at the center (for example, (50, 120, 100)) of a specific node assigned ball NB (in this example, a node assigned ball $NB_E$ assigned to the node N7 and disposed at a shoulder of the character c), when the status flag nbfl of the node assigned ball $NB_E$ is "Normal". However, when the status flag nbfl of the node assigned ball $NB_E$ is "Explosion" (more correctly, after starting spreading time), "Collapse" or "Crawl" (more correctly, crawl at y=0), the proximal portion position $P_0$ of the tentacle ball TB is positioned on a surface of the ground ball GB as (50, 0, 100) where the y-component is 0. While the status flag nbfl of the node assigned ball $NB_E$ is "Crawl" during y=0, the proximal portion position $P_0$ of the tentacle ball TB is maintained without any change even when the vertical blanking interruption is repeated. When the status flag nbfl of the node assigned ball $NB_E$ is "Crawl" and y becomes more than 0, the proximal portion position $P_0$ is located at the center of the node assigned ball $NB_E$.

Therefore, when the status flag nbfl of the node assigned ball $NB_E$ is other than "Normal" and the node assigned ball $NB_E$ becomes "Explosion" (after starting spreading time), "Collapse" or "Crawl", the proximal portion position $P_0$ of the tentacle ball TB is rendered so as to fix to the ground ball GB. When the status flag nbfl is "Crawl" and the y-component of the node assigned ball $NB_E$ becomes more than 0, the proximal portion position $P_0$ is rendered so as to return to the original position together with the node assigned ball $NB_E$ in a state that it is fixing to the center of the node assigned ball $NB_E$ to.

In the next step 338, a distal end position $P_5$ of the tentacle ball TB is calculated. As shown in FIG. 20A, when a player character exits, the distal end position 5 of the tentacle ball TB may be set to follow movement of the player character so as to menace the player character. In this example, however, assuming that any player character does not exit, the player is menaced by moving the distal end portion $P_5$ of the tentacle ball TB towards an imaginary camera. That is, an invisible target point $P_{\delta t}$ is predetermined as motion data, and a position spaced by a definite distance (for example, (10, 10, 20) from a target point $P_{\delta t-1}$ at the previous vertical blanking interruption time (refer to FIG. 29C)) is calculated as the distal end position $P_5$ of the tentacle ball TB.

Figure 29A:
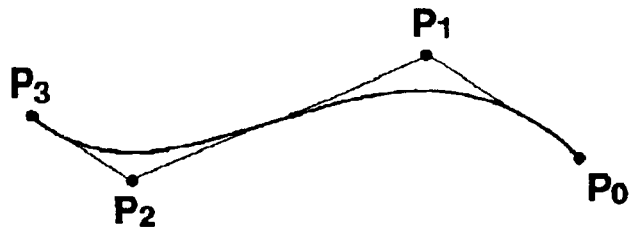
FIGS. 29A, 29B and 29C are explanatory diagrams of Bezier curves, FIG. 29A showing a Bezier curve formed by four points, FIG. 29B showing a case that Bezier curves formed by four points are simply connected to each other, and FIG. 29C showing a case that Bezier curves formed by four points are smoothly connected to each other.
Figure 29B:
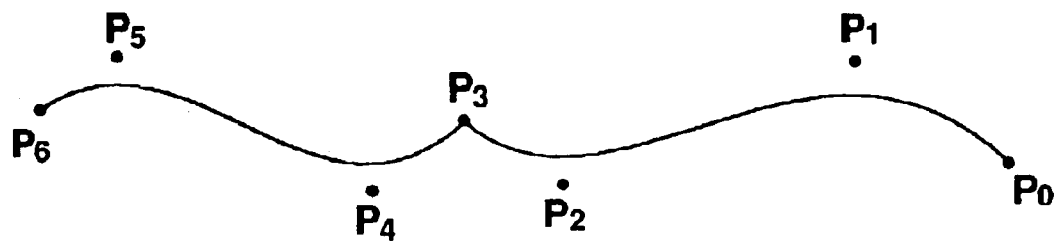
Figure 29C:
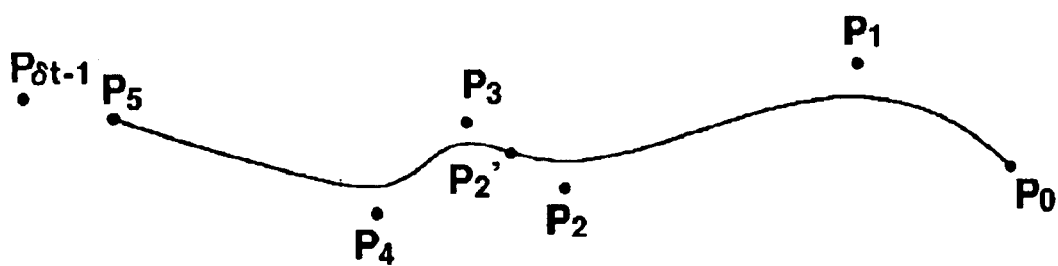

As shown in FIG. 20A, the tentacle ball TB is rendered as a smooth curve by utilizing the Bezier curve between the proximal portion position $P_0$ and the distal end position $P_5$. As shown in FIG. 29A, the Bezier curve is generally formed by four points ($P_0$, $P_1$, $P_2$, $P_3$). In this example, intermediate points which are more than the four points are used in order to express the tentacle ball TB in a real manner. In this case, as shown in FIG. 29B, when the Bezier curves formed by four points are connected to each other, the point $P_3$ becomes a discontinuous point (smoothness is lost). For this reason, as shown in FIG. 29C, a point $P_2'$ is provided at an intermediate point between the point $P_2$ and the point $P_3$ so that the tentacle ball TB is rendered by a smooth curve.

Figure 30A:
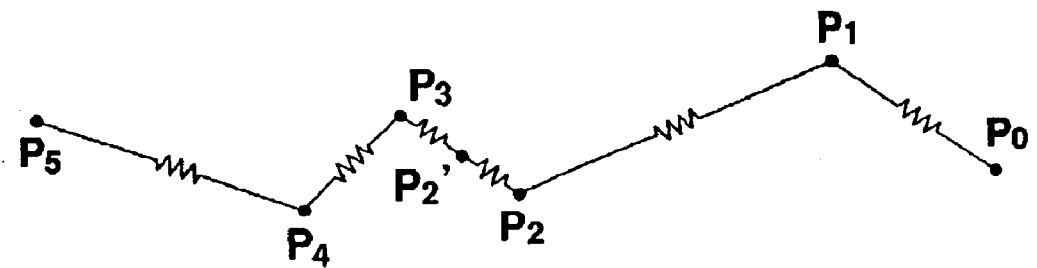
FIGS. 30A, 30B and 30C are diagrams illustratively showing virtual springs of tentacle balls, FIG. 30A showing tentacle balls connected by virtual springs, FIG. 30B showing forces acting on an intermediate point $P_1$, at a time of a previous vertical retrace line interruption, and FIG. 30C showing forces currently acting on the intermediate point $P_1$.
Figure 30B:
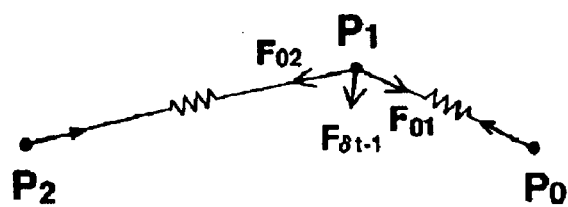

As shown in FIG. 30A, the proximal portion, the distal end portion, and the intermediate points of the tentacle ball TB are connected by imaginary springs. Now, by paying an attention to the intermediate point $P_1$, a case in which a position of the current intermediate point $P_1$ is calculated will be explained in detail. As shown in FIG. 30B, a force $F_{\delta t-1}$ which was acting on the intermediate point $P_1$ at the previous vertical blanking interruption time is expressed by a vector according to $F_{\delta t-1}=F_{01}+F_{02}$. Forces $F_{01}$ and $F_{02}$ express forces where an imaginary spring connected to the proximal portion point $P_0$ and an imaginary spring connected to the intermediate point $P_2$ were respectively acting on the intermediate point $P_1$ at the previous vertical blanking interruption time. Assuming that a distance between the proximal portion position $P_0$ at the previous vertical blanking interruption time and the intermediate point $P_1$ at the previous vertical blanking interruption time is expressed as x, a spring constant of the imaginary springs is expressed as k, and an acceleration of the intermediate point $P_1$ at the previous vertical blanking interruption time according to the imaginary spring connected to the proximal portion position $P_0$ is expressed as $\alpha_{01}$, the force $F_{01}$ can be obtained as $F_{01}=-kx=m\alpha_{01}$. In case of the mass m=1, the acceleration $\alpha_{01}$ can be obtained as $\alpha_{01}=-kx$. In the same manner, the force $F_{02}$ can be obtained as $F_{02}=-kx=m\alpha_{02}$. Incidentally, $\alpha_{02}$ expresses an acceleration of the intermediate point $P_1$ at the previous vertical blanking interruption time according to an imaginary spring connected to the intermediate point $P_2$. Therefore, an acceleration $\alpha_{t-1}$ which was acting on the intermediate point $P_m$ at the previous vertical blanking interruption time can be obtained according to $\alpha_{t-1}=\alpha_{01}+\alpha_{02}$. The intermediate point $P_1$ moves in a direction of this acceleration $\alpha_{t-1}$. The reason why respective intermediate points including the intermediate point $P_1$ by using the acceleration, the velocity and the position at the previous vertical blanking interruption time are calculated, is to render an aspect that changes in the positions of the proximal portion position $P_0$ and the distal end position $P_5$ are propagated to the adjacent intermediate points sequentially via the imaginary springs for each 1/60 seconds in both directions of a direction from the proximal portion position $P_0$ to the intermediate points $P_1, P_2, \ldots, P_4$ and a direction from the distal end position $P_5$ to the intermediate points $P_4, P_3, \ldots, P_1$.

In step 340, the accelerations $\alpha_{t-1}$ which were acting on the intermediate points $P_1$, $P_2$, $P_2'$, $P_3$ and $P_4$ (hereinafter, referred to as "an intermediate point $P_m$" when these intermediate points are named generally) at the previous vertical blanking interruption time, the velocity $V_{t-1}$, and the position $P_{t-1}$ of the intermediate point $P_m$ at the previous vertical blanking interruption time are read out, and the current position $P_t$ of the intermediate point $P_m$ is calculated. Assuming that a velocity of the current intermediate point $P_m$ is expressed as $V_t$ ($=V_{t-1}+\alpha_{t-1}\cdot\delta t$), a position of the current intermediate point $P_t$ is given according to $P_t=P_{t-1}+V_{t-1}\cdot\delta t$.

Figure 30C:
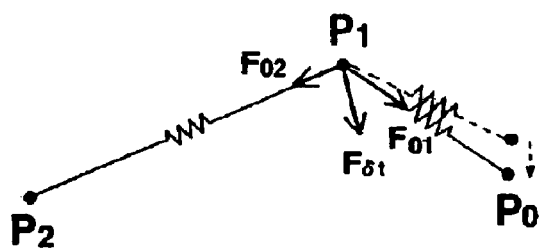

In the next step 342, as shown in FIG. 30C, the acceleration $\alpha_t$ and the velocity $V_t$ are calculated from the force $F_t$ acting on the current position $P_t$ of the intermediate point $P_m$ and they together with the current position $P_t$ are memorized in the RAM, so that the subroutine is ready for calculation in step 340 at the next vertical blanking interruption time. Next, in step 344, the Bezier curve expressed by the proximal portion position $P_0$, the distal end position $P_5$ and the intermediate point $P_m$ calculated in steps 336, 338 and 340 is calculated and the tentacle ball TB is disposed on the Bezier curve in the next step 346, and the tentacle ball processing subroutine is terminated and the routine proceeds to step 122 in FIG. 5. Incidentally, the thickness (diameter) of the tentacle ball TB is preliminarily defined and the concept of the imaginary springs is introduced to the tentacle ball. TB, so that the tentacle ball TB becomes stretchable/retractable (changeable in a distance among the proximal portion position $P_0$, the distal end position $P_5$ and the intermediate point $P_m$). For this reason, in this example, the tentacle ball TB can be changed in thickness among the proximal portion position $P_0$, the distal end position $P_5$ and the intermediate point $P_m$ of the tentacle ball TB in inverse proportion to stretching/retracting of the tentacle ball.

Figure 13:
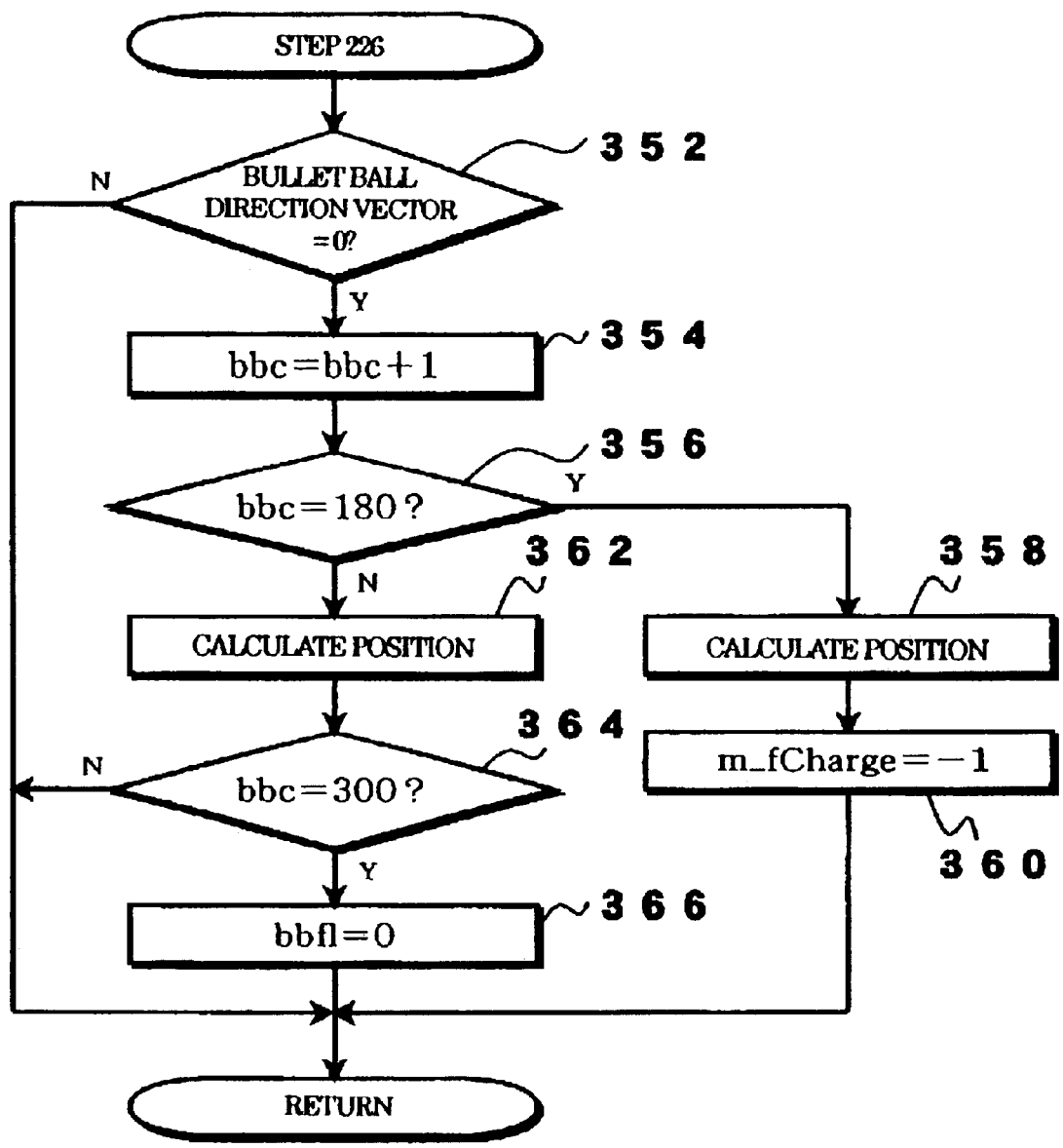
FIG. 13 is a flowchart of a bullet ball processing subroutine showing details of step 226 in the metaball update processing subroutine.

As shown in FIG. 13, in the bullet ball processing subroutine, determination is made about whether or not the direction vector of the bullet ball BB is 0 (refer to step 164 in FIG. 6). When the determination is negative, the bullet ball processing subroutine is terminated and the routine proceeds to step 122 in FIG. 5. When the determination is affirmative, a bullet ball counter bbc is incremented by 1 in step 354, and determination is made in the next step 356 about whether or not the bullet ball counter bbc is 180. Incidentally, a timing where bullet ball counter bbc becomes 180 is after 180×1/60=3 (seconds) from a time when the direction vector of the bullet ball becomes 0.

When the determination is affirmative, a position of the bullet ball BB after hitting the node assigned ball NB is calculated in the next step 358. Incidentally, the position of the bullet ball BB before hitting has already been calculated in step 148 or 150 in FIG. 6. As shown in FIG. 32A, when the bullet ball BB hits the node assigned ball NB, the direction vector becomes 0, so that the bullet ball BB stops at a hit point H which is a center of the bullet ball BB in a state that it's point enters into the node assigned ball BB. However, since the position of the node N with which the hit node assigned ball NB is assigned is updated for each frame, the hit node assigned ball BB moves on the global coordinates. As a result, the bullet ball BB also moves on the global coordinates. For this reason, in step 358, a coordinates system (x, y, z) of the hit point H where the center of the hit node assigned ball NB is made 0 was calculated in advance in step 164, by using the coordinates system (x, y, z), a position (50, 10, 130) of the center of the bullet ball BB to the center of the hit node assigned ball NB on the global coordinates is calculated as shown in FIG. 28. Incidentally, FIG. 28 shows an example that the coordinate system (x, y, z) of the hit point H is made (1, 0, 0) when the center of the node assigned ball NB is set to 0.

In the next step 360, a density coefficient m__fCharge (described later) used for calculating an outer shape of a metaball is changed from 1 which is a normal value to −1, and the bullet ball processing subroutine is terminated and the routine proceeds to step 122 in FIG. 5. Incidentally, by changing the density coefficient m__fCharge to −1, the bullet ball BB is made invisible, as shown in FIG. 31B, and the hit node assigned ball BB into which a portion (point) of the bullet ball BB is entered is rendered in a state that it is bored.

On the other hand, when the determination in step 356 is negative, a position of the bullet ball BB is calculated like step 358, and determination is made about whether or not the bullet ball counter bbc is 300. When the determination is negative, the bullet ball processing subroutine is terminated and the routine proceeds to step 122 in FIG. 5. When the determination is affirmative, the bullet ball status flag bbfl is set to 0 in step 366, and the bullet ball processing subroutine is terminated and the routine proceeds to step 122 in FIG. 5. A time at which the bullet ball counter bbc becomes 300 is a time when 5 seconds elapse after the bullet ball BB hits the node assigned ball NB. Accordingly, the bullet ball BB is displayed in a visible state for 3 seconds after the bullet ball BB hits the node assigned ball NB, and thereafter the bullet ball BB is made invisible, namely, a state where the node assigned ball NB is bored is displayed for 2 seconds.

Figure 14:
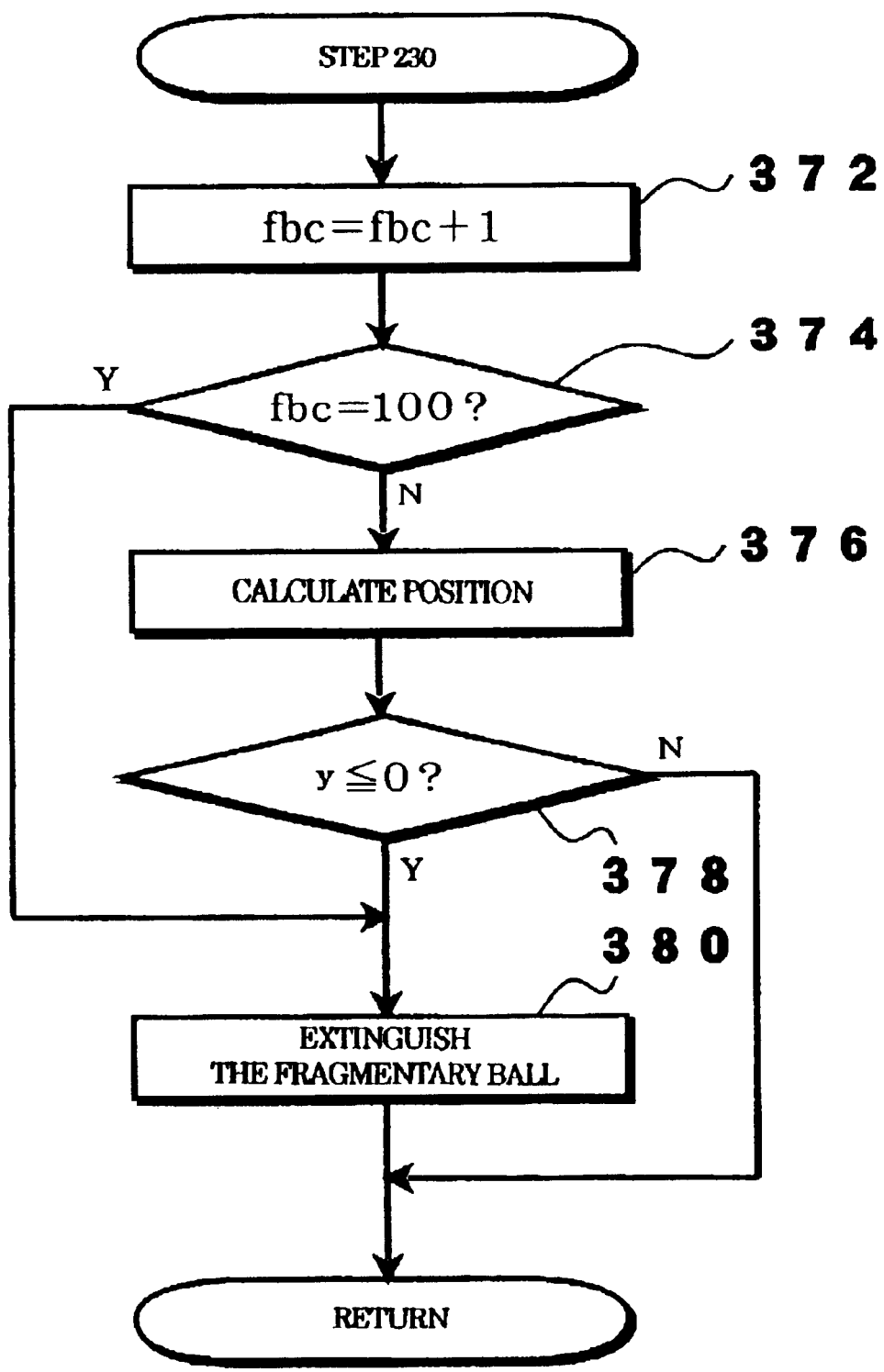
FIG. 14 is a flowchart of a fragmentary ball processing subroutine showing details of step 230 in the metaball update processing subroutine.

As shown in FIG. 14, in the fragmentary ball processing subroutine, a fragmentary ball counter fbc is incremented by 1 in step 372, and determination is made in the next step 374 about whether or not the fragmentary ball counter fbc is 100. When the determination is affirmative, the subroutine proceeds to step 380. When the determination is negative, a current position (x, y, z) of the fragmentary ball FB is calculated in step 376 by adding the position where the fragmentary ball FB is created (generated) to a movement distance obtained by multiplying the velocity vector of the fragmentary ball FB calculated in step 162, the fragmentary ball counter bbc and the vertical blanking interruption time (1/60 seconds) together. Next, in step 378, determination is made about whether or not the y-component of the position of the fragmentary ball FB is 0 or less. When the determination is negative, the fragmentary ball processing subroutine is terminated and the routine proceeds to step 122 in FIG. 5. When the determination is affirmative, the fragmentary ball FB to be processed is extinguished, because the existence time (100/60 seconds) of the fragmentary ball FB has elapsed or the ball FB has reached the ground, and the fragmentary ball processing subroutine is terminated and routine proceeds to step 122 in FIG. 5. Incidentally, in this example, since the fragmentary ball FB is smaller than the droplet ball DB and it has an existence time shorter than that thereof, the shape deformation processing is not performed which is performed at a spreading time, a collapsing time or at a naturally dropping time of the node assigned ball NB, or at a naturally dropping time of a droplet ball described later.

Figure 15:
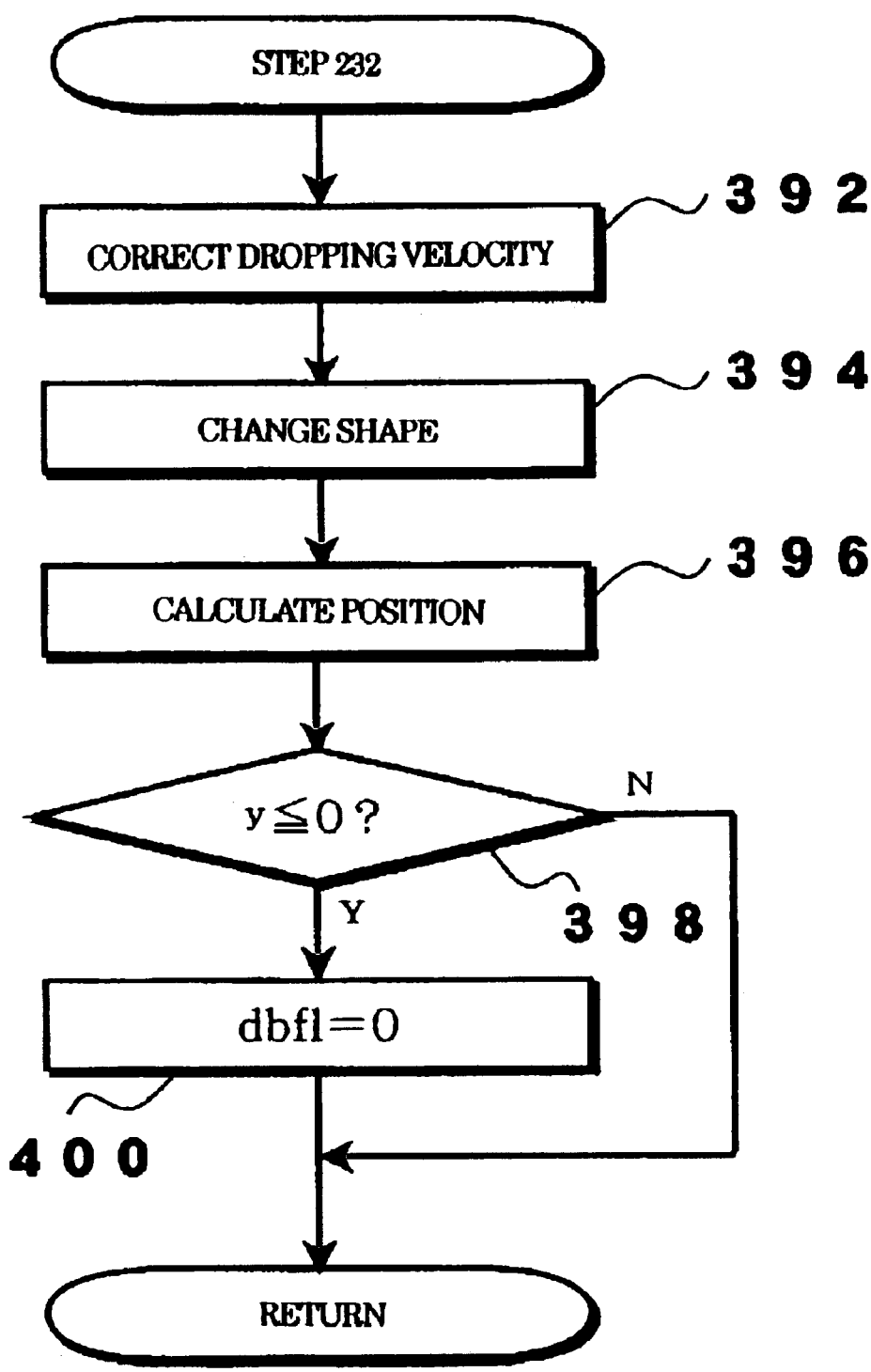
FIG. 15 is a flowchart of a droplet ball processing subroutine showing details of step 232 in the metaball update processing subroutine.

As shown in FIG. 15, in the droplet ball processing subroutine, a dropping velocity is corrected in step 392. As described above, the node assigned ball NB which creates (generates) a droplet ball DB is predetermined, and a creating point (x, y, z) on the node assigned ball NB where the droplet ball DB is created is also defined. The creating point of the droplet ball DB can be calculated on the global coordinates according to the matrix shown in FIG. 28. Since the droplet ball DB drops (falls) naturally, the droplet ball DB can be rendered by maintaining the x-component and the z-component of the position of the droplet ball DB at a time of its creation as they are, and calculating a current position of the droplet ball DB about the y-component. A dropping velocity (y-component) of the droplet ball DB can be calculated according to $V_t = -g \cdot \delta t + V_{t-1} - C \cdot V_{t-1} \cdot \delta t$ like the case of step 270 (refer to FIG. 32A). The droplet ball DB is subjected to air frictional resistance due to natural drop (C denotes frictional resistance). As a result, the maximum value of the drop velocity $V_t$ becomes 3.1 m/s (refer to FIG. 32B)

In the next step 394, the scale information (shape) of the droplet ball DB is changed. Assuming that scale information at the creating point of the droplet ball DB is (10, 20, 10) and a y-component of the current drop velocity $V_t$ calculated in step 392 is 3 (m/s), an absolute value of "a" meeting 10×20×10=(10×"a")×(20×1.15)×(10×"a") is calculated by utilizing the drop velocity $V_t$ (the absolute value of "a": 0.7), and a scale of the droplet ball DB is calculated as (10×0.7, 23, 10×0.7)=(7, 23, 7) such that a volume of the droplet ball DB before dropping and a volume thereof during dropping are approximately equal to each other (refer to FIG. 32B).

Next, in step 396, a position of the droplet ball DB is calculated. A y-component of the current position of the droplet ball DB can be calculated according to $P_N = P_{t-1} + V_{S-1} \cdot \delta t$ like the case of step 270. In the next step 398, determination is made about whether or not the y-component $P_N$ of the current position of the droplet ball DB calculated in step 396 is 0 or less. When the determination is negative, the droplet ball processing subroutine is terminated and the routine proceeds to step 122 in FIG. 5. On the other hand, when the determination is affirmative, the droplet ball flag dbfl is set to 0 in the next step 400, and the droplet ball processing subroutine is terminated and the routine proceeds to step 122 in FIG. 5. Thereby, the droplet ball DB to be processed reaches the ground ball GB to be extinguished, and a new droplet ball is created at the creating point of the droplet ball DB at the next vertical blanking interruption time (step 264).

Accordingly, in the metaball update processing subroutine, all metaballs existing in the current frame are primitively disposed in a three-dimensional imaginary space (imaginary frame) according to the object information (matrixes having 4 rows×4 columns) including the scale information, the translation information and the rotation information in principle. As described above, since the tentacle ball TB is disposed on the Bezier curve, it does not take a form of a matrix having 4 rows×4 columns, but it is disposed in the three-dimensional imaginary space according to the object information specified by the Bezier curve.

In step 122 in FIG. 5, a density distribution processing subroutine for examining a density distribution of metaballs disposed in a three-dimensional imaginary space regarding each evaluation point is performed. A density evaluation equation, an evaluation point and a density evaluation inside a metaball used in this embodiment will be explained prior to an explanation of the density distribution processing subroutine.

In this embodiment, the following equation (2) is used as a density evaluation equation for evaluating density $h(r)$ inside a metaball. In the equation (2), R expresses a radius of a metaball, r expresses a distance from a reference position of a metaball to an evaluation point, and m_fCharge expresses a density coefficient of a metaball taking 1 or −1. Incidentally, the term "reference position" means a position where density of a metaball is 1, and, for example, in case of an oval sphere, its reference position is a center position.

$$h(r) = m_{13} \, f\text{Charge} \cdot (1 - r^2/R^2) \tag{2}$$

As shown in FIG. 33, the density $h(r)$ of a metaball according to the equation (2) has a characteristic of a quadratic function to the distance r. The equation (2) is an evaluation equation for density inside a metaball used at $r^2/R^2 < 1$. As apparent from FIG. 33, the density $h(r)$ becomes 0 at $r^2/R^2 \geq 1$ (outside of the metaball).

Figure 34A:
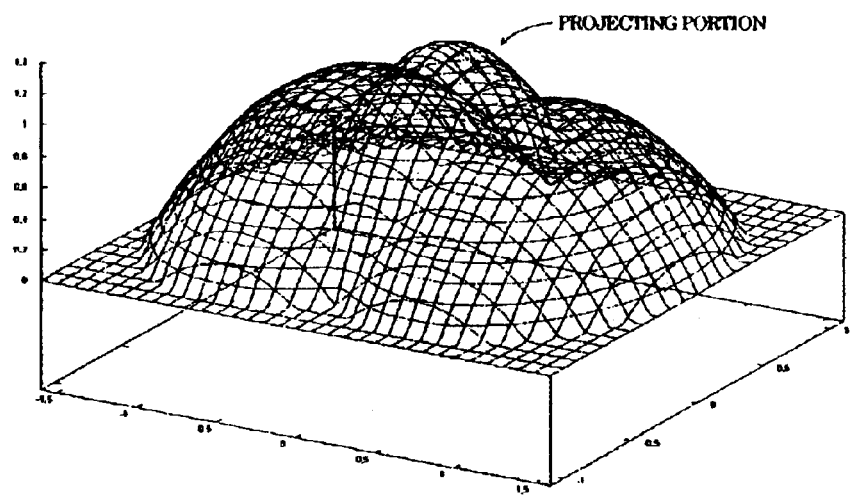
FIGS. 34A, 34B and 34C show isodensity curves when densities of two metaball spheres with a radius of 1 are calculated according to a density evaluation equation used in an embodiment, FIG. 34A being an appearance perspective view of isodensity curves, FIG. 34B being a plan view thereof and FIG. 34C being a plan view of an isodensity curve when a threshold is 0.8.
Figure 34B:
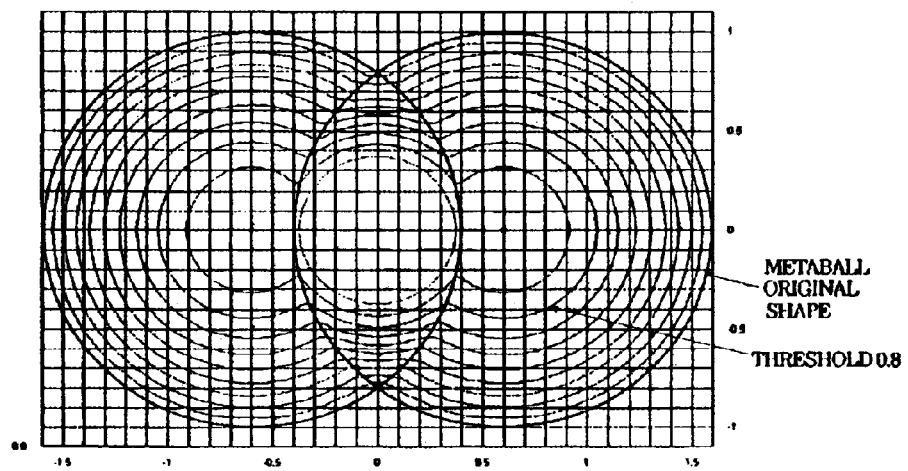
Figure 34C:
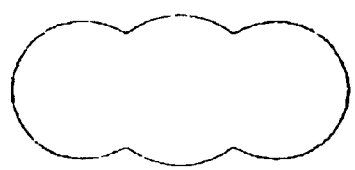

In case that the density coefficient m_fCharge of the metaball is 1 in the equation (2), and that a state where portions of two metaballs having a radius 1 (R=1) overlap (are merged) with each other, a density distribution state where a projecting portion is formed at a position corresponding to a merged portion is obtained as shown in FIG. 34A. FIGS. 34B and 34C show isodensity curves obtained as the density distribution when viewed just downward and a state where two metaballs are merged together when a threshold is 0.8. A threshold functions as a parameter for specifying an isodensity curve. Incidentally, in this embodiment, since a threshold is used as a constant value (about 0.3) in the metaball rendering routine, when a metaball is reproduced in a rendering space, it has a smaller shape than a shape according to the scale information of the metaball. On the other hand, in case that two metaball spheres having a radius of 1 overlap each other, when one metaball sphere is given with the density coefficient m_fCharge=−1, a state where the one metaball sphere becomes invisible is rendered and density around it is lowered, so that a state that the merged portion of another metaball sphere is bored can be expressed (refer to FIG. 31B).

Figure 35A:
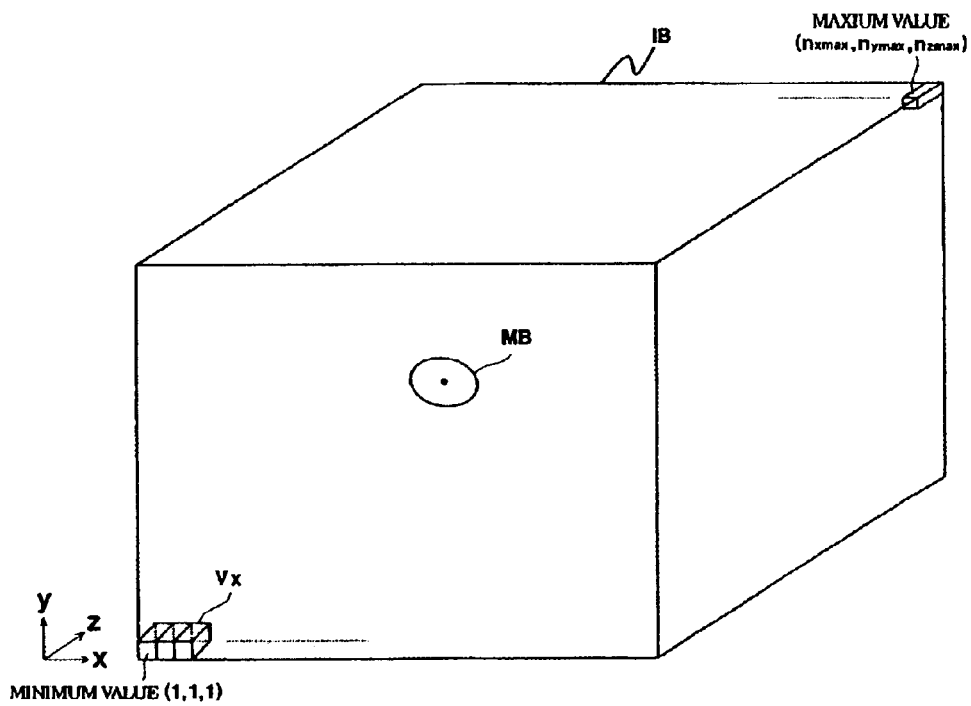
FIGS. 35A and 35B are explanatory diagrams illustratively showing a relationship between a virtual frame and voxels used in an embodiment, FIG. 35A showing a relationship between a voxel and a voxel index, and FIG. 35B showing a relationship between an object disposed inside an imaginary frame and a voxel.

As shown in FIG. 35A, a metaball MB is disposed inside a three-dimensional imaginary box or frame IB. The imaginary box IB is divided into a large number of voxels Vx each having a size of ($\Delta x, \Delta y, \Delta z$). For example, assuming that a size of the imaginary box IB is defined as (150, 150, 150) and 120 voxels exist in each direction of x, y, z directions, each of $\Delta x, \Delta y, \Delta z$ can be obtained as 150/120. Each voxel Vx is numbered by a voxel index for identifying the voxel. For example, a voxel Vx (a voxel positioned at a near and left lower side in FIG. 35A) having an vertex at the global coordinates (0, 0, 0) is identified as an index of a minimum value (1, 1, 1), and a voxel Vx (a voxel positioned at a deep and right upper side in FIG. 35A) having an vertex at the global coordinates (150, 150, 150) is identified as an index of a maximum value ($n_{xmax}, n_{ymax}, n_{zmax}$). An vertex (grid) of each voxel Vx is a density evaluation point to be evaluated according to the equation (2). Incidentally, density $h(r)$ on the outermost side of the imaginary box IB (a face defining the imaginary box IB) is set to 0.

Next, a density evaluation will be explained by using an oval sphere which is frequently used as a shape of a metaball in this embodiment as one example. Assuming that $P_0(x_0, y_0, z_0)$ expresses a center of an oval sphere, $P(x, y, z)$ expresses an arbitrary point, and $X \equiv x-x_0$, $Y \equiv y-y_0$, $Z \equiv z-z_0$, the shape of the oval sphere is defined by a face where $(r/R)^2$ according to the following equation (3) becomes constant.

$$(r/R)^2 = aX^2 + bY^2 + cZ^2 = 2dXY + 2eYZ + 2fzX \tag{3}$$

In the density evaluation, it is necessary to obtain values of the density $h(r)$ according to the equation (2) to vertexes of all the voxels meeting $(r/R)^2 < 1$. In case that an object is dynamically rendered with metaballs, the density $h(r)$ must be computed at a high speed.

In the equation (3), when Z is fixed, (X, Y) giving the minimum value of $(r/R)^2$ can be obtained by setting values obtained by partially differentiating the equation (3) with X, Y to 0, as shown in the following equation (4). When Z and Y are fixed, X giving the minimum value of $(r/R)^2$ can be obtained by setting a value obtained by partially differentiating the equation (3) with X to 0, as shown in the following equation (5).

$$(X, Y) = \left( \frac{Z(de - bf)}{ab - d^2}, \frac{Z(df - ae)}{ab - d^2} \right) \tag{4}$$

$$X = -\frac{dY + fZ}{a} \tag{5}$$

In case that $(r/R)^2$ is evaluated for each voxel, firstly, z is moved from a z coordinate $z_0$ of a center of the metaball in a direction in which z becomes large and in a direction in which z becomes small, (x, y) giving the minimum value of $(r/R)^2$ is obtained according to the equation (4), and the movement of z is stopped at a point where $(r/R)^2$ of the minimum value becomes 1 or more. At that time, y is moved from a point which gives the minimum value of $(r/R)^2$ to each z to be moved in a direction in which y becomes large and in a direction in which y becomes small, x giving the minimum value of $(r/R)^2$ to each of z, y is obtained according to the equation (5), and the movement of y is stopped at a point where the minimum value exceeds 1. Then, x is moved from a point which gives the minimum value of $(r/R)^2$ to each of z and y in a direction in which x becomes large and x becomes small, a value of $(r/R)^2$ is sequentially evaluated according to the equation (3), and the valuation is terminated at a point where $(r/R)^2$ exceeds 1. This computation utilizes a property where, even when any section of the equation (3) expressing the oval sphere is taken, the center of the value of $(r/R)^2$ becomes the minimum value and the values of both sides rise in a monotone manner like a quadratic curve, and it can evaluate the interior of the oval sphere to be evaluated in a proper manner at a high speed. The evaluation of $(r/R)^2$ is performed while x is continuously changed, but a divided difference at an adjacent point becomes a linear expression or first-order equation of x, because $(r/R)^2$ is a quadratic equation. Accordingly, when a second-order divided difference is taken, a calculation loop of $(r/R)^2$ for one section can be constituted by only addition and subtraction.

Figure 16:
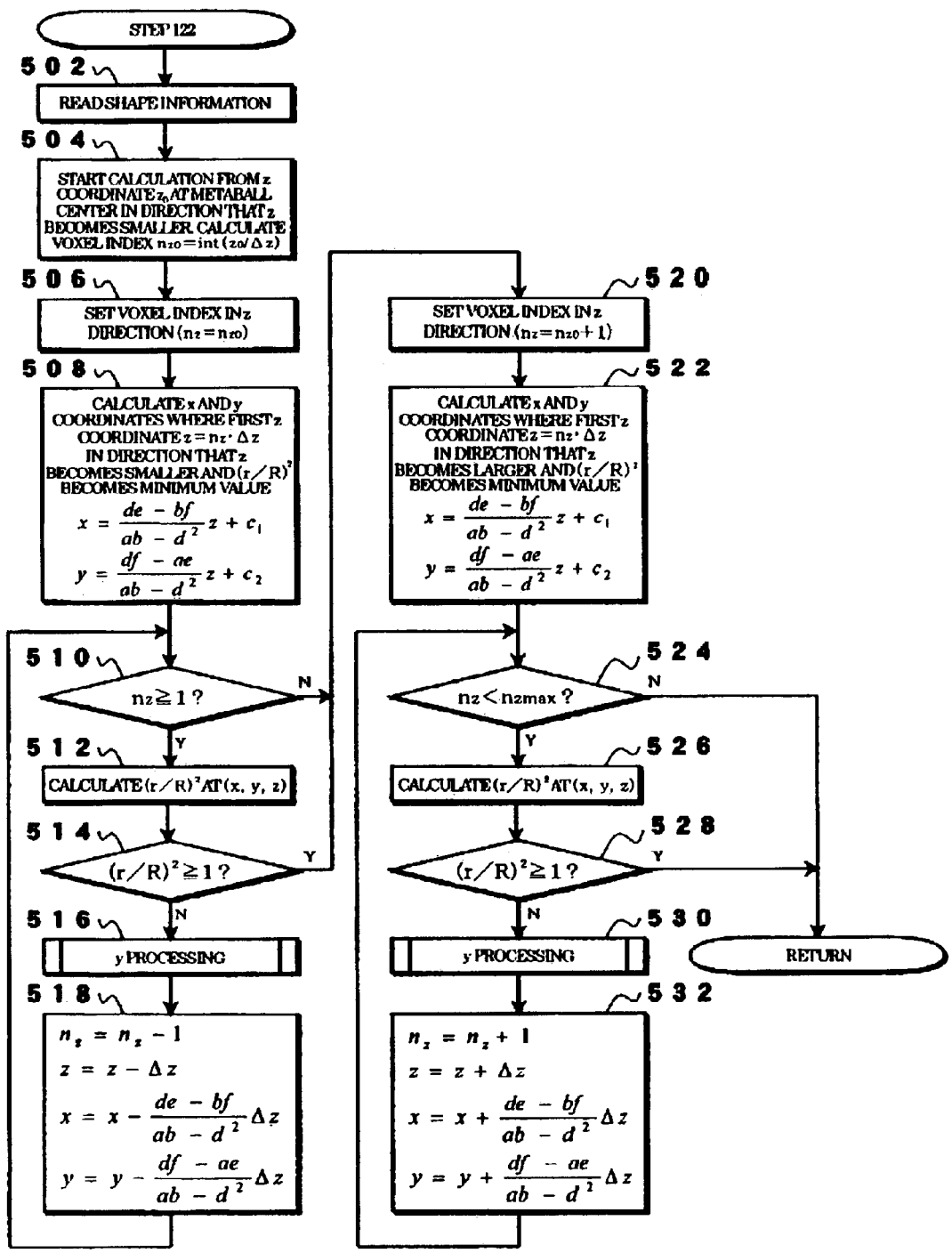
FIG. 16 is a flowchart of a density distribution processing subroutine showing details of step 122 in the rendering calculation processing subroutine.

As shown in FIG. 16, in the density distribution processing subroutine, shape information of the metaball to be processed is read out in step 502. The shape of the metaball can take an oval sphere, a cylinder (capsule), a truncated cone (capsule) and the like, and a default value may be used for the shape information. Incidentally, the density distribution processing subroutine shown in FIG. 16 is processing which is performed when the shape information of a metaball is an oval sphere. As described later, however, it is possible to perform the density evaluation according to a calculation equation expressing a solid shape of a metaball according to the shape information.

Next, in step 504, the minimum value (1, 1, 1) and the maximum value $(n_{xmax}, n_{ymax}, n_{zmax})$ of a predetermined voxel index $(n_x, n_y, n_z)$ are read out, and calculation in a direction in which z becomes small from the z coordinate $z_0$ at the center of the metaball starts. First, a quotient of $z_0/\Delta z$ is calculated as a voxel index $n_{z0}$ and the remainder is discarded. Therefore, a case that an intermediate between the vertexes of a voxel Vx becomes a center position of the metaball MB may occur. Next, in step 506, a voxel index in the z direction is set as $n_z=n_{z0}$.

Next, in step 508, a first z coordinate $z=n_z\cdot\Delta z$ in the direction in which z becomes small and the coordinates of (x, y) where $(r/R)^2$ becomes the minimum value are calculated. Incidentally, a constant term $c_1$ in this step (and step 522 described later) becomes—$(de-bf)\cdot z_0/(ab-d^2)+x_0$ from $x-x_0=\{(de-bf)/(ab-d^2)\}(z-z_0)$ according to the equation (5), and a constant term $c_2$ becomes—$(df-ae)\cdot z_0/(ab-d^2)+y_0$ from $y-y_0=\{(df-ae)/(ab-d^2)\}(z-z_0)$. In the next step 510, determination is made about whether or not $n_z$ is at least 1 which is the minimum value of $n_z$ (refer to FIG. 35A). When the determination is negative, the subroutine proceeds to step 520. When the determination is affirmative, $(r/R)^2$ at (x, y, z) at this time is calculated by using the equation (3) in the next step 512, and determination is made in step 514 about whether or not $(r/R)^2$ is at least 1. When the determination is affirmative, the subroutine proceeds to step 520. When the determination is negative, a y processing subroutine is called in the next step 516.

Figure 17:
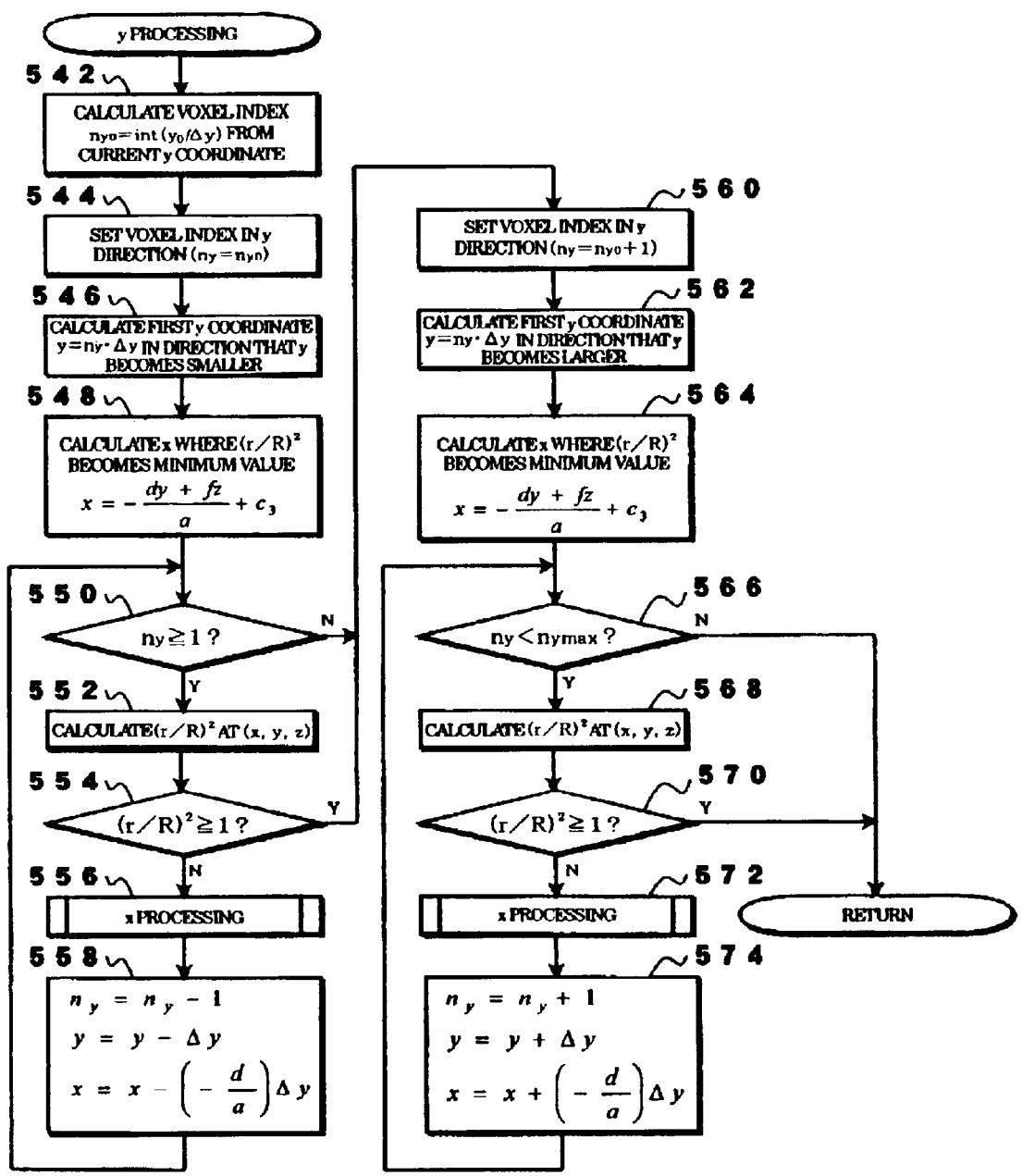
FIG. 17 is a flowchart of a y processing subroutine showing details of steps 516 and 530 in the density distribution processing subroutine.

As shown in FIG. 17, in the y processing subroutine, a quotient of $y_0/\Delta y$ is calculated as a voxel index $n_{y0}$ from the current y coordinate and the remainder is discarded in step 542, a voxel index $n_y$ is set as $n_{y0}$ from the current y coordinate in step 544, and a first y coordinate $y=n_y\cdot\Delta y$ in the direction in which y becomes small is calculated in the next step 546. Next, x where $(r/R)^2$ becomes the minimum value is calculated in the next step 548. Incidentally, a constant term $c_3$ in this step (and step 564 described later) becomes $(dy_0+f_{z0})/a+x_0$ from $(x-x_0)=-\{d(y-y_0)+f(z-z_0)\}/a$ according to the above-described equation (5). In the next step 550, determination is made about whether or not $n_y$ is at least 1 which is the minimum value of $n_y$. When determination is negative, and the subroutine proceeds to step 560. When the determination is affirmative, $(r/R)^2$ at (x, y, z) at this time is calculated by using the equation (3) in the next step 552, and determination is made in step 554 about whether or not $(r/R)^2$ is at least 1. When the determination is affirmative, the subroutine proceeds to step 560. When the determination is negative, a x processing subroutine is called in the next step 556.

Figure 18:
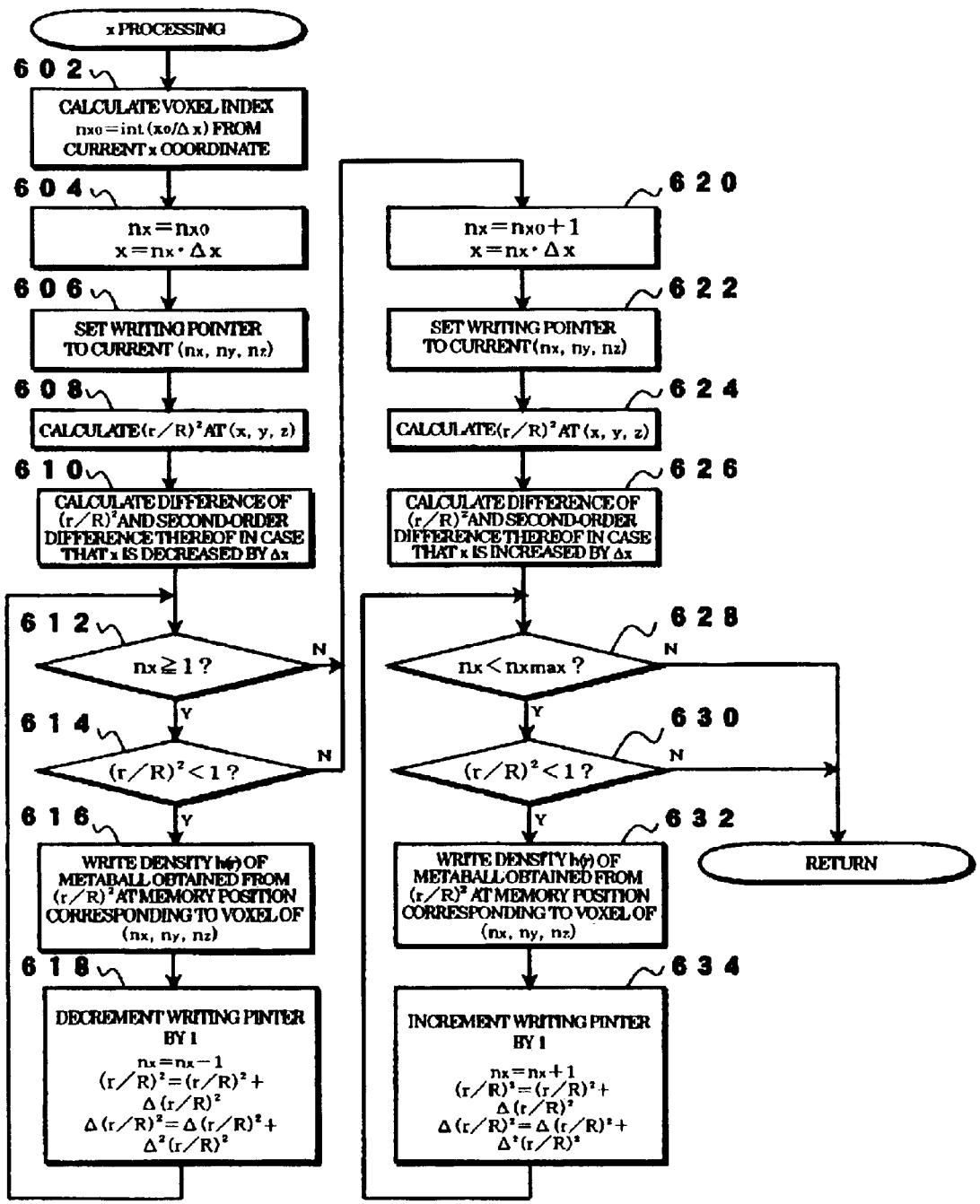
FIG. 18 is a flowchart of an x processing subroutine showing details of steps 556 and 572 in the y processing subroutine.

As shown in FIG. 18, in the x processing subroutine, a quotient of $x_0/\Delta x$ is calculated as a voxel index $n_{x0}$ from the current x coordinate and the remainder is discarded in step 602, and a voxel index $n_x$ is set as $n_{x0}$ from the current x coordinate and a first x coordinate $x=n_x\cdot\Delta x$ in the direction in which x becomes small is calculated in step 604. Next, a writing pointer is caused to coincide with the current coordinates $(n_x, n_y, n_z)$ in step 606, $(r/R)^2$ at the coordinates (x, y, z) at this time is calculated in step 608, and a divided difference $\Delta(r/R)^2$ and a second-order divided difference $\Delta^2(r/R)^2$ of $(r/R)^2$ when x is decreased by $\Delta x$ are calculated in the next step 610.

Regarding X, the equation (3) can be expressed in a form of $(r/R)^2=aX^2+2(dY+fZ)X+C$ (C is a constant). A divided difference $\Delta(r/R)^2$ when x is decreased by $\Delta x$ can be obtained as $\Delta(r/R)^2=\{(2a(-\Delta x)\}x+\{a(-\Delta x)+2(dy+fz)\}(-\Delta x)+c_4$ from $\Delta(r/R)^2=(r/R)^2(X-\Delta x)-(r/R)^2(X)=a(X-\Delta x)^2+2(dY+fZ)(X-\Delta x)+C-\{aX^2+2(dY+fZ)X+C\}$. Incidentally, the constant term $C_4$ becomes $-2(ax_0+dy_0+fz_0)(-\Delta x)$. Similarly, a second-order divided difference $\Delta^2(r/R)^2$ of $(r/R)^2$ when x is decreased by $\Delta x$ becomes $2a(-\Delta x)^2$.

Next, in step 612, determination is made about whether or not $n_x$ is at least 1 which is the minimum value of $n_x$. When the determination is negative, the subroutine proceeds to step 620. When the determination is affirmative, determination is made in the next step 614 about whether or not $(r/R)^2$ is smaller than 1. When the determination is negative, the subroutine proceeds to step 620. When the determination is affirmative, density h(r) of the metaball obtained from $(r/R)^2$ is written in a position of the RAM corresponding to a voxel of the coordinates $(n_x, n_y, n_z)$ in step 616, the writing pointer is decremented by 1 in the next step 618, and the subroutine returns to step 612. At this time, calculation is performed as $n_x=n_x-1$, $(r/R)^2=(r/R)^2+\Delta(r/R)^2$, and $\Delta(r/R)^2=\Delta(r/R)^2+\Delta^2(r/R)^2$. That is, since the first-order divided difference and the second-order divided difference of $(r/R)^2$ are obtained in step 610, the first-order divided difference can be updated from the second-order divided difference and the previous first-order divided difference every time $n_x$ is decreased to compute $(r/R)^2$.

In step 620, the voxel index $n_x$ is set as $n_{x0}+1$ and a first x coordinate $x=n_x\cdot\Delta x$ in a direction in which x becomes large is calculated in step 620, the writing pointer is cause to coincide with the current coordinates $(n_x, n_y, n_z)$ in step 622, and $(r/R)^2$ at the coordinates (x, y, z) at this time is calculated by using the equation (3) in step 624. In the next step 626, a divided difference $\Delta(r/R)^2$ and a second-order divided difference $\Delta^2(r/R)^2$ of $(r/R)^2$ when x is increased by $\Delta x$ are calculated like step 610. $\Delta(r/R)^2$ and $\Delta^2(r/R)^2$ are respectively obtained as $2a(\Delta x)x+\{a\Delta x+2(dy-fz)\}\Delta x+c_5$ and $2a(\Delta x)^2$. Incidentally, the constant term $c_5$ becomes $-2(ax_0+dy_0+fz_0)\Delta x$.

Next, in step 628, determination is made about whether or not $n_x$ is smaller than the maximum value $n_{xmax}$ (refer to FIG. 35A) of $n_x$. When the determination is affirmative, determination is made in the next step 630 about whether or not $(r/R)^2$ is smaller than 1. When the determination is affirmative, density h(r) of the metaball obtained from $(r/R)^2$ is written in a position of the memory (RAM) corresponding to a voxel at the coordinates $(n_x, n_y, n_z)$ in step 632, the writing pointer is incremented by 1 in the next step 634, and the subroutine returns to step 628. Thereby, calculation is performed as $n_x=n_x+1$, $(r/R)^2=(r/R)^2+\Delta(r/R)^2$, and $\Delta(r/R)^2=\Delta(r/R)^2+\Delta^2(r/R)^2$. That is, since the first-order divided difference and the second-order divided difference of $(r/R)^2$ are obtained in step 626, the first-order divided difference can be updated from the second-order divided difference and the previous first-order divided difference every time $n_x$ is increased to compute $(r/R)^2$. When the determination is negative in step 628 or step 630, the x processing subroutine is terminated and the routine proceeds to step 558 in FIG. 17 (or step 574 described later).

In step 558, $n_y$ is decremented by 1 ($n_y=n_y-1$), and the subroutine returns to step 550. Thereby, calculation is performed for y and x as $y=y-\Delta y$ and $x=x-(-d/a)\Delta y$, respectively (refer to steps 546 and 548).

In step 560, the voxel index $n_y$ in the y direction is set as $n_{y0}+1$ and a first y coordinate $y=n_y \cdot \Delta y$ in a direction in which y becomes large is calculated in step 562. In the next step 564, x where $(r/R)^2$ becomes the minimum value is calculated like step 548.

In the next step 566, determination is made about whether or not n is smaller than the maximum value $n_{ymax}$ of $n_y$. When the determination is affirmative, $(r/R)^2$ at the coordinates (x, y, z) at this time is calculated by using the equation (3) in step 568 and determination is made in the next step 570 about whether or not $(r/R)^2$ is 1 or more. When the determination is negative, the above-described x processing subroutine is called and processed in step 572, and $n_y$ is incremented by 1 in step 574 ($n_y=n_y+1$), then the subroutine proceeds to step 566. At this time, calculation is performed for y and x as $y=y+\Delta y$ and $x=x+(-d/a)\Delta y$, respectively (refer to steps 562 and 564). When the determination in step 566 is negative, or when the determination in step 570 is affirmative, the y processing subroutine is terminated and the subroutine proceeds to step 518 (or step 532 described later).

In step 518, $n_z$ is decremented by 1 ($n_z=n_z-1$), and the subroutine returns to step 510. Thereby, z is decremented by $\Delta z (z=z-\Delta z)$, and calculation is performed for x and y as $x-\{(de-bf)/(ab-d^2)\}\Delta z$ and $y-\{(df-ae)/(ab-d^2)\}\Delta z$, respectively.

In step 520, the voxel index $n_z$ in the z direction is set as $n_{z0}+1$, and a first z coordinate $z=n_z \cdot \Delta z$ in a direction in which z becomes large and x and y coordinates where $(r/R)^2$ becomes the minimum value are calculated in step 522 like step 508. Next, in step 524, determination is made about whether or not $n_z$ is smaller than the maximum value $n_{zmax}$ of the $n_z$. When the determination is affirmative, $(r/R)^2$ at the coordinates (x, y, z) at this time is calculated by using the equation (3) in step 526, and determination is made in the next step 528 about whether or not $(r/R)^2$ is at least 1. When the determination is negative, the above-described y processing subroutine is called and processed in the step 530, and $n_z$ is incremented by 1 in step 532 ($n_z=n_z+1$), then the subroutine returns to step 524. At this time, z is incremented by $\Delta z$ ($z=z+\Delta z$), and calculation is performed for x and y as $x+\{(de-bf)/(ab-d^2)\}\Delta z$ and $y+\{(df-ae)/(ab-d^2)\}\Delta z$, respectively. When the determination in step 524 is negative, or when the determination in step 528 is affirmative, the density distribution processing subroutine is terminated and the routine proceeds to step 118 in FIG. 5.

Figure 36A:
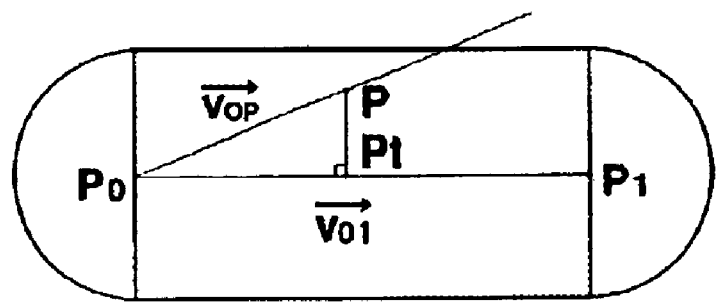
FIGS. 36A, 36B and 36C are explanatory diagrams of a distance calculation performed when a metaball takes a solid shape other than an oval sphere, FIG. 36A showing a distance to an arbitrary point at a cylindrical portion, FIG. 36B, showing a distance to an arbitrary point at both ends rounded in a spherical shape, and FIG. 36C showing a truncated cone whose both ends are rounded in a spherical shape.
Figure 36B:
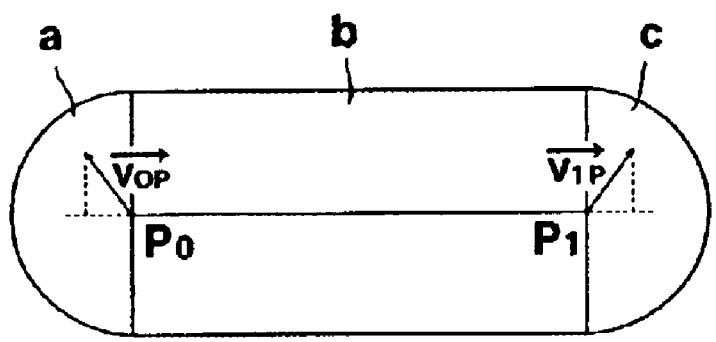

As described above, the metaball MB takes one of various shapes other than the oval sphere. As shown in FIG. 36A, when the metaball Mb is a cylinder which has a radius R and whose both ends are rounded in a hemispherical shape as end points $P_0$ ($x_0$, $y_0$, $z_0$) and $P_1$ ($x_1$, $y_1$, $z_1$) assuming that a point on a straight line $P_0P_1$ is $P_t$($x_t$, $y_t$, $z_t$) (t: a parameter), the point $P_t$ can be expressed as $P_t=P_0+\text{vec}(V_{01})t$. Here, vec $(V_{01})=P_1-P_0$, and vec($V_{01}$) expresses vector $V_{01}$. A foot of a perpendicular line extending from an arbitrary point P(x, y, z) to the straight line $P_0P_1$ becomes a point on $P_t$ in case of $t=\text{vec}(V_{01}) \cdot \text{vec}(V_{0P})/\{\text{vec}(V_{01})\}^2$. At this time, a distance r from the straight line $P_0P_1$ is calculated as $r^2=[\{\text{vec}(V_{01})\}^2 \cdot \{\text{vec}(V_{0P})\}^2-(\{\text{vec}(V_{01}) \cdot \text{vec}(V_{0P})\}^2]/\{\text{vec}(V_{01})\}^2$. Here, vec($V_{0P}$)≡$P-P_0$. Since the subject is actually not a straight line but a line segment $P_0P_1$, when the parameter t meets $t \leq 0$, $r^2=\{\text{vec}(V_{0P})\}^2$, and when the parameter t meets $t \geq 1$, $r^2=\{\text{vec}(V_{1P})\}^2$ (refer to FIG. 36B). Accordingly, a reference position is defined by a center line.

In conclusion, in $\text{vec}(V_{01}) \cdot \text{vec}(V_{0P}) \leq 0$ ("a" portion in FIG. 36B), $r^2=\{\text{vec}(V_{0P})\}^2$ is obtained, in $0<\text{vec}(V_{01}) \cdot \text{vec}(V_{0P})<\{\text{vec}(V_{01})\}^2$ (b portion in FIG. 36B), $r^2=[\{\text{vec}(V_{01})\}^2 \cdot \{\text{vec}(V_{0P})\}^2-(\{\text{vec}(V_{01}) \cdot \text{vec}\}V_{0P}]\}^2]/\{\text{vec}(V_{01})\}^2$ is obtained, and in $\text{vec}(V_{01}) \cdot \text{vec}(V_{0P}) \geq \{\text{vec}(V_{01})\}^2$ (c portion in FIG. 36B), $r^2=\{\text{vec}(V_{1P})\}^2$ is obtained. Incidentally, $\text{vec}(V_{1P})≡P-P_1$.

Since a generality is not lost, assuming $z_1 \geq z_0$ hereinafter, (x, y) giving the minimum value of $r^2$ when z is fixed can be obtained at a point where a value obtained by partially differentiating $r^2$ with x, y becomes 0. As apparent intuitively, in $z \leq z_0$, (x, y)=($x_0$, $y_0$) is obtained, in $z_0<z<z_1$, (x, y)=($\{(x_1-x_0)(z-z_0)/(z_1-z_0)\}+x_0$, $\{(y_1-y_0)(z-z_0)/(Z_1-Z_0)\}+y_0$) is obtained, and in $z \geq z_0$, (x, y)=($x_1$, $y_1$) is obtained.

When z and y are fixed, x giving the minimum value of $r^2$ can be obtained at a point where a value obtained by partially differentiating $r^2$ with x becomes 0. For simplifying equations here, variables relative to $P_0$, ($X_1$, $Y_1$, $Z_1$)=($x_1-x_0$, $y_1-y_0$, $z_1-z_0$) and (X, Y, Z)=($x-x_0$, $y-y_0$, $z-z_0$) are introduced and $r^2$ is partially differentiated with x, $\partial r^2/\partial x=2X$ is obtained at $\text{vec}(V_{01}) \cdot \text{vec}(V_{0P}) \leq 0$, $\partial r^2/\partial x=\{2(Y_1^2+Z_1^2)X-2X_1(Y_1Y+Z_1Z)\}/(X_1^2+Y_1^2+Z_1^2)$ is obtained at $0<\text{vec}(V_{01}) \cdot \text{vec}(V_{0P})<\{\text{vec}(V_{01})\}^2$, and $\partial r^2/\partial x=2(X-X_1)$ is obtained at $\text{vec}(V_{01}) \cdot \text{vec}(V_{0P}) \geq \{\text{vec}(V_{01})\}^2$.

Thereby, regarding X to be obtained, X=0 is obtained at $(Y_1Y+Z_1Z) \leq 0$, $X=X_1(Y_1Y+Z_1Z)/(Y_1^2+Z_1^2)$ is obtained at $0<(Y_1Y+Z_1Z)<(Y_1^2+Z_1^2)$, and $X=X_1$ is obtained at $(Y_1Y+Z_1Z) \geq (Y_1^2+Z_1^2)$ In an actual density evaluation, since $r^2$ to be handled has in any section a property that a point or portion where $r^2$ becomes the minimum is one (Points or a section may occur.) and a peripheral portion thereof rises in a monotone manner, calculation starts from the minimum point, then the calculation is advanced to the peripheral portion, and it is terminated at a point of $r^2 \geq R^2$, so that the interior of the metaball MB can be calculated in a proper manner. Specifically, since z can take a range of $(z_0-R) \leq z \leq (z_1+R)$, coordinates (x, y) where $r^2$ becomes the minimum to each z is obtained. Next, x giving the minimum value of $r^2$ is obtained while y is being moved to the peripheral portion. At this time, when $r^2$ meets $r^2 \geq R^2$, the movement of y is stopped. Then, x is moved towards the peripheral portion to each y and calculation is performed up to a point of $r^2 \geq R^2$. As understood when $r^2$ is developed, since $r^2$ is at most a second order regarding x in each case, a divided difference at points to which x is adjacent is at most a first order. Accordingly, when a divided difference of the divided difference is calculated, a calculation loop of $r^2$ in a continuous x section can be constituted with only addition and subtraction. Also, when $\text{vec}(V_{01}) \cdot \text{vec}(V_{0P})$ which serves as a diverging point for each case is developed, due to the $\text{vec}(V_{01}) \cdot \text{vec}(V_{0P})$ being at most a first order regarding x, since a divided difference at points to which x is adjacent becomes a constant and this is handled in the same manner as the above calculation loop. Since a shift for each case is determined to either one of $\text{vec}(V_{01}) \cdot \text{vec}(V_{0P}) \leq 0 \rightarrow 0 < \text{vec}(V_{01}) \cdot \text{vec}(V_{0P}) < \{\text{vec}(V_{01})\}^2 \rightarrow \text{vec}(V_{01}) \cdot \text{vec}(V_{0P}) \geq \{\text{vec}(V_{01})\}^2$ and $\text{vec}(V_{01}) \cdot \text{vec}(V_{0P}) \geq \{\text{vec}(V_{01})\}^2 \rightarrow 0 < \text{vec}(V_{01}) \cdot \text{vec}(V_{0P}) < \{\text{vec}(V_{01})\}^2 \rightarrow \text{vec}(V_{01}) \cdot \text{vec}(V_{0P}) \leq 0$ according to a sign of x of the vec ($V_{01}$)·vec($V_{0P}$) and a moving direction, the number of cases is not so increased.

Figure 36C:
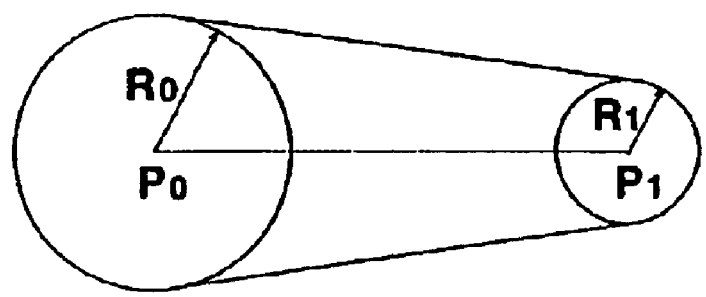

Also, as shown in FIG. 36C, when the metaball MB is a truncated cone whose end points are defined at $P_0$($x_0$, $y_0$, $z_0$) and $P_1$($x_1$, $Y_1$, $z_1$), which has a radius $R_0$ from a point $P_0$ and a radius $R_1$ from a point $P_1$, and whose both ends are rounded in a spherical shape, assuming that a point on a straight line $P_0$ $P_1$ is defined as $P_t(x_t, y_t, z_t)$ (t: a parameter), the point $P_t$ can be expressed as $P_t = P_0 + \text{vec}(V_{01})t$. Incidentally, $\text{vec}(V_{01}) \equiv P_1 - P_0$. Here, a function $R^2$ relating to a distance between an arbitrary point $P(x, y, z)$ and $P_t$ is considered so as to be $R^2 = (P - P_1)^2 / \{(R_1 - R_0)t + R_0\}^2$ by using the parameter t. Assuming $K \equiv R_0/(R_1 - R_0)$, $\text{vec}(V_{01}) \equiv (P_1 - P_0)$ and $\text{vec}(V_{0P}) \equiv (P - P_0)$, a parameter t for minimizing $R^2$ becomes $t = \{K\text{vec}(V_{01}) + \text{vec}(V_{0P})\} \cdot \text{vec}(V_{0P}) / \{(K\text{vec}(V_{01}) + \text{vec}(V_{0P})\} \cdot \text{vec}(V_{01})$.

Assuming that a peak of a cone contacting with the spheres at both the ends is defined as $P_F(x_F, y_F, x_F)$, it is found from a simple calculation that $P_F = -\{R_0/(R_1 - R_0)\}\text{vec}(V_{01}) + P_0$ is obtained. Here, assuming $\text{vec}(V_{F0}) \equiv P_0 - P_F$, $\text{vec}(V_{FP}) \equiv P - P_F$ and the like, the parameter t becomes $t = \{\text{vec}(V_{F0}) + \text{vec}(V_{0P})\} \cdot \text{vec}(V_{0P}) / \{\text{vec}(V_{F0}) + \text{vec}(V_{0P})\} \cdot \text{vec}(V_{01}) = \text{vec}(V_{FP}) \cdot \text{vec}(V_{0P}) / \text{vec}(V_{FP}) \cdot \text{vec}(V_{01})$. At this time, $R^2 = (1/R_0^2)\{\text{vec}(V_{F0})\}^2 - \{\text{vec}(V_{FP}) \cdot \text{vec}(V_{F0})\}^2 / \{\text{vec}(V_{FP})\}^2 = \{\text{vec}(V_{0P}) \times \text{vec}(V_{01})\}^2 / (R_1 - R_0)^2 \{\text{vec}(V_{FP})\}^2$. Incidentally, the symbol "x" expresses an outer (vector) product. Regarding the portions whose both ends are rounded, $R^2 \{\text{vec}(V_{0P})\}^2 / R_0^2$ at $t \leq 0$, and $R^2 = \{\text{vec}(V_{1P})\}^2 / R_1^2$ at $t \geq 1$.

In conclusion, $R^2 = \{\text{vec}(V_{0P})\}^2 / R_0^2$ at $t \leq 0$, $R^2 = \{\text{vec}(V_{0P}) \times \text{vec}(V_{01})\}^2 / (R_1 - R_0)^2 \{\text{vec}(V_{FP})\}^2$ at $0 < t < 1$, and $R^2 = \{\text{vec}(V_{1P})\}^2 / R_1^2$ at $t \geq 1$. A curved face where $R^2$ becomes a constant value is a shape to be obtained.

Since a generality is not lost, assuming $z_1 \geq z_0$ hereinafter, (x, y) giving the minimum value of $r^2$ when z is fixed can be obtained at a point where a value obtained by partially differentiating $R^2$ with x, y becomes 0. As apparent intuitively, in $z \leq z_0$ or $z \geq z_1$, $(x, y) = (x_0, y_0)$ when $(z - z_0)^2 / R_0^2 \leq (z - z_1)^2 / R_1^2$, and $(x, y) = (x_1, y_1)$ when $(z - z_0)^2 / R_0^2 > (z - z_1)^2 / R_1^2$. In $z_0 < z < z_1$, $(x, y) = (\{(x_1 - x_0)(z - z_0)/(z_1 - z_0)\} + x_0, \{(y_1 - y_0)(z - z_0)/(z_1 - z_0)\} + y_0)$.

The "x" giving the minimum value of $R^2$ when z and y are fixed can be obtained at a point where a value obtained by partially differentiating $R^2$ with x becomes 0. Although the details of calculation will be omitted, in $t \leq 0$ or $t \geq 1$, $x = x_0$ when $(Y_{0P}^2 + Z_{0P}^2)/R_0^2 \leq (Y_{1P}^{2+Z}{}_{1P}^2)/R_1^2$, and $x = x_1$ when $(Y_{0P}^2 + Z_{0P}^2)/R^2 > (Y_{1P}^{2+Z}{}_{1P}^2)/R_1^2$. In $0 < t < 1$, $x = \{(Y_{FP}Y_{FP} + Z_{FP}Z_{FP}) \cdot X_{F0}/(Y_{FP}Y_{F0} + Z_{FP}Z_{F0})\} + x_F$. Here, $Y_{0P} \equiv y - y_0$, $Y_{1P} \equiv y - y_1$ and $Y_{FP} \equiv y_0 - y_F$, and the like (Z. is also similar thereto).

In an actual density evaluation, since $R^2$ to be handled has in any section a property that a point portion where $R^2$ becomes the minimum is one (Points or a section may occur.) and a peripheral portion thereof rises in a monotone manner, calculation starts from the minimum point, then the calculation is advanced to the peripheral portion, and it is terminated at a point of $R^2 \geq 1$, so that the interior of the metaball MB can be calculated in a proper manner. Specifically, since z can take a range of min $(z_0 - R_0, z_1 - R_1) \leq z \leq \max(z_0 + R_0, z_1 + R_1)$, coordinates (x, y) where $R^2$ becomes the minimum to each z is obtained. Next, x giving the minimum value of $R^2$ is obtained while y is being moved to the peripheral portion. At this time, when $R^2$ meets $R^2 \geq 1$, the movement of y is stopped. Then, x is moved towards the peripheral portion to each y and calculation is carried out up to a point of $R^2 \geq 1$. As understood when $R^2$ is developed, a portion of an end sphere is a second order regarding x, and a divided difference at points to which x is adjacent is at most a first order. Accordingly, when a divided difference of the divided difference is calculated, a calculation loop of $R^2$ in a continuous x section can be constituted with only addition and subtraction.

Since a portion of a truncated cone takes a form of (at most second order regarding x)/(at most second order regarding x), when calculation up to the second-order divided difference is made regarding each of a denominator and a numerator, a calculation loop of $r^2$ in a continuous x section can be constituted with only addition and subtraction except for one time of division. Also, as to the parameter t which serves as a reference for each case, it can be developed so as to take (at most second order regarding x)/(at most first order regarding x). Since t may be compared with 0 and 1, it is understood that, when the denominator is cleared, a case distinguishing can be achieved by only a magnitude comparison of a difference among the denominator, and 0. Accordingly, when a divided difference is taken for the denominator and a second-order divided difference is taken for the numerator, a change in each case in a continuous x section can be constituted with only the addition, subtraction and the magnitude comparison. In this way, in the density distribution processing subroutine, the density is calculated according to a solid shape of a metaball disposed inside the imaginary box IB.

Figure 35B:
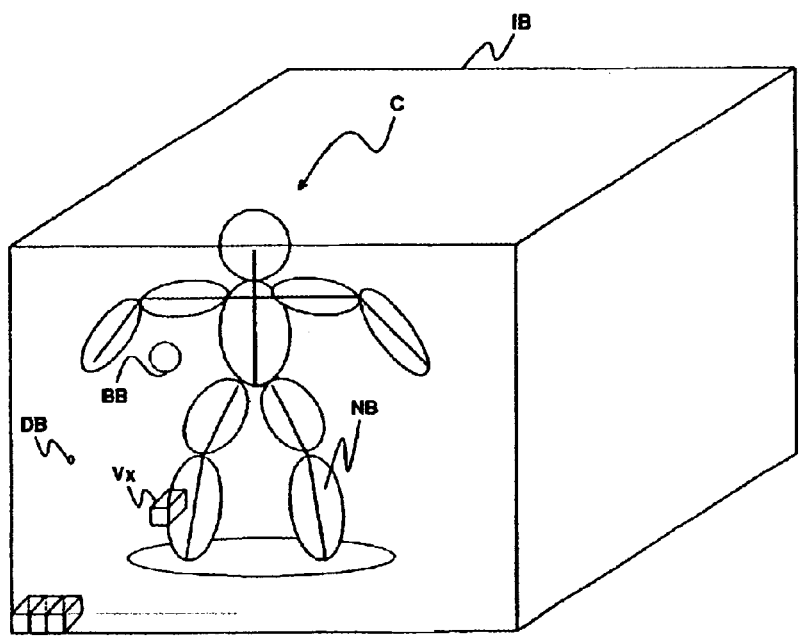

When the determination in step 118 is affirmative, in step 124, a marching cube processing is carried out for examining (detecting) whether density of each voxel Vx at its vertex (evaluation point) is more than a threshold or less than it, and for expressing a set (an isosbestic face) of points where a threshold is constant with a polygon. That is, in the marching cube processing, considering that a set (an isosbestic face) of points where the density h(r) is a constant value (threshold) is expressed with a polygon, this isosbestic face is defined as a shape of a metaball MB to be rendered (to be reproduced) finally. Incidentally, as shown in FIG. 35B, the whole character c constituted with metaballs MB is disposed inside the imaginary box IB. A center of the imaginary box IB may be, for example, a navel or a foot portion of the character c. However, the center of the imaginary box IB is moved according to movement of the character c and the size of the imaginary box IB is not required to be in contact with the character c at an upper, lower, left or right outer side if only the whole character c is received in the imaginary box IB.

Figure 19:
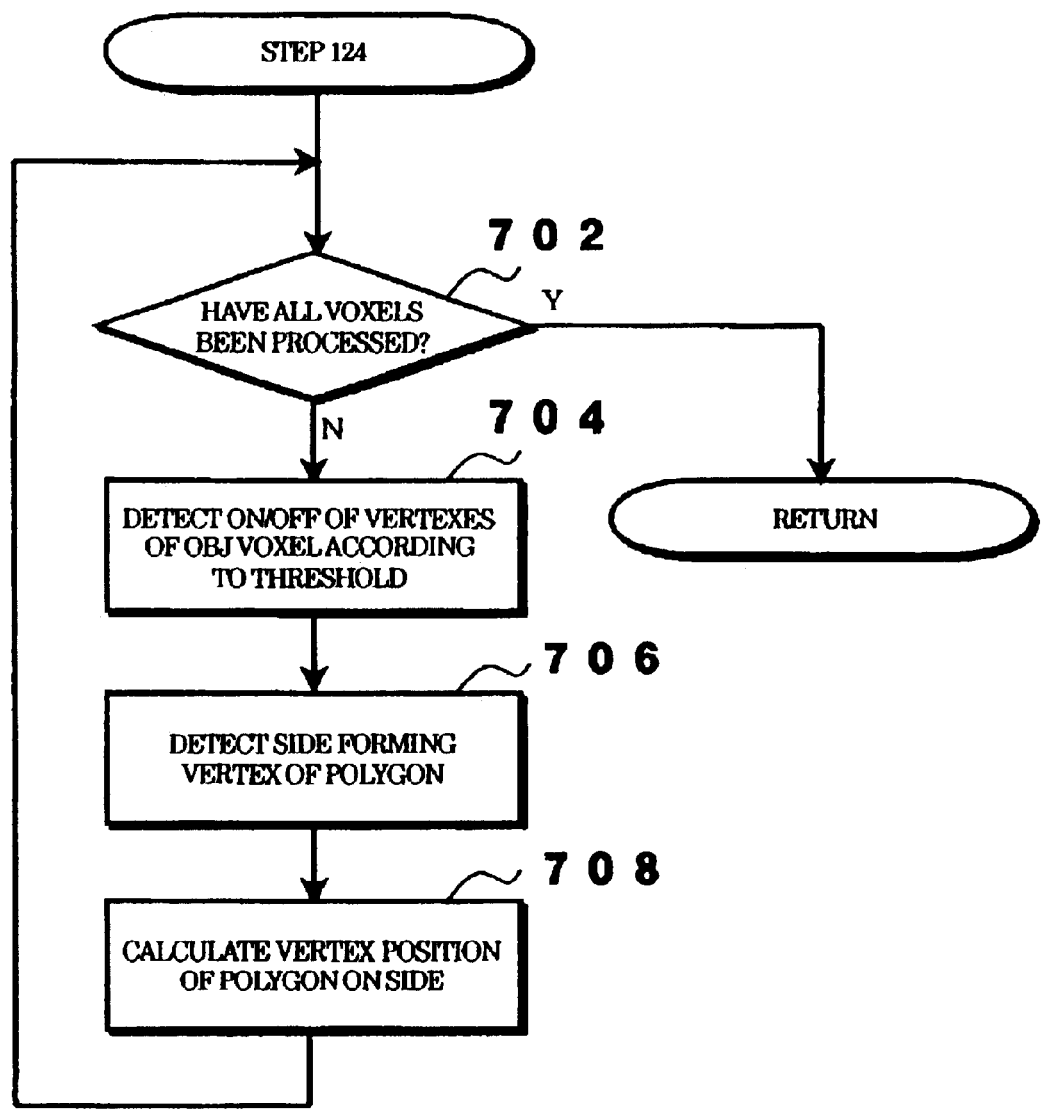
FIG. 19 is a flowchart of a marching cube processing subroutine showing details of step 124 in the rendering calculation processing subroutine.

As shown in FIG. 19, in the marching cube processing subroutine, determination is made in step 702 about whether or not all voxels Vx have been processed by using the above-described voxel index. That is, as shown in FIG. 35B, the examination is started from the voxel positioned at the near and left lower side, and determination is made about whether or not the voxel positioned at the deep and right upper side has been processed.

Figure 37:
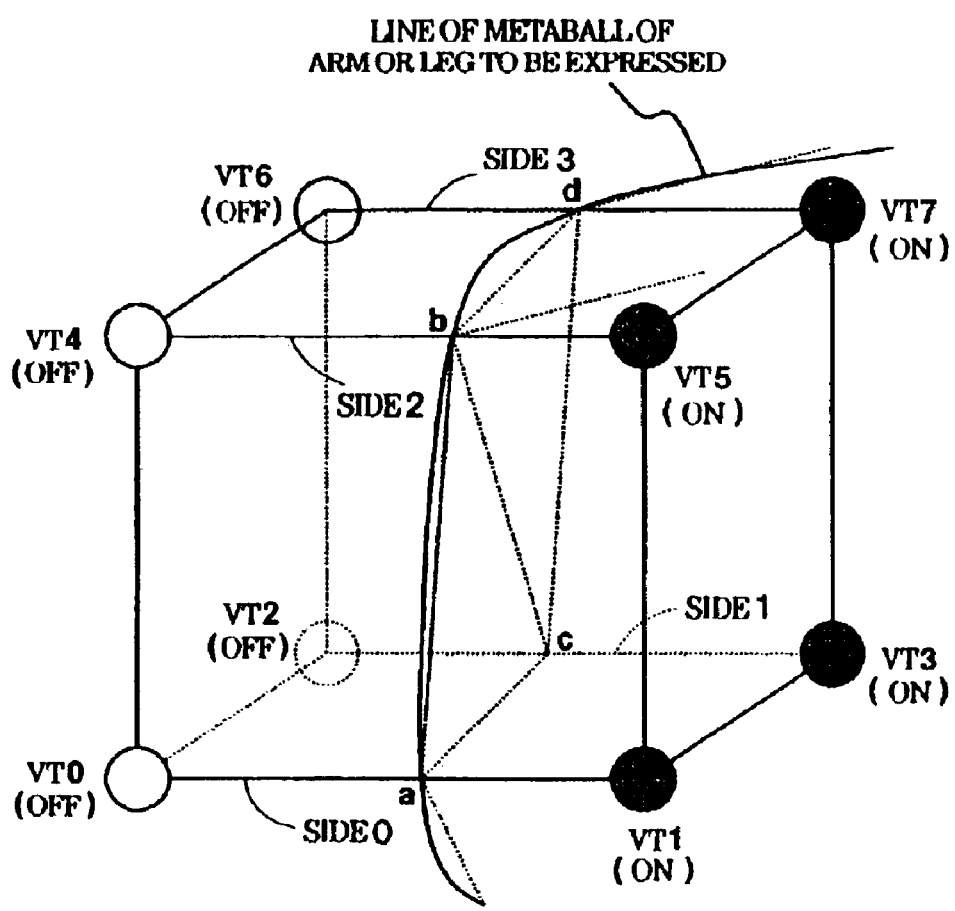
FIG. 37 is an explanatory diagram showing a relationship between vertexes of a voxel and polygon facets.

When the determination is negative, ON/OFF at each vertex of a subject voxel is detected from the threshold in step 704. That is, in order to examine how the subject voxel and the metaball MB cross, regarding eight vertexes of the subject voxel, detection is made as ON when the density h(r) of an vertex is higher than the threshold (inside the metaball MB) and as OFF when the density h(r) of the vertex is lower than the threshold (outside the metaball MB). In this step, since the voxels Vx are sequentially detected, the number of vertexes to be examined newly is only three. As described above, since the outermost of the imaginary box IB is set such that its density is 0, even when the voxel Vx of (1, 1, 1) is examined, it is sufficient to examine only three vertexes. FIG. 37 shows, when the voxel Vx shown in FIG. 35B is the subject voxel, the vertexes of the voxel and the like. Incidentally, the density h(r) of each vertex of the subject voxel changes according to the motion of the character c and the like for each frame, and it has been already calculated (steps 616 and 632 in FIG. 18).

Next, in step 706, sides forming vertexes of a polygon are detected. That is, sides (including points "a", b, c and d in FIG. 37) where a voxel and a metaball MB cross each other are obtained. Since there are eight vertexes in a voxel, the number of combinations of ON/OFF of each vertex is $2^8=256$. For example, when each vertex is indexed by an identified number which is an exponent part of 2 and when an index which is added by the numbers of ON vertexes is considered, the index in the case shown in FIG. 37 is $2^1+2^3+2^5+2^7=170$. Since the index takes a number in a range of 0 to 255, a data table constituted with data pieces for 256 sets of isosbestic faces is prepared in advance. In this data table, (a) sides of a voxel by which polygon vertexes are produced and (b) how to form an isosbestic face by connecting the polygon vertexes are recorded regarding data for one set of isosbestic face. For example, in an explanation along FIG. 37, assuming that a side between vertexes VT0 and VT1 is a side 0, a side between vertexes VT2 and VT3 is a side 1, a side between vertexes VT4 and VT5 is a side 2 and a side between vertexes VT6 and VT7 is a side 3, at a (index +1)th portion of the data table, four of {side 0, side 1, side 2, side 3} for a portion of the above-described (a), and three of {side 0, side 1, side 2} and three of {side 1, side 2, side 3} for a portion of the above-described (b) are recorded. When three points are determined, a polygon facet can be formed, so that one isosbestic face can be formed by {side 0, side 1, side 2} and one isosbestic face can be formed by {side 1, side 2, side 3}. Incidentally, in this stage, the sides forming a polygon facet are specified, but positions of points a, b, c, and d on the sides have not been specified yet.

Figure 38:
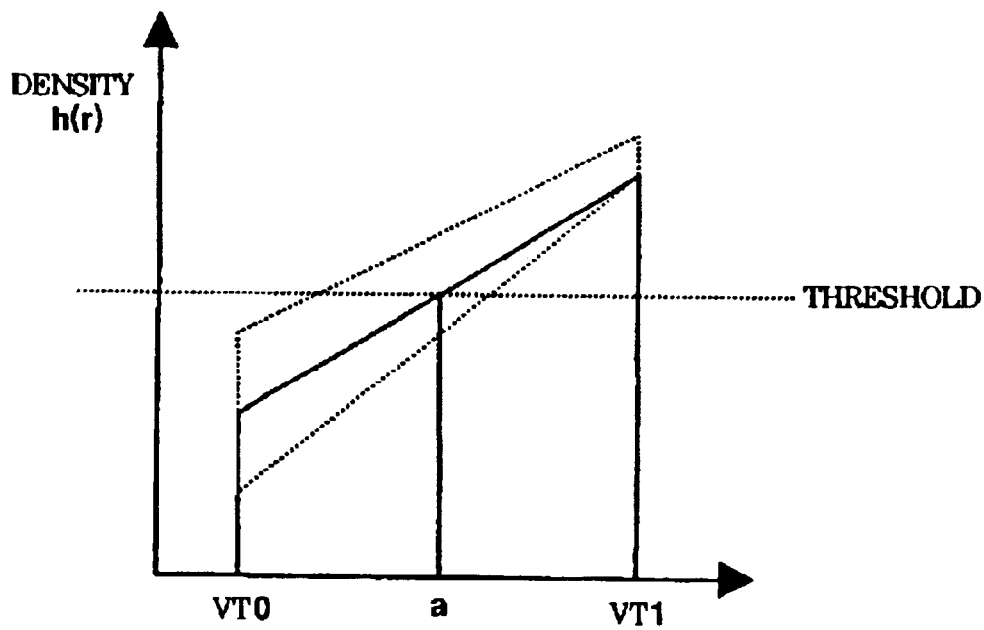
FIG. 38 is an explanatory diagram showing a relationship between densities of vertexes constituting a side of a voxel and an vertex position of a polygon facet on the side of the voxel.
Figure 39:
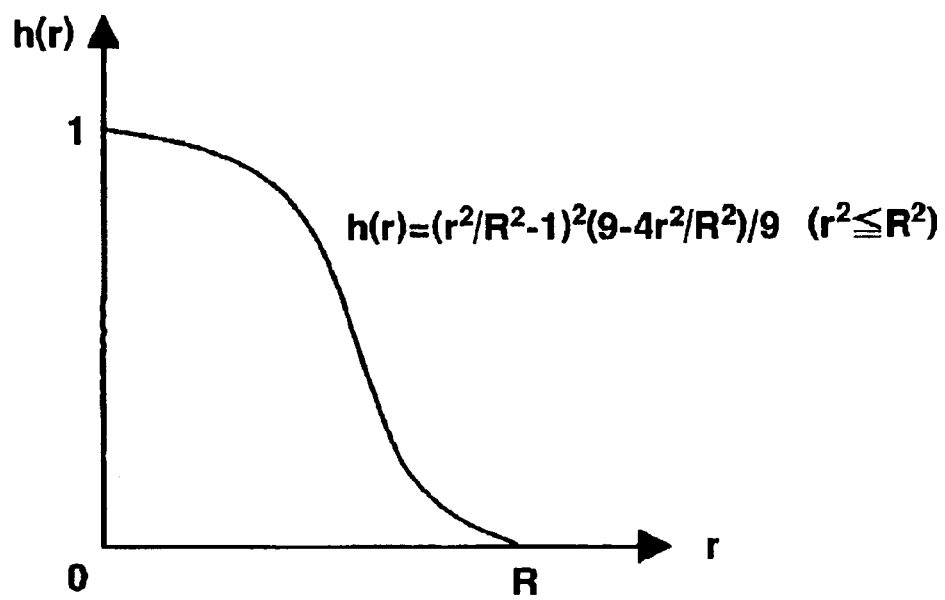
FIG. 39 is a graph showing a relationship a density and distance according to a density evaluation equation of the prior art.
Figure 40A:
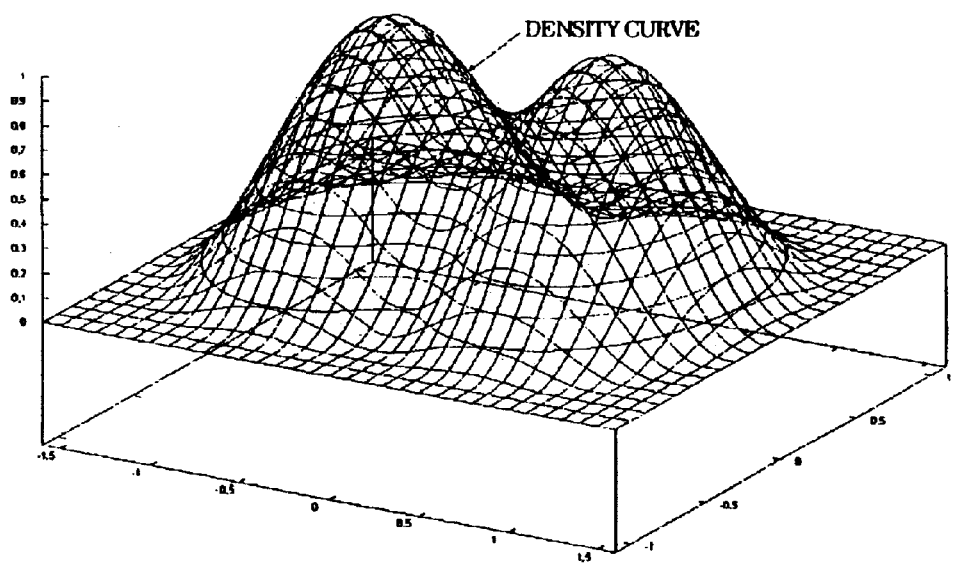
FIGS. 40A and 40B show isodensity curves obtained when densities are calculated according to the density evaluation equation of the prior art regarding two metaballs with a radius of 1, FIG. 40A being an appearance perspective view of isodensity curves and FIG. 40B being a plan view thereof.
Figure 40B:
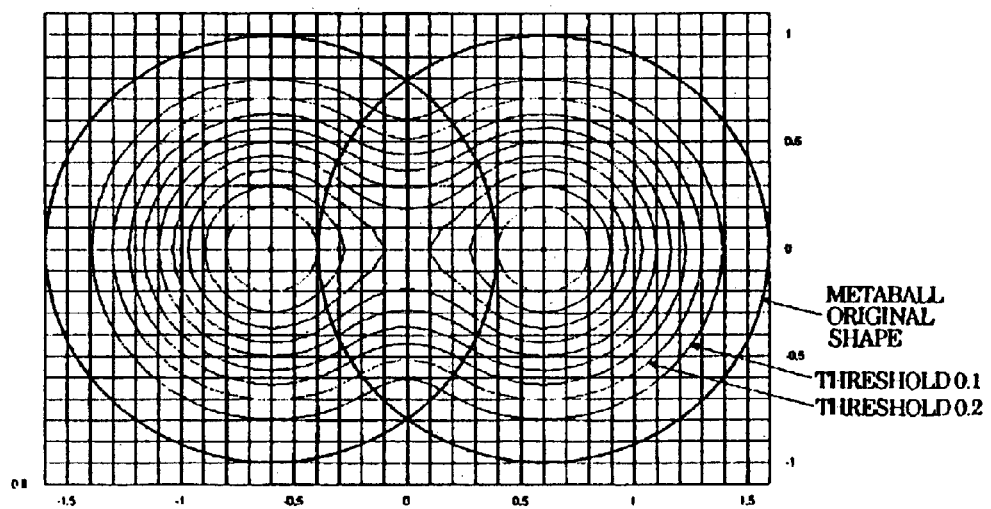
Figure 41A:
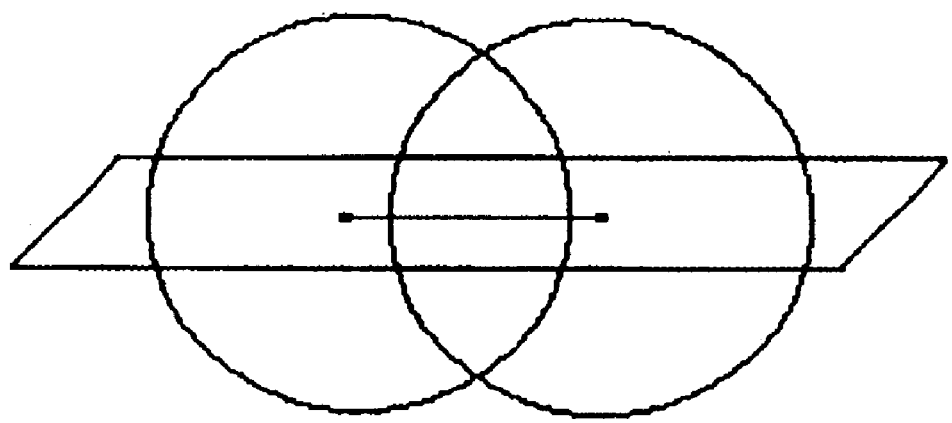
FIGS. 41A and 41B are explanatory diagrams of isodensity curves, FIG. 41A illustratively showing a state that two metaball spheres are merged and FIG. 41B being a plan view of a metaball sphere reproduced when a threshold is 0.5.
Figure 41B:
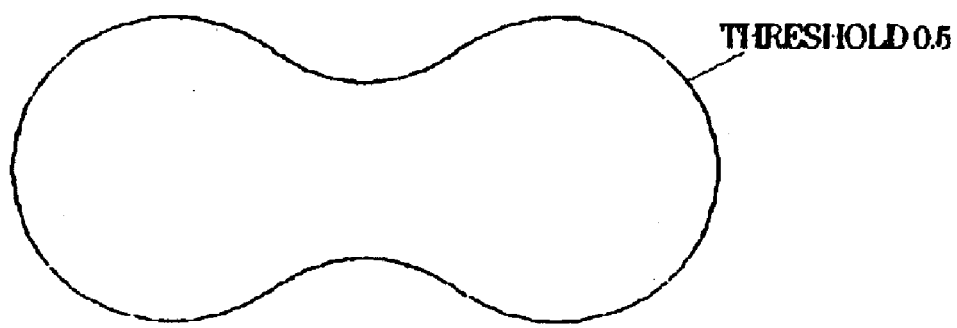

Next, in step 708, the coordinates of a point where the subject voxel and the metaball MB cross each other are calculated from the sides specified in step 706 and the densities h(r) of the vertexes of the subject voxel. For example, when a detailed explanation of the coordinates of a point a on the side 0 is given, as shown in FIG. 38, a density value of the vertex VT1 and a density value of the vertex VT0 are caused to approximate linearly so that a position corresponding to the threshold is defined as the position of the point a. Incidentally, since the densities h(r) of the vertexes VT0, VT1 etc. change according to the movement of the character c for each frame, the density h(r) of the vertex of each voxel fluctuates and a gradient in FIG. 38 varies so that the position of the point a fluctuates. Thus, in step 708, the positions of the points a, b, c and d are specified and, as shown in FIG. 37, two triangles defined by the points a, b and c and by the points b, c and d, i.e., polygon facets constituted by the isosbestic face are specified, the subroutine returns to step 702. When the determination in step 702 is affirmative, the marching cube processing subroutine is terminated and the routine proceeds to step 126 in FIG. 5.

In step 126, rendering data which include data for polygon facets acquired in the marching cube processing subroutine are transmitted to the image processing section 23. Thereby, the image processing section 23 pastes textures onto polygon facets and performs ordinary rendering processing such as light source processing and the like, and transmits image data to the television monitor 4 at the vertical retrace line interruption cycle. The merged (or separated) metaballs MB are dynamically and graphically expressed as an object on the television monitor.

Next, in step 128, the motion cursor mc is incremented by 1 and the time t is incremented by 1, and determination is made in the next step 130 about whether or not a frame by the current motion cursor mc is a final frame of the motion. When the determination is negative, the rendering calculation processing subroutine is terminated and the routine proceeds to step 110 in FIG. 5. When the determination is affirmative, the motion cursor mc is made 0 in step 132 and the next motion is specified so that the rendering calculation processing subroutine is terminated and the routine proceeds to step 110 in FIG. 5.

In step 110, determination is made about whether or not a predetermined button for terminating the game is pressed in step 106. When the determination is negative, the routine returns to step 104, and when the determination is affirmative, the metaball rendering routine is terminated.

(Operation and the Like)

As described above, in this embodiment, all the metaballs MB are disposed inside the imaginary box IB in the metaball update processing (step 120), and $(r/R)^2$ is computed for each vertex of the voxel Vx towards directions of the minimum and the maximum of the voxel index of the voxel Vx from the reference position (the center or the center line) of the metaball MB according to the calculation equation which expresses the given solid shape of the metaball MB in the density distribution processing. At this time, in this embodiment, the second-order divided difference is calculated firstly, the first-order divided difference is updated from this second-order divided difference and the previous first-order divided difference to calculate $(r/R)^2$ (steps 618 and 634). Thus, calculation processing of 12 times of multiplication and 5 times of addition is required when all X, Y and Z are calculated by using the equation (B) in the conventional manner, can be substituted with only 2 times of addition by utilizing information on the vertexes of the adjacent voxel Vx calculated previously without conducting any multiplication and with the calculation of $(r/R)^2$ by using the equation (3) (the same as the equation (B)) in order to shorten a calculation time of $(r/R)^2$. Since the first-order divided difference and the second-order divided difference have already been obtained in steps 610 and 626, the first-order divided difference can be updated from the second-order divided difference and the previous first-order divided difference to calculate $(r/R)^2$ in steps 618 and 634.

Further, in this embodiment, since the vertexes of the voxels Vx used in the marching cube processing are used as density evaluation points, the densities h(r) of the vertexes of adjacent voxels Vx can be continuously and efficiently computed. Furthermore, in this embodiment, when $(r/R)^2$ becomes 1, the computation is terminated (steps 514, 528 and so on), so that the computation of $(r/R)^2$ which corresponds to the outside of the metaball MB (its density is 0) is stopped in order to reduce the computation burden. Besides, in this embodiment, the density h(r) is computed according to the equation (2) (step 122). The equation (2) is simplified as compared with the density evaluation equation in the conventional art, so that the density computation at the vertexes of the voxels Vx can be performed at a high speed.

For the foregoing reasons, according to this embodiment, since the number of metaballs can be increased, a relatively complicated shape such as a game character or the like can be rendered dynamically and graphically, and the isodensity curve obtained according to the equation (2) includes proper undulation when a plurality of metaballs are merged together so that concave and convex impression of the game character and the like can be expressed, thereby a graphically expressing suitable for expression of the game character or the like can be realized as compared with a case that an object is graphically expressed statically with smooth curves to seek for a curvaceousness. Particularly, in case that a character is constituted with a plurality of metaballs like the character c of this embodiment, a constitution is suitable for expressing fine liquid feeling (it is more preferable that liquid is viscous) for merging/separating metaballs repeatedly.

Further, according to the embodiment, in the marching cube processing, the vertex positions of the polygon defining the metaball MB are computed from 0 in each predetermined time without being based on model data or the like (step 708), so that the metaball is reproduced. The marching cube processing itself where an imaginary box IB is divided into voxels Vx has already been known, but a technique in this embodiment is considered as a novel art in that a metaball MB is dynamically reproduced by computing polygon facets of the metaball MB.

In this embodiment, as shown in FIG. 5, all the metaballs MB are disposed inside the imaginary box IB in the metaball update processing (step 120), the densities h(r) are computed for each vertex of the voxel Vx according to the equation (2) from the reference position (the center or the center line) of the metaball MB towards the minimum direction and the maximum direction of the voxel index of the voxel Vx in accordance with the computation equation which expresses a solid shape in the density distribution processing (step 122), and the vertex coordinates of the polygon can be computed on the basis of the density h(r) of the metaball MB at the vertex coordinates of the voxel Vx and the predetermined threshold in the marching cube processing (step 124).

In the embodiment, in case that the density computation is implemented by using the equation (2), since the density coefficient m__fCharge of the bullet ball BB is set to −1 (step 360), the bullet ball BB can be made invisible (invisible on the television monitor 4) and the density of the merging portion of the node assigned ball NB which the bullet ball has hit and the bullet ball BB, so that a bored state (recess) can be dynamically rendered (refer to FIG. 35).

Further, in the embodiment, the coordinate position in the imaginary box IB is assigned to the node N according to motion data in the metaball update processing and the node assigned ball NB is disposed to the node N (step 120), the density h(r) is computed for each vertex of the voxel Vx according to the equation (2) from the reference position of the metaball MB in the minimum direction and the maximum direction of the voxel index of the voxel Vx in accordance with the calculation equation expressing a solid shape in the density distribution processing (step 122), and the vertex coordinates of the polygon can be computed on the basis of the density h(r) of the metaball MB at the vertex coordinates of the voxel Vx and the predetermined threshold in the marching cube processing (step 124), so that the character c is produced.

As shown in FIG. 19, the isodensity curve of the metaball equal to the predetermined threshold was computed as the vertexes of the polygon in the marching cube processing. At this time, it is sufficiently possible to dynamically control a change of a metaball MB itself (its size, position, number, density and the like) at a time of execution according to a program (steps 120 and 122 in FIG. 5), so that changing polygon information can dynamically be produced from 0 at a time of execution (steps 704 to 708). This brings that high efficiency in creating a game character or the like can be achieved and various expressions which could not have been rendered by the morphing technique can be made possible. For example, when such a change as an explosion or collapse of the metaball MB would try to be realized by the morphing technique, a difference (phase difference) which exceeds the limitations of the above-described (i) and (ii) between the two shape morphing models of a start and a goal occurs, and interpolation between the two shape morphing models becomes impossible. In this embodiment, since the change of the shape of the metaball is processed as the change of the density distribution of the metaball to dynamically produce the polygon facets according its change in the marching cube processing, such limitations imposed on the morphing technique do not occur. Accordingly, in this embodiment, phase-wise changes in polygons which could not be realized by the morphing technique can be rendered dynamically and a dynamically expressive power or capacity for a game character can be enhanced.

Incidentally, in this embodiment, the example where $(r/R)^2$ is computed according to the equation (3) was shown, but this invention is not limited to this example. The present invention can be applied to, for example, a case of using the equation (A) In the embodiment, the example that $(r/R)^2$ up to the density evaluation point is computed by using the center of the oval sphere as the reference position in the density distribution processing for computing density was shown, but such a constitution may be employed that a distance to an evaluation point is computed by using a function including a parameter or the like according to the solid shape of the metaball like the case of a cylinder or a truncated cone. In case of using the equation (A), $h(r)=m\_fCharge \cdot (r^2/R^2-1)^2(9-4r^2/R^2)/9$ may be used in order to make the bullet ball BB invisible (m__fCharge=−1).

Further, in the embodiment, the example was shown that, when the density h(r) was performed according to the equation (2), the computation starts from the z coordinate (step 504), and computation of the y coordinate and the x coordinate is performed (FIG. 16 to FIG. 18), but the present invention is not limited to this example. For example, such a constitution can, of course, be employed that the computation is started from the x coordinate.

In this embodiment, the example was shown in which the number of voxels was 120 per one side of the imaginary box IB, but such a constitution may, of course, be employed that the numbers of voxels in the x, y and z directions of the imaginary box IB are different from one another. The number of the voxels and the number of the metaballs may be changed according to the processing speed of a CPU in order to render an object dynamically. The resolution of an object to be reproduced can be improved by increasing the number of voxels.

Furthermore, in this embodiment, the example that the game character approximates to a person was shown, but the present invention is not limited to this example. Since a node corresponds to a joint of an animal and a portion between nodes corresponds to a skeleton, any animal or the like can, of course, be rendered as a game character by disposing node assigned balls to nodes or therebetween.

In the embodiment, the example that the ground ball GB was constituted with four small ground balls, but the ground ball GB may be constituted with one small ground ball. Further, in this embodiment, the example that the imaginary springs which are connected to small ground balls are connected to the nodes N3 and N5 was shown, but such a constitution may be employed that imaginary springs are connected to the node assigned balls NB assigned to the nodes N3 and N5. Furthermore, imaginary springs are connected among all the small ground balls. Such a constitution may prevent separation among the small balls in this embodiment. In this embodiment, the example that the tentacle ball is constituted by a metaball was shown, but it may be constituted by a three-dimensional polygon model.

Further, in this embodiment, the computation equations were shown in case that the velocity, the acceleration, the position and the like of a node assigned ball NB are computed. However, such a constitution may be employed in this invention that a table calculated in advance according to the calculation equations is prepared, and the velocity and the like maybe computed by dividing such data in the table proportionally.

In this embodiment, the shape deformation examples of the node assigned ball NB or the droplet ball DB were shown in steps 274, 394 and the like, but the shape of such a configuration may be employed that a metaball such as a node assigned ball, droplet ball or the like is stretched in a velocity direction thereof arbitrarily and it is shrunk in a direction perpendicular to the velocity direction. With such a constitution, it is possible to give a speed impression for the metaball visually.

Furthermore, in this embodiment, the example that, when the node assigned ball NB crawls on the ground, the velocity V of the node assigned ball is constant was shown, but such a constitution may be employed in this invention that, when the node assigned ball NB crawls on the ground, it is connected to a ground ball GB by an imaginary spring or springs. With such a constitution, a velocity is changed by a force of the spring (the velocity is not constant), so that the acceleration, position and the like may be computed by using the Euler's motion equations.

In this embodiment, the example that, after the predetermined time elapsed from hitting of the bullet ball BB to the node assigned ball NB, the bullet ball BB is made invisible was shown, but the bullet ball BB may be rendered or expressed by making the bullet ball BB invisible by setting the density coefficient m__fCharge of the bullet ball BB to −1 constantly and displaying a ball according to a polygon model having the same size as the bullet ball so as to overlap the bullet ball at the same position, or a state that a node assigned ball NB which is hit by a bullet ball is bored (or recessed) by making the ball invisible according to a polygon model after a predetermined elapsed time may be rendered or expressed.

Further, in the embodiment, such a constitution was employed that the program is transferred to the RAM the medium reading section 22 to read the recording medium 1 on which the game program and the game data have been recorded. However, such a constitution may be employed in this invention that the medium reading section 22 is not provided and the game program is stored in the ROM so that the game program or the game data is read out from the ROM. With such a constitution, the present invention can provide an exclusive game apparatus. Also, in this embodiment, the example that the CD-ROM is used as the recording medium was explained, but the present invention may, of course, be applied to any case where, even when the recording medium is a ROM cartridge, a mass storage disc, a magnet-optical disc or the like which can be loaded to the RAM of the CPU block 20, a reading section for reading these media is provided.

In this embodiment, the example where various computations are implemented within an interruption processing of a vertical retrace line period in order to execute the computations at a predetermined interval was shown, but the present invention may be constituted such that various computations are implemented within a timer interruption processing or a main processing.

What is claimed is:

1. A program where metaballs are dynamically rendered as an object in a three-dimensional imaginary space, wherein a computer is caused to function as:
    a metaball disposer for disposing a plurality of metaballs in the three-dimensional imaginary space according to predetermined motion data;
    a density calculator for calculating internal density of the metaballs at vertexes of voxels which divide an interior of the three-dimensional imaginary space into a large number of portions; and
    an object composer for calculating vertex coordinates of polygons based upon the internal density of the metaballs at the vertexes of the voxels and a predetermined threshold to compose the object.

2. A program according to claim 1, wherein the density calculator has a position calculator for calculating a reference position which is a center or a center line of the metaball, and a distance calculator for sequentially calculating distances from the reference position to vertexes of the voxels towards the outside of the metaball in either direction of x, y and z in the three-dimensional imaginary space.

3. A program according to claim 2, wherein the position calculator calculates the reference position as a coordinate position where density of the metaball becomes 1.

4. A program according to claim 2, wherein, when a radius of the metaball is defined as R and a distance from the reference position of the metaball to an vertex of the voxel as r, the distance calculator calculates a value of $r^2$ or $r^2/R^2$ for each vertex of the voxel from the reference position.

5. A program according to claim 4, wherein the distance calculator calculates the value of $r^2$ or $r^2/R^2$ by adding a first-order divided difference of a size ($\Delta x$, $\Delta y$, $\Delta z$) of the voxel in either direction of x, y and z to a value of $r^2$ or $r^2/R^2$ calculated last time.

6. A program according to claim 5, wherein the distance calculator calculates a second-order divided difference which is a divided difference of the first-order divided difference, and calculates the value of $r^2$ or $r^2/R^2$ at an vertex of the adjacent voxel by addition.

7. A program according to claim 6, wherein the distance calculator calculates the second-order divided difference, based upon the calculated second-order divided difference and the calculated first-order divided difference last time at the vertex of the adjacent voxel updates the first-order divided difference, and calculates the value of $r^2/R^2$ by addition.

8. A program according to claim 5, wherein the distance calculator terminates calculation when the value of $r^2/R^2$ becomes 1 or more.

9. A program according to claim 2, wherein, when a radius of the metaball is defined as R, a distance from a reference position where density of the metaball is 1 to a density evaluation point as r, and density at the density evaluation point as h(r) the density calculator calculates the internal density of the metaball according to the following equation (1)

$$h(r)=1-r^2/R^2 \qquad (1).$$

10. A program according to claim 9, wherein, when a density coefficient of the metaball which takes 1 or −1 is defined as m__fCharge, the density calculator calculates the internal density of the metaball according to the following equation (2)

$$h(r)=m\_fCharge \cdot (1-r^2/R^2) \qquad (2).$$

11. A program according to claim 1, wherein the object composer calculates vertex coordinates of polygons for rendering an isodensity curve of the metaball at a predetermined threshold.

12. A program according to claim 11, wherein the object composer specifies a side which composes an vertex of a polygon by comparing the internal density of the metaball at the vertex of the voxel with the threshold, and calculates a coordinate position corresponding to the threshold on the specified side as an vertex coordinate of the polygon.

13. A program according to claim 12, wherein the object composer detects as ON when the internal density of the metaball at the vertex of the voxel is equal to or more than the threshold and as OFF when the internal density is less than the threshold, and specifies the side for composing the polygon according to an index which is a sum of vertex values of the ON when an vertex number for identifying the vertex of the voxel is used as an exponent part of 2.

14. A program according to claim 13, wherein the index is constituted by 256 sets of isodensity curve data, one set of isodensity curve data including information about sides of the voxel on which vertexes of the polygon are composed and about sides which constitute an isodensity curve of the polygon.

15. A program according to claim 12, wherein the object composer calculates, based upon internal densities at the vertexes of the voxel on both ends constituting the specified side and the coordinate positions of the vertexes of the voxel, a position corresponding to an internal density which is equal to the threshold between the vertexes of the voxel as an vertex coordinate of the polygon.

16. A program according to claim 1, wherein the object composer calculates vertex coordinates of the polygons regarding all of the vertexes of the voxels for each vertical blanking cycle.

17. A program according to claim 1, wherein the metaball disposer assigns the metaballs to a plurality of nodes whose coordinate positions in the three-dimensional imaginary space are defined by motion data so as to constitute a game character, and the object composer calculates the vertex coordinates of polygons based upon the internal density of the metaballs at the vertexes of the voxels and the predetermined threshold to compose the object as the game character.

18. A program according to claim 17, wherein the nodes are positioned at joint positions of the game character and a distance to a node adjacent thereto is constant.

19. A program according to claim 17, wherein the metaball disposer varies sizes of the metaballs which are assigned to the nodes periodically.

20. A program according to claim 17, wherein, when a predetermined event occurs, the metaball disposer cancels the disposition of the metaballs to the nodes and disposes the metaballs to coordinate positions which are determined according to a predetermined calculation equation or table such that the metaballs are scattered.

21. A program according to claim 20, wherein the metaball disposer varies shapes of the metaballs disposed on the coordinate positions which are determined according to the calculation equation or table.

22. A program according to claim 17, wherein the computer is further caused to function as a ground ball composer for composing, by a metaball, a ground ball which is disposed just below the game character and crawls on the ground according to movement of the character.

23. A program according to claim 22, wherein the ground ball composer calculates the coordinate position of the metaball which constitutes the ground ball such that the metaball is connected to a node at a foot portion of the game character or a metaball assigned to the node at the foot portion by an imaginary spring.

24. A program according to claim 22, wherein the ground ball is constituted by a plurality of metaballs.

25. A program according to claim 24, wherein the ground ball composer changes shapes of the plurality of metaballs such that the metaballs constituting the ground ball are unified.

26. A program according to claim 17, wherein the computer is further caused to function as a droplet ball composer for composing, by a metaball, a droplet ball which falls from a metaball assigned to a specific node.

27. A program according to claim 26, wherein the droplet ball composer restricts a fall velocity of the droplet ball to a constant value or less.

28. A program according to claim 27, wherein the droplet ball composer changes a shape of the droplet ball such that the droplet ball drops naturally.

29. A program according to claim 17, wherein the computer is further caused to function as a tentacle ball composer for composing, by a metaball, a tentacle ball which is tentacle-shaped and which projects from a metaball assigned to a specific node.

30. A program according to claim 29, wherein the tentacle ball composer disposes the tentacle ball on a Bezier curve.

31. A program according to claim 30, wherein the tentacle ball composer calculates coordinate positions of points for specifying the Bezier curve such that the points defining the Bezier curve are connect by imaginary springs.

32. A computer readable recording medium on which a program according to claim 1 is recorded.

33. A computer readable recording medium according to claim 32, wherein, when a radius of the metaball is defined as R, a distance from a reference position where density of the metaball is 1 to a density evaluation point as r, and density at the density evaluation point as h(r), the internal density of the metaball is calculated according to the following equation (1)

$$h(r)=1-r^2/R^2 \qquad (1).$$

34. A computer readable recording medium according to claim 32, wherein the metaball disposer assigns the metaballs to a plurality of nodes whose coordinate positions in the three-dimensional imaginary space are defined by motion data so as to constitute a game character, and the object composer calculates the vertex coordinates of polygons based upon the internal density of the metaballs at the vertexes of the voxels and the predetermined threshold to compose the object as the game character.

35. A metaball rendering method where metaballs are dynamically rendered as an object in a three-dimensional imaginary space, comprising the steps of: within a predetermined time, disposing a plurality of metaballs in the three-dimensional imaginary space according to predetermined motion data;

calculating internal density of the metaballs at vertexes of voxels which divide an interior of the three-dimensional imaginary space into a large number of portions; and calculating vertex coordinates of polygons based upon the internal density of the metaballs at the vertexes of the voxels and a predetermined threshold to compose the object.

36. A metaball rendering method according claim 35, wherein, in the step of calculating internal density of the metaballs, calculating a reference position which is a center or a center line of the metaball, and sequentially calculating distances from the reference position to vertexes of the voxels towards the outside of the metaball in either direction of x, y and z in the three-dimensional imaginary space.

37. A metaball rendering method according claim 35, wherein, when a radius of the metaball is defined as R, a distance from a reference position where density of the metaball is 1 to a density evaluation point as r, and density at the density evaluation point as h(r), the internal density of the metaball is calculated according to the following equation (1)

$$h(r)=1-r^2/R^2 \qquad (1).$$

38. A metaball rendering method according claim 36, wherein, when a density coefficient of the metaball which takes 1 or −1 is defined as m_fCharge, the internal density of the metaball is calculated according to the following equation (2)

$$h(r)=m\_fCharge \cdot (1-r^2/R^2) \qquad (2).$$

39. A rendering apparatus where metaballs are dynamically rendered as an object in a three-dimensional imaginary space, comprising:

a metaball disposer for disposing a plurality of metaballs in the three-dimensional imaginary space according to predetermined motion data;

a density calculator for calculating internal density of the metaballs at vertexes of voxels which divide an interior of the three-dimensional imaginary space into a large number of portions; and an object composer for calculating vertex coordinates of polygons based upon the internal density of the metaballs at the vertexes of the voxels and a predetermined threshold to compose the object.

40. A rendering apparatus according to claim 39, wherein the metaball disposer assigns the metaballs to a plurality of nodes whose coordinate positions in the three-dimensional imaginary space are defined by motion data so as to constitute a game character, and the object composer calculates the vertex coordinates of polygons based upon the internal density of the metaballs at the vertexes of the voxels and the predetermined threshold to compose the object as the game character.

* * * * *